United States Patent
Ichihashi et al.

(10) Patent No.: US 8,254,726 B2
(45) Date of Patent: Aug. 28, 2012

(54) IMAGE PROCESSING APPARATUS, IMAGE PROCESSING METHOD, AND PROGRAM

(75) Inventors: Hideyuki Ichihashi, Tokyo (JP); Takefumi Nagumo, Kanagawa (JP); Michel Xavier, Chiba (JP); Hiroshi Oryoji, Kanagawa (JP)

(73) Assignee: Sony Corporation, Tokyo (JP)

( * ) Notice: Subject to any disclaimer, the term of this patent is extended or adjusted under 35 U.S.C. 154(b) by 305 days.

(21) Appl. No.: 12/617,045

(22) Filed: Nov. 12, 2009

(65) Prior Publication Data

US 2010/0119176 A1 May 13, 2010

(30) Foreign Application Priority Data

Nov. 13, 2008 (JP) ................. P2008-290457
Apr. 6, 2009 (JP) ................. P2009-091680

(51) Int. Cl.
*G06K 9/32* (2006.01)

(52) U.S. Cl. .... 382/300; 382/276; 382/299; 375/240.16

(58) Field of Classification Search ................. 382/276, 382/299, 300; 375/240.16, E7.076
See application file for complete search history.

(56) References Cited

U.S. PATENT DOCUMENTS

| 7,477,802 B2 * | 1/2009 | Milanfar et al. ............. 382/299 |
| 2007/0019887 A1 * | 1/2007 | Nestares et al. ............. 382/299 |
| 2008/0175519 A1 | 7/2008 | Nagumo |
| 2008/0186390 A1 * | 8/2008 | Sato et al. .................. 348/222.1 |
| 2009/0245375 A1 * | 10/2009 | Liu .......................... 375/240.16 |
| 2010/0014709 A1 * | 1/2010 | Wheeler et al. ............... 382/103 |

FOREIGN PATENT DOCUMENTS

JP 2008-140012 6/2008

* cited by examiner

*Primary Examiner* — Stephen R Koziol
(74) *Attorney, Agent, or Firm* — Finnegan, Henderson, Farabow, Garrett & Dunner, L.L.P.

(57) ABSTRACT

An image processing apparatus that converts an input image having first resolution into an output image having second resolution higher than the first resolution includes a super-resolution processing unit that converts the input image into an SR image having the second resolution through motion compensation, a motion mask generating unit that generates a motion mask indicating an accuracy of estimation, an edge direction information generating unit that generates edge direction information indicating an edge direction of each area of the input image, a weight map generating unit that generates a weight map indicating likelihood of the edge direction of each of the areas, an interpolation processing unit that converts the input image into an interpolated image having the second resolution, a weight computing unit that computes a weight, and an image generating unit that generates the output image by constructing a weighted sum of the SR image and interpolated image.

11 Claims, 28 Drawing Sheets

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program and, in particular, to an image processing apparatus, an image processing method, and a program suitable for converting an input image into an image having further increased resolution.

2. Description of the Related Art

Super-resolution processing has been used as a technique for generating, from an input image, an image having a higher-resolution image (refer to, for example, Japanese Unexamined Patent Application Publication No. 2008-140012). In super-resolution processing, a plurality of images having areas that overlap one another, that is, images including the same subject are used to generate a high-resolution image of an image of interest having a resolution higher than that of the image of interest.

That is, a correction value is obtained from the image of interest and a high-resolution image pregenerated from images other than the image of interest. The correction value is added to the pregenerated high-resolution image. Thus, the high-resolution image having the correction value added thereto serves as a high-resolution image of the image of interest.

In super-resolution processing, a high-resolution image is generated by obtaining a correction value using a plurality of images and correcting an image using the correction value. Accordingly, the quality of the image can be increased more than that of an image generated simply using an upsampling technique.

SUMMARY OF THE INVENTION

However, in the above-described technique, when a high-resolution image having a resolution higher than that of a low-resolution image is generated from the low-resolution image and if the low-resolution image contains a moving subject, it is difficult to increase the quality of the image.

That is, in super-resolution processing, a plurality of images captured at different time points are used. Accordingly, if the same subject contained in two images is moving, the subject is not present in an area of one of the images the same as an area of the other image. In such a case, if a correction value is obtained for the area in which the subject is present and the image is corrected using the correction value, the image quality of the area including the subject may be decreased. Therefore, the correction value is not added to such an area. Consequently, although the image quality of an area in which no image motion occurs can be increased, it is difficult to increase the image quality of an area in which image motion occurs. In particular, if an image contains a subject having local motion, it is difficult to increase the image quality.

Accordingly, the present invention provides an image processing apparatus, an image processing method, and a program capable of increasing the image quality when a higher-resolution image is generated using a plurality of images.

According to an embodiment of the present invention, an image processing apparatus for converting an input image having a first resolution into an output image having a second resolution higher than the first resolution is provided. The image processing apparatus includes super-resolution processing means for converting the input image into an SR image having the second resolution through motion compensation using the input image and another input image having the second resolution and containing an image of a subject the same as that contained in the input image, motion mask generating means for generating a motion mask indicating an accuracy of estimation through the motion compensation using the input image and the SR image, edge direction information generating means for generating edge direction information indicating an edge direction of each area of the input image, weight map generating means for generating a weight map indicating likelihood of the edge direction of each of the areas using the input image and the edge direction information, interpolation processing means for converting the input image into an interpolated image having the second resolution through interpolation processing using the edge direction information, weight computing means for computing a weight using the motion mask and the weight map, and image generating means for generating the output image by constructing a weighted sum of the SR image and the interpolated image using the weight.

The weight computing means can compute the weight so that the weight of the SR image decreases as the accuracy of estimation indicated by the motion mask decreases.

The weight computing means can compute the weight so that the weight of the SR image decreases as the likelihood of the edge direction indicated by the weight map increases.

The motion mask can serve as information including an accuracy weight value representing the accuracy of estimation for each of the areas, and the accuracy weight value can decrease as the accuracy of estimation decreases. The weight map can serve as information including a likelihood weight value representing the likelihood of the edge direction for each of the areas, and the likelihood weight value can decrease as the likelihood of the edge direction increases. The weight computing means can compute the weight on the basis of a smaller one of the accuracy weight value and the likelihood weight value for each of the areas.

According to another embodiment of the present invention, an image processing method or an image processing program for converting an input image having a first resolution into an output image having a second resolution higher than the first resolution is provided. The method or program includes the steps of converting the input image into an SR image having the second resolution through motion compensation using the input image and another input image having the second resolution and containing an image of a subject the same as that contained in the input image, generating a motion mask indicating an accuracy of estimation through the motion compensation using the input image and the SR image, generating edge direction information indicating an edge direction of each area of the input image, generating a weight map indicating likelihood of the edge direction of each of the areas using the input image and the edge direction information, converting the input image into an interpolated image having the second resolution through interpolation processing using the edge direction information, computing a weight using the motion mask and the weight map, and generating the output image by constructing a weighted sum of the SR image and the interpolated image using the weight.

According to the above-described embodiments, in image processing for converting an input image having a first resolution into an output image having a second resolution higher than the first resolution, the input image is converted into an SR image having the second resolution through motion compensation using the input image and another input image having the second resolution and containing an image of a subject the same as that contained in the input image, a motion mask indicating an accuracy of estimation is generated through the motion compensation using the input image and the SR image, edge direction information indicating an edge direction of each area of the input image is generated, a weight map indicating likelihood of the edge direction of each of the areas is generated using the input image and the edge direction information, the input image is converted into an interpolated image having the second resolution through interpolation processing using the edge direction information, a weight is computed using the motion mask and the weight map, and the output image is generated by constructing a weighted sum of the SR image and the interpolated image using the weight.

According to still another embodiment of the present invention, an image processing apparatus for converting an input image having a first resolution into an output image having a second resolution higher than the first resolution is provided. The image processing apparatus includes first interpolation processing means for converting the input image into a first interpolated image having the second resolution through an interpolation process using an edge direction in each area of the input image, super-resolution processing means for converting the first interpolated image into an SR image having the second resolution through motion compensation using the first interpolated image and another first interpolated image having the second resolution and containing an image of a subject the same as that contained in the first interpolated image, difference computing means for generating a difference image by computing a difference between the SR image and the input image, second interpolation processing means for converting the difference image having the first resolution into a second interpolated image having the second resolution through an interpolation process using an edge direction in each area of the difference image, and adder means for generating the output image by adding the second interpolated image to the SR image.

According to the above-described embodiment, in image processing for converting an input image having a first resolution into an output image having a second resolution higher than the first resolution, the input image is converted into a first interpolated image having the second resolution through an interpolation process using an edge direction in each area of the input image, the first interpolated image is converted into an SR image having the second resolution through motion compensation using the first interpolated image and another first interpolated image having the second resolution and containing an image of a subject the same as that contained in the first interpolated image, a difference image is generated by computing a difference between the SR image and the input image, the difference image having the first resolution is converted into a second interpolated image having the second resolution through an interpolation process using an edge direction in each area of the difference image, and the output image is generated by adding the second interpolated image to the SR image.

According to yet still another embodiment of the present invention, an image processing apparatus for converting an input image having a first resolution into an output image having a second resolution higher than the first resolution is provided. The image processing apparatus includes edge direction information generating means for generating edge direction information indicating an edge direction of each area of the input image using the input image, weight map generating means for generating a weight map indicating likelihood of the edge direction of each of the areas using the input image and the edge direction information, interpolation processing means for converting the input image into an interpolated image having the second resolution through an interpolation process using the edge direction information, super-resolution processing means for converting the interpolated image into an SR image having the second resolution through motion compensation using the interpolated image and another interpolated image having the second resolution and containing an image of a subject the same as that contained in the interpolated image, motion mask generating means for generating a motion mask indicating an accuracy of estimation through the motion compensation using the interpolated image and the SR image, weight computing means for computing a weight using the motion mask and the weight map, difference computing means for generating a difference image by computing a difference between the SR image and the input image, and image generating means for generating the output image by constructing a weighted sum of the SR image and the difference image using the weight.

According to the above-described embodiment, in image processing for converting an input image having a first resolution into an output image having a second resolution higher than the first resolution, edge direction information indicating an edge direction of each area of the input image is generated using the input image, a weight map indicating likelihood of the edge direction of each of the areas is generated using the input image and the edge direction information, the input image is converted into an interpolated image having the second resolution through an interpolation process using the edge direction information, the interpolated image is converted into an SR image having the second resolution through motion compensation using the interpolated image and another interpolated image having the second resolution and containing an image of a subject the same as that contained in the interpolated image, a motion mask indicating an accuracy of estimation is generated through the motion compensation using the interpolated image and the SR image, a weight is computed using the motion mask and the weight map, a difference image is generated by computing a difference between the SR image and the input image, and the output image is generated by constructing a weighted sum of the SR image and the difference image using the weight.

According to the above-described embodiments, when an image having a higher resolution is generated from a plurality of images, the image quality of the generated image can be further increased.

DESCRIPTION OF THE PREFERRED EMBODIMENTS

Various exemplary embodiments of the present invention are described below with reference to the accompanying drawings.

First Embodiment

Configuration of Image Converting Apparatus

Figure 1:
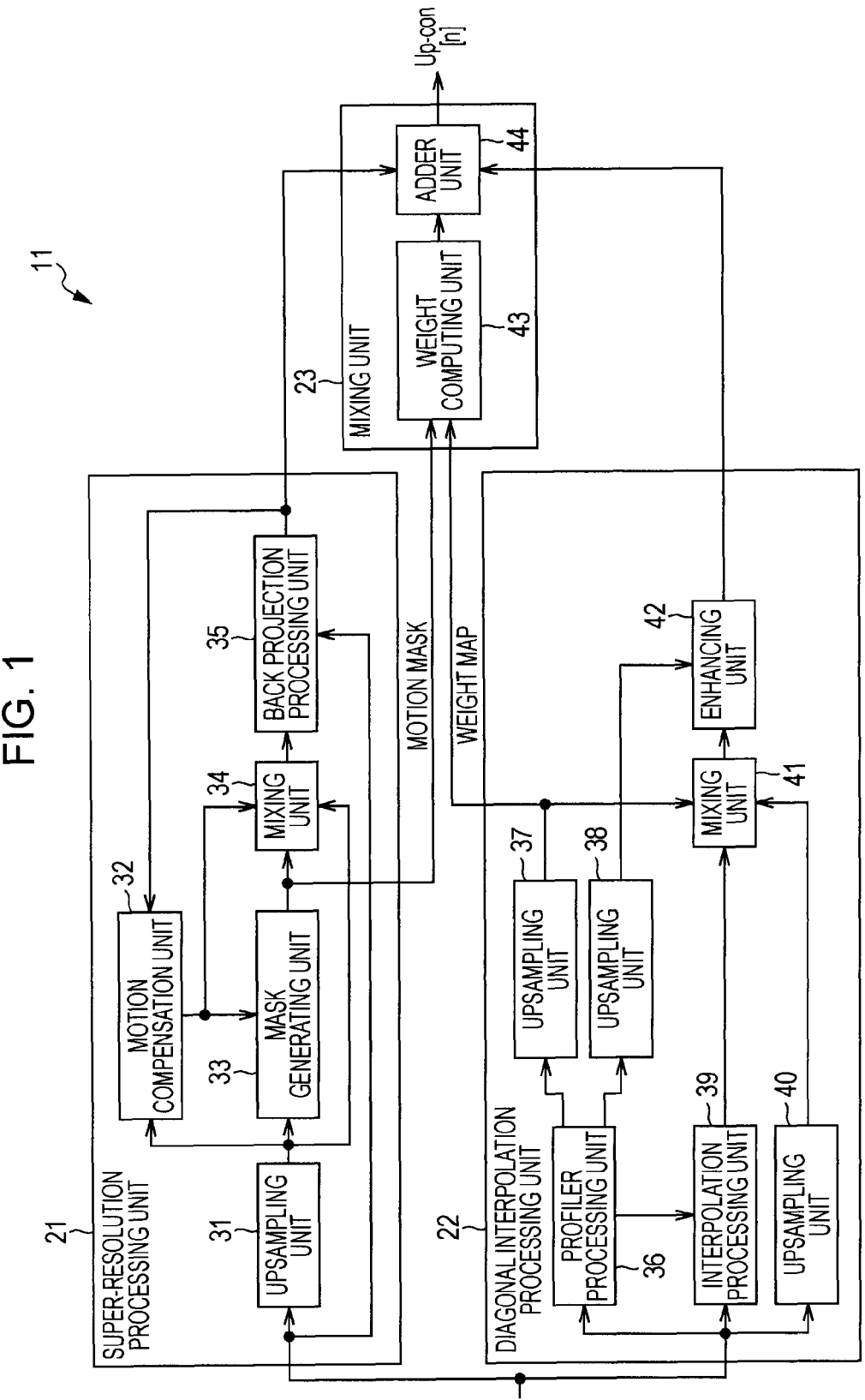
FIG. 1 illustrates an exemplary configuration of an image converting apparatus according to an embodiment of the present invention.

FIG. 1 illustrates an exemplary configuration of an image converting apparatus according to an embodiment of the present invention.

An image converting apparatus 11 includes a super-resolution processing unit 21, a diagonal interpolation processing unit 22, and a mixing unit 23. The image converting apparatus 11 converts an input image into an output image having a resolution higher than that of the input image and outputs the output image.

For example, as input images, images captured at different points of time, such as a moving image or continuously captured still images, are supplied to the super-resolution processing unit 21 and the diagonal interpolation processing unit 22 of the image converting apparatus 11 in the order in which the images are captured. Accordingly, the plurality of images sequentially input to the image converting apparatus 11 are images having areas that overlap one another, that is, images including the same subject.

The super-resolution processing unit 21 performs super-resolution processing so as to convert the supplied input image into an image having a higher resolution using the supplied input image and a high-resolution image that is generated from another input image captured before the input image is captured and that corresponds to the other input image.

Hereinafter, an image generated from an input image and having a resolution higher than that of the input image is also referred to as an "SR (super-resolution) image". The SR image has a resolution that is the same as the output image. The input image and the SR image contain the same displayed image. However, the input image and the SR image have different resolutions.

The super-resolution processing unit 21 includes an upsampling unit 31, a motion compensation unit 32, a mask generating unit 33, a mixing unit 34, and a back projection processing unit 35.

The upsampling unit 31 upsamples the supplied input image. Thereafter, the upsampling unit 31 supplies the upsampled input image to the motion compensation unit 32, the mask generating unit 33, and the mixing unit 34. The motion compensation unit 32 generates an estimated image through motion compensation using the input image supplied from the upsampling unit 31 and the SR image supplied from the back projection processing unit 35.

Note that the SR image supplied from the back projection processing unit 35 to the motion compensation unit 32 is an SR image corresponding to another input image supplied earlier than the currently processed input image supplied to the upsampling unit 31. In addition, as used herein, the term "estimation image" refers to an SR image corresponding to a currently processed input image and estimated using an already generated SR image.

The motion compensation unit 32 supplies the estimation image obtained through motion compensation to the mask generating unit 33 and the mixing unit 34. The mask generating unit 33 generates a motion mask using the input image supplied from the upsampling unit 31 and the estimation image supplied from the motion compensation unit 32. The mask generating unit 33 then supplies the generated motion mask to the mixing unit 34 and the mixing unit 23.

The motion mask serves as information used for identifying an area in which a moving subject is displayed in the input image. The motion mask is generated by obtaining the difference between the input image and the estimation image. That is, the pixel value of each pixel of the motion mask represents the difference between the pixel value of the pixel of the input image and the pixel value of the pixel of the estimation image located at a position the same as that of the pixel in the motion mask.

The mixing unit 34 constructs a weighted sum of the estimation image supplied from the motion compensation unit 32 and the input image supplied from the upsampling unit 31 using the motion mask supplied from the mask generating unit 33. The mixing unit 34 then supplies the resultant image to the back projection processing unit 35. The back projection processing unit 35 generates an SR image corresponding to the input image using the image supplied from the mixing unit 34 and the supplied input image. The back projection processing unit 35 then supplies the generated SR image to the motion compensation unit 32 and the mixing unit 23. The SR image supplied from the back projection processing unit 35 to the motion compensation unit 32 is used for generating an SR image for the next input image supplied to the image converting apparatus 11.

The diagonal interpolation processing unit 22 performs an interpolation process for increasing resolution and a filtering process for enhancing an edge on the supplied input image so as to convert the supplied input image into an enhancement image having a higher resolution. The diagonal interpolation processing unit 22 then supplies the converted image to the mixing unit 23. The enhancement image contains a displayed subject the same as that in the input image and has a resolution that is the same as that of the SR image.

The diagonal interpolation processing unit 22 includes a profiler processing unit 36, an upsampling unit 37, an upsampling unit 38, an interpolation processing unit 39, an upsampling unit 40, a mixing unit 41, and an enhancing unit 42.

The profiler processing unit 36 detects the edge strength and the flat strength of each of the pixels of the supplied input image and generates edge strength information and flat strength information representing the detection result. The edge strength information and the flat strength information generated by the profiler processing unit 36 are upsampled by the upsampling unit 38 and are supplied to the enhancing unit 42.

As used herein, the term "edge strength information" refers to information representing the levels of edge strength of individual pixels of an input image. Note that the edge strength is a ratio of a difference in pixel value between a pixel of interest and a pixel located in the vicinity of the pixel of interest to a difference in distance between the pixel of interest and the pixel located in the vicinity of the pixel of interest in an input image. As the change in pixel value increases, the edge strength increases. As the change in pixel value decreases, the edge strength decreases.

In addition, as used herein, the term "flat strength information" refers to information representing the level of the flat strength of each of the pixels of an input image. Note that the flat strength is a ratio of a decrease in a pixel value between a pixel of interest and a pixel in the vicinity of the pixel of interest in an input image. As the change in pixel value decreases, the flat strength increases. As the change in pixel value increases, the flat strength decreases.

The profiler processing unit 36 generates a direction map indicating the direction of a line representing the subject displayed in each of the pixels of the supplied input image. The profiler processing unit 36 then supplies the generated direction map to the interpolation processing unit 39. That is, the pixel value of each of the pixels in the direction map indicates the direction of a line representing the subject displayed in a pixel of the input image located at a position the same as that of the pixel in the direction map.

In addition, the profiler processing unit 36 generates, using the generated direction map, a weight map indicating the likelihood of the directions indicated in the direction map, that is, the likelihood of part of a line that represents the subject being displayed by the pixel of the input image. The profiler processing unit 36 then supplies the generated weight map to the upsampling unit 37. That is, as the pixel value of each of the pixels in the weight map increases, the pixel has a higher likelihood of being a pixel constituting a line having a certain length and representing the subject in the input image. Note that a line representing a subject is not limited to the profile of the subject (including a background), but the line may be a line indicating the details of the subject.

The upsampling unit 37 upsamples the weight map supplied from the profiler processing unit 36 and supplies the upsampled weight map to the mixing unit 41 and the mixing unit 23. The interpolation processing unit 39 performs an interpolation process on the supplied input image using the direction map supplied from the profiler processing unit 36. Thus, the interpolation processing unit 39 converts the input image into an SR image having a size the same as that of the input image.

The interpolated image contains a displayed subject that is the same as that in the input image. The resolution of the interpolated image is the same as that of the SR image. The interpolation processing unit 39 supplies the interpolated image obtained through the conversion process to the mixing unit 41. The upsampling unit 40 upsamples the supplied input image and supplies the upsampled input image to the mixing unit 41.

The mixing unit 41 constructs a weighted sum of the interpolated image supplied from the interpolation processing unit 39 and the input image supplied from the upsampling unit 40 using the weight map supplied from the upsampling unit 37. The mixing unit 41 then supplies the resultant image to the enhancing unit 42. The enhancing unit 42 enhances the edge of the image supplied from the mixing unit 41 using the edge strength information and the flat strength information supplied from the upsampling unit 38 so as to generate an enhancement image. The enhancing unit 42 supplies the generated enhancement image to the mixing unit 23.

The mixing unit 23 generates an output image from the SR image and the enhancement image and outputs the output image. The mixing unit 23 includes a weight computing unit 43 and an adder unit 44.

The weight computing unit 43 computes, using the motion mask supplied from the mask generating unit 33 and the weight map supplied from the upsampling unit 37, the weights used for constructing a weighted sum of the SR image and the enhancement image. The weight computing unit 43 then supplies the computed weights to the adder unit 44. The adder unit 44 constructs a weighted sum of the SR image supplied from the back projection processing unit 35 and the enhancement image supplied from the enhancing unit 42 using the weights supplied from the weight computing unit 43.

Figure 2:
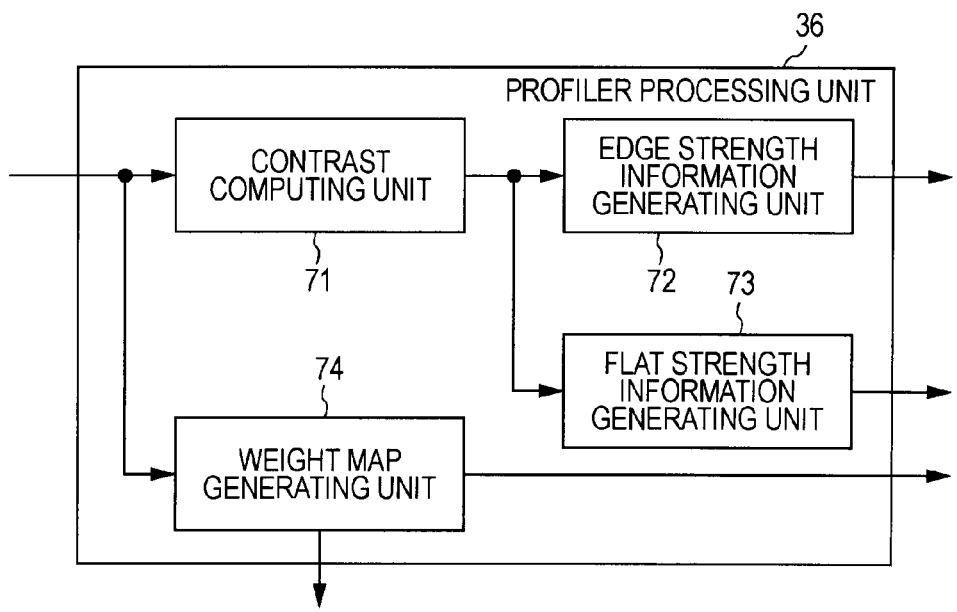
FIG. 2 illustrates an exemplary configuration of a profiler processing unit.
Figure 3:
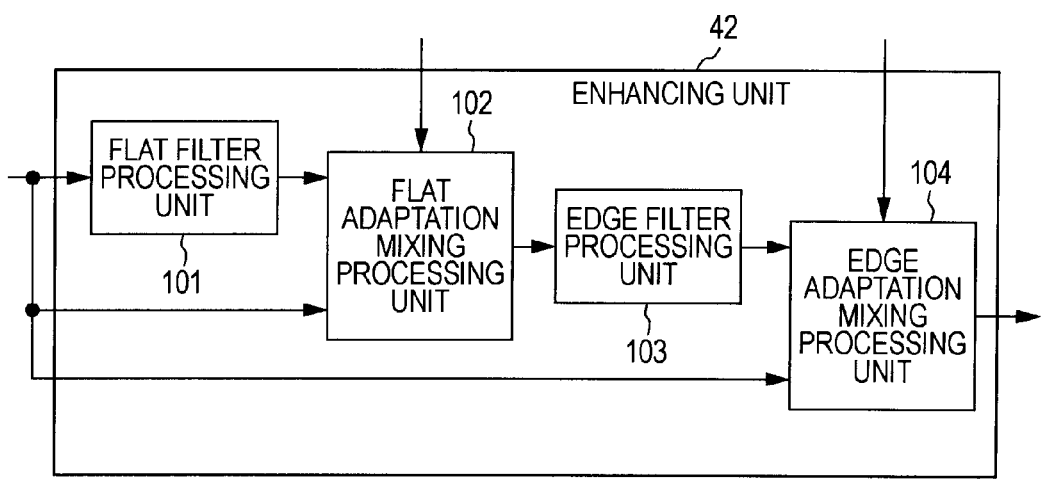
FIG. 3 illustrates an exemplary configuration of an enhancing unit.

More specifically, the profiler processing unit 36 and the enhancing unit 42 are configured as shown in FIGS. 2 and 3.

FIG. 2 illustrates an exemplary configuration of the profiler processing unit 36 in detail.

The profiler processing unit 36 includes a contrast computing unit 71, an edge strength information generating unit 72, a flat strength information generating unit 73, and a weight map generating unit 74.

The contrast computing unit 71 detects the contrast strength of each of the pixels of the supplied input image. The contrast strength represents the strength of contrast of an area including the pixel and in the vicinity of the pixel. The contrast computing unit 71 then supplies the detection result to the edge strength information generating unit 72 and the flat strength information generating unit 73.

The edge strength information generating unit 72 generates edge strength information using the detection result supplied from the contrast computing unit 71 and supplies the generated edge strength information to the upsampling unit 38. The flat strength information generating unit 73 generates flat strength information using the detection result supplied from the contrast computing unit 71 and supplies the generated flat strength information to the upsampling unit 38.

The weight map generating unit 74 generates a direction map using the supplied input image and supplies the generated direction map to the interpolation processing unit 39. In addition, the weight map generating unit 74 generates a weight map using the generated direction map and supplies the generated weight map to the upsampling unit 37.

FIG. 3 illustrates an exemplary configuration of the enhancing unit 42 in detail.

The enhancing unit 42 includes a flat filter processing unit 101, a flat adaptation mixing processing unit 102, an edge filter processing unit 103, and an edge adaptation mixing processing unit 104.

The flat filter processing unit 101 performs flat filter processing on each of the pixels of the image supplied from the mixing unit 41 and supplies the image to the flat adaptation mixing processing unit 102. The flat adaptation mixing processing unit 102 combines the image supplied from the mixing unit 41 with the image supplied from the flat filter processing unit 101 (hereinafter also referred to as a "flat image") using the flat strength information supplied from the upsampling unit 38. The flat adaptation mixing processing unit 102 then supplies the combined image (hereinafter also referred to as a "flat mixing image") to the edge filter processing unit 103.

The edge filter processing unit 103 performs edge filter processing on the flat mixing image supplied from the flat adaptation mixing processing unit 102 and supplies the resultant edge image to the edge adaptation mixing processing unit 104. The edge adaptation mixing processing unit 104 combines the image supplied from the mixing unit 41 with the edge image supplied from the edge filter processing unit 103 using the edge strength information supplied from the upsampling unit 38. The edge adaptation mixing processing unit 104 then supplies the resultant enhancement image to the mixing unit 23.

Operation Performed by Image Converting Apparatus

Each time an input image is supplied to the image converting apparatus 11 shown in FIG. 1, the image converting apparatus 11 performs an image conversion process and converts the supplied input image into an output image. The image converting apparatus 11 then outputs the output image.

The image conversion process performed by the image converting apparatus 11 is described below with reference to the flowchart shown in FIG. 4.

Figure 5:
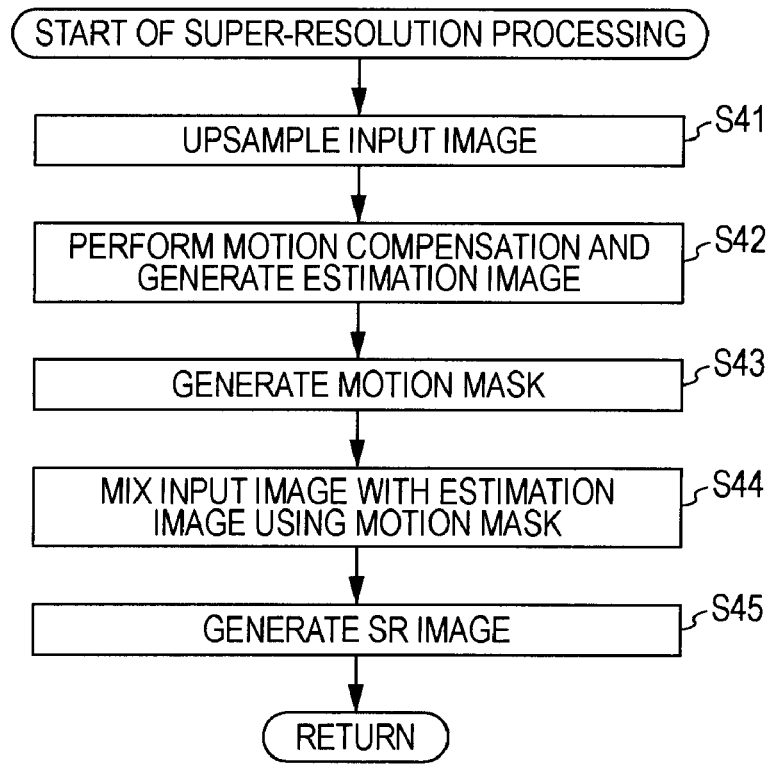
FIG. 5 is a flowchart illustrating a super-resolution process.

In step S11, the super-resolution processing unit 21 performs super-resolution processing. The super-resolution processing unit 21 generates an SR image from the supplied input image and supplies the generated SR image to the adder unit 44 of the mixing unit 23. The super-resolution processing corresponding to the processing performed in step S11 is described next with reference to the flowchart shown in FIG. 5.

In step S41, the upsampling unit 31 upsamples the supplied input image and supplies the upsampled image to the motion compensation unit 32, the mask generating unit 33, and the mixing unit 34. More specifically, the upsampling unit 31 sets the values of several pixels in an SR image to be generated from now in the vicinity of a pixel of interest in the input image to the same value as the pixel value of the pixel of interest. Thus, the upsampling unit 31 upsamples the input image.

In step S42, the motion compensation unit 32 performs motion compensation using the input image supplied from the upsampling unit 31 and the SR image supplied from the back projection processing unit 35 and generates an estimation image. Thereafter, the motion compensation unit 32 supplies the generated estimation image to the mask generating unit 33 and the mixing unit 34.

That is, the motion compensation unit 32 detects a motion vector of each of the pixels of the SR image using the input image and the SR image. Thereafter, the motion compensation unit 32 performs motion compensation on the SR image using the detected motion vectors and generates an estimation image. Accordingly, the estimation image obtained through the motion compensation corresponds to an image in which a moving subject in the SR image is moved to a position near the position of the same subject in the input image.

In step S43, the mask generating unit 33 generates a motion mask using the input image supplied from the upsampling unit 31 and the estimation image supplied from the motion compensation unit 32. Thereafter, the mask generating unit 33 supplies the generated motion mask to the mixing unit 34 and the weight computing unit 43.

That is, the mask generating unit 33 selects one of the pixels of the motion mask to be obtained from now as a pixel of interest. The mask generating unit 33 then computes a difference between the pixel value of a pixel of the input image located at a position the same as that of the pixel of interest and the pixel value of a pixel of the estimation image located at a position the same as that of the pixel of interest. Thereafter, the mask generating unit 33 assigns a value determined in accordance with the difference, for example, a value obtained by multiplying the difference by a predetermined coefficient to the pixel value of the pixel of interest. In this way, the mask generating unit 33 generates the motion mask.

In step S44, the mixing unit 34 mixes the input image supplied from the upsampling unit 31 with the estimation image supplied from the motion compensation unit 32 using the motion mask supplied from the mask generating unit 33.

That is, the mixing unit 34 selects one of the pixels of an image to be obtained from now (hereinafter also referred to as an "SR mixing image") as a pixel of interest. The mixing unit 34 then computes, using the pixel value of a pixel of the motion mask located at a position the same as that of the pixel of interest, a weight $W_i$ ($0 \leq W_i \leq 1$) of a pixel in the input image located at a position the same as that of the pixel of interest and a weight $W_e$ ($=1-W_i$) of a pixel in the estimation image located at a position the same as that of the pixel of interest.

The mixing unit 34 sums the pixel value in the input image located at a position the same as that of the pixel of interest and the pixel value of a pixel of the estimation image located at a position the same as that of the pixel of interest and multiplied by the weight $W_e$. The mixing unit 34 then assigns the resultant value to the pixel value of the pixel of interest. Thereafter, by selecting each of the pixels of the SR mixing image as the pixel of interest and computing the pixel value of the pixel in this manner, the mixing unit 34 generates the SR mixing image.

Note that, when a weighted sum of the input image and the estimation image is constructed, it is constructed in such a manner that, for example, the weight $W_i$ increases as the pixel value of a pixel of the motion mask increases. This is because, by increasing the contribution factor of the input image to generation of an SR mixing image for an area in which the pixel values of the pixels of the motion mask are large, a decrease in the image quality of the SR mixing image can be prevented.

After generating the SR mixing image, the mixing unit 34 supplies the generated SR mixing image to the back projection processing unit 35.

In step S45, the back projection processing unit 35 generates an SR image using the supplied input image and the SR mixing image supplied from the mixing unit 34.

For example, the back projection processing unit 35 downsamples the SR mixing image so as to generate an image having a size that is the same as that of the supplied input image, that is, a resolution that is the same as that of the supplied input image. Thereafter, the back projection processing unit 35 computes the difference between the downsampled SR mixing image and the supplied input image. Thus, the back projection processing unit 35 generates a difference image. That is, the pixel value of each of the pixels of the difference image indicates the difference between the pixel value of a pixel of the SR mixing image located at a position the same as that of the pixel and the pixel value of a pixel of the input image located at a position the same as that of the pixel.

In addition, the back projection processing unit 35 upsamples the obtained difference image so that the difference image has a resolution that is the same as that of the SR image. The back projection processing unit 35 generates the SR image by adding the upsampled difference image to the SR mixing image supplied from the mixing unit 34. That is, the pixel value of each of the pixels of the SR image indicates the sum of the pixel value of a pixel of the upsampled difference image located at a position the same as that of the pixel and the pixel value of a pixel of the SR mixing image (supplied from the mixing unit 34) located at a position the same as that of the pixel.

The SR image obtained in this manner corresponds to the input image supplied to the super-resolution processing unit 21 and has a resolution higher than that of the input image supplied to the super-resolution processing unit 21. However, because of the weighted sum using the motion mask, the pixel value of a pixel in a moving subject region of the SR image is substantially the same as the pixel value of a pixel of the upsampled input image located at a position the same as that of the pixel in the region. That is, the quality of the region of the SR image is not decreased, but is not increased.

After generating the SR image, the back projection processing unit 35 supplies the generated SR image to the motion compensation unit 32 and the adder unit 44. When the SR image is supplied to the adder unit 44, the super-resolution processing is completed. Thereafter, the processing proceeds to step S12 shown in FIG. 4. Note that the super-resolution processing is described in more detail in, for example, Japanese Unexamined Patent Application Publication No. 2008-140012.

Figure 4:
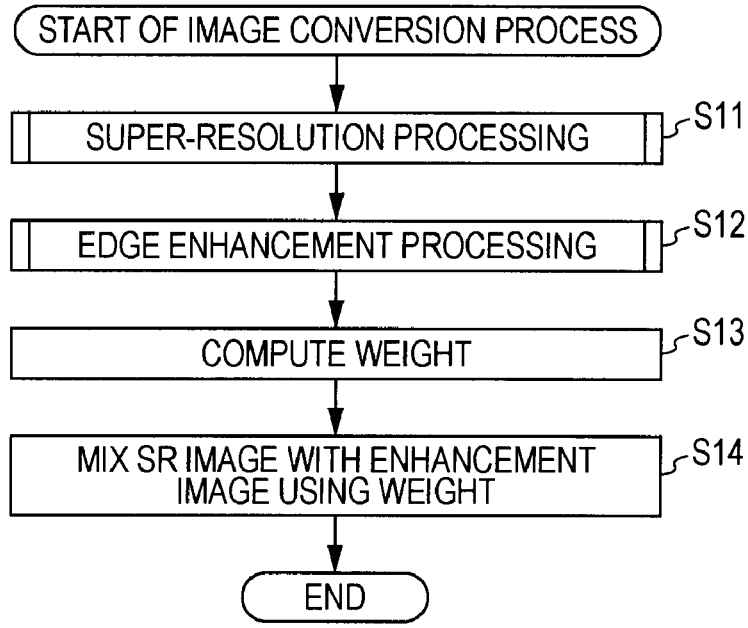
FIG. 4 is a flowchart illustrating an image conversion process.

Referring back to the flowchart shown in FIG. 4, in step S12, the diagonal interpolation processing unit 22 performs edge enhancement processing and generates an enhancement image using the supplied input image.

Figure 6:
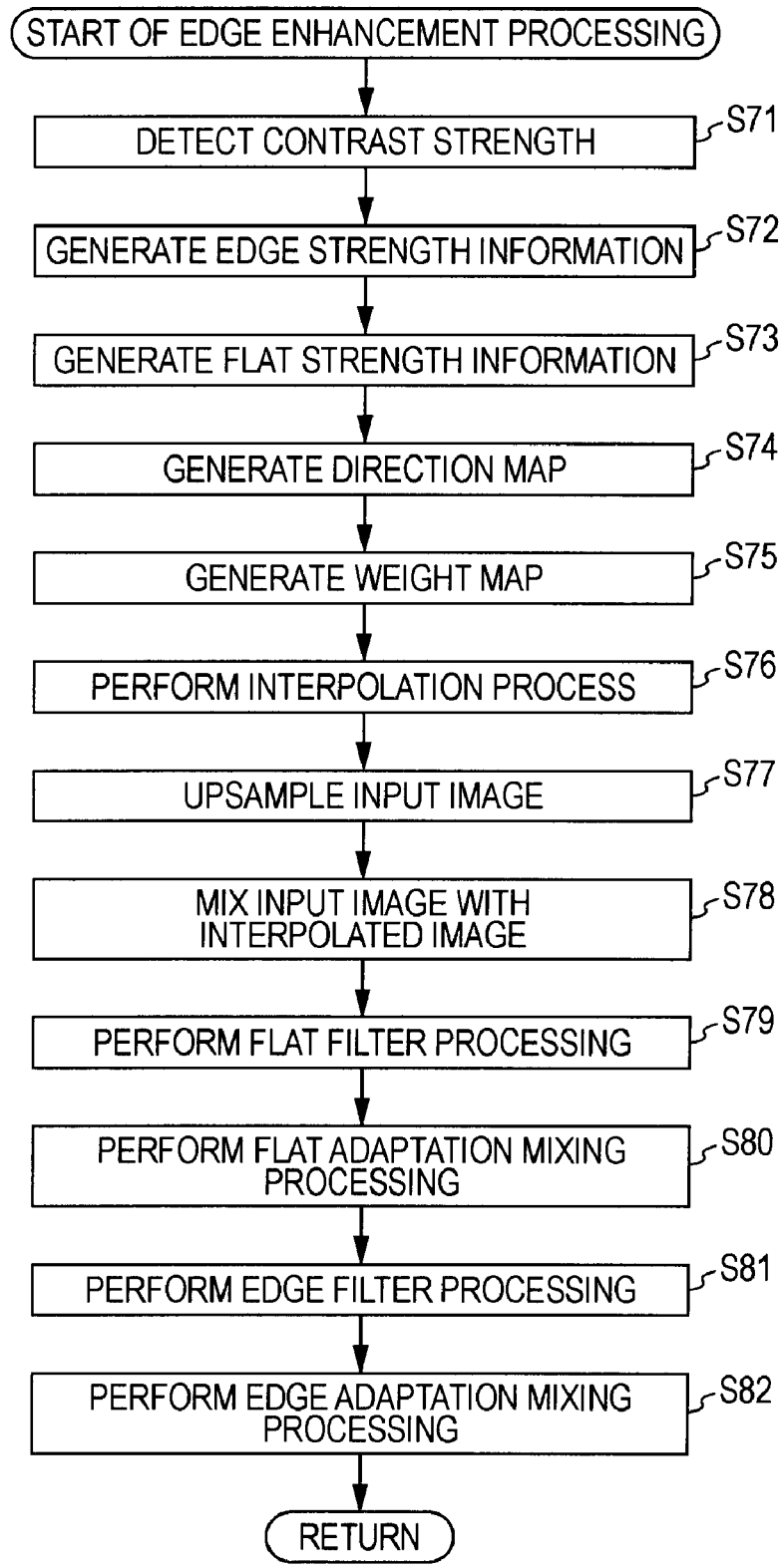
FIG. 6 is a flowchart illustrating edge enhancement processing.

The edge enhancement processing corresponding to the processing performed in step S12 is described below with reference to the flowchart shown in FIG. 6.

In step S71, the contrast computing unit 71 detects the contrast strength. More specifically, the contrast computing unit 71 selects one of the pixels of the supplied input image as a pixel of interest. The contrast computing unit 71 then extracts pixels in a predetermined area at the center of which is the pixel of interest (hereinafter referred to as an "area of interest"). Thereafter, the contrast computing unit 71 multiplies each of the absolute differences between every two pixels in the area of interest by a weight determined in accordance with the distance between the two pixels. The contrast computing unit 71 then computes the sum of the absolute differences. The contrast computing unit 71 uses the sum as the contrast strength of the pixel of interest.

The contrast computing unit 71 computes the contrast strength for each of the pixels of the input image and supplies the computed contrast strengths to the edge strength information generating unit 72 and the flat strength information generating unit 73.

In step S72, the edge strength information generating unit 72 generates edge strength information on the basis of the contrast strengths supplied from the contrast computing unit 71.

For example, the edge strength information generating unit 72 sequentially selects one of the pixels of the input image as the pixel of interest and computes the edge strength of the pixel of interest using the contrast strength of the pixel of interest and predetermined threshold values TE1 and TE2 (TE1<TE2).

More specifically, if a contrast strength TC of the pixel of interest is lower than the threshold value TE1, the edge strength of the pixel of interest is set to "0". If the contrast strength TC of the pixel of interest is higher than or equal to the threshold value TE1 and lower than or equal to the threshold value TE2, the edge strength of the pixel of interest is set to (TC−TE1)/(TE2−TE1). If the contrast strength TC of the pixel of interest is higher than the threshold value TE2, the edge strength of the pixel of interest is set to "1". As the value of the edge strength increases, the edge strength of the pixel of interest increases.

After the edge strength information generating unit 72 computes the edge strengths of all of the pixels of the input image, the edge strength information generating unit 72 generates edge strength information using the edge strengths.

For example, let edge strength information include pixels having pixel values, and let the pixel value of a pixel of the edge strength information located at a position of a pixel of the input image represent the edge strength in the vicinity of the pixel of the input image.

In such a case, the edge strength information generating unit 72 selects one of the pixels of the input image as a pixel of interest. The edge strength information generating unit 72 then multiplies the edge strength of each of the pixels in a predetermined area at the center of which is the pixel of interest (an area of interest) by a weight determined in accordance with the distance between the pixel and the pixel of interest. The edge strength information generating unit 72 then computes the sum of the obtained values. The edge strength information generating unit 72 uses the sum as the value of the edge strength information regarding the pixel of interest. Accordingly, the value of the edge strength information increases as the edge strength of each of the pixels in the area of interest increases. In contrast, the value of the edge strength information decreases as the edge strength of each of the pixels in the area of interest decreases.

After generating the edge strength information, the edge strength information generating unit 72 supplies the generated edge strength information to the upsampling unit 38. The upsampling unit 38 upsamples the edge strength information supplied from the edge strength information generating unit 72 into edge strength information having a size the same as that of the SR image. Thereafter, the upsampling unit 38 supplies the upsampled edge strength information to the edge adaptation mixing processing unit 104.

In step S73, the flat strength information generating unit 73 generates flat strength information on the basis of the contrast strength supplied from the contrast computing unit 71.

For example, the flat strength information generating unit 73 sequentially selects one of the pixels of the input image as a pixel of interest. Thereafter, the flat strength information generating unit 73 computes the flat strength of each of the pixels using the contrast strength of the pixel of interest and predetermined threshold values TF1 and TF2 (TF1<TF2).

More specifically, if a contrast strength TC of the pixel of interest is lower than the threshold value TF1, the flat strength of the pixel of interest is set to "1". If the contrast strength TC of the pixel of interest is higher than or equal to the threshold value TF1 and lower than or equal to the threshold value TF2, the flat strength of the pixel of interest is set to (−TC+TF2)/(TF2−TF1). If the contrast strength TC of the pixel of interest is higher than the threshold value TF2, the flat strength of the pixel of interest is set to "0". As the value of the flat strength increases, a change in pixel value in the vicinity of the pixel of interest decreases.

After computing the flat strengths for all of the pixels of the input image, the flat strength information generating unit 73 generates flat strength information using the flat strengths.

For example, let flat strength information include pixels having pixel values, and let the pixel value of a pixel of the flat strength information located at a position of a pixel of the input image represent the flat strength in the vicinity of the pixel of the input image.

In such a case, the flat strength information generating unit 73 selects one of the pixels of the input image as a pixel of interest. The flat strength information generating unit 73 then multiplies the flat strength of each of the pixels in a predetermined area at the center of which is the pixel of interest (an area of interest) by a weight determined in accordance with the distance between the pixel and the pixel of interest. The flat strength information generating unit 73 then computes the sum of the obtained values. The flat strength information generating unit 73 uses the sum as the value of the flat strength information regarding the pixel of interest. Accordingly, the value of the flat strength information increases as the flat strength of each of the pixels in the area of interest increases. In contrast, the value of the flat strength information decreases as the flat strength of each of the pixels in the area of interest decreases.

After generating the flat strength information, the flat strength information generating unit 73 supplies the generated flat strength information to the upsampling unit 38. The upsampling unit 38 upsamples the flat strength information supplied from the flat strength information generating unit 73 into flat strength information having a size the same as that of the SR image. Thereafter, the upsampling unit 38 supplies the upsampled flat strength information to the flat adaptation mixing processing unit 102.

In step S74, the weight map generating unit 74 generates a direction map using the supplied input image.

For example, the weight map generating unit 74 sequentially selects one of the pixels of the input image as a pixel of interest. The weight map generating unit 74 then computes a difference between the pixel values of pixels located in a predetermined area including the pixel of interest and in a line extending in a predetermined direction that passes through the pixel of interest. The weight map generating unit 74 computes the differences between the pixels in predetermined seven directions and selects one of the differences having a minimum value.

Subsequently, the weight map generating unit 74 uses a value indicating the direction from which the difference is selected as the pixel value of a pixel of the direction map located at a position the same as that of the pixel of interest. After computing the difference between the pixels in the input image and generating the direction map, the weight map generating unit 74 supplies the generated direction map to the interpolation processing unit 39.

In step S75, the weight map generating unit 74 generates a weight map using the direction map generated in step S74.

That is, the weight map generating unit 74 sequentially selects one of the pixels of the direction map as a pixel of interest. The weight map generating unit 74 then computes the pixel value of a pixel of the weight map located at a position the same as that of the pixel of interest on the basis of the pixel values of the pixels in an area including the pixel of interest and having a predetermined size.

For example, the pixel value of a pixel of the weight map is set to be larger as the number of pixels having pixel values close to that of the pixel of interest increases in the area including the pixel of interest. This is because if the number of pixels having pixel values close to that of the pixel of interest increases in the vicinity of the pixel of interest, that is, if the number of pixels that display a line extending in a direction the same as that of the line of the subject displayed by the pixel of interest is large, it is highly likely that the pixel of interest constitutes a line having a certain length.

After generating the weight map, the weight map generating unit 74 supplies the generated weight map to the upsampling unit 37. The upsampling unit 37 upsamples the weight map supplied from the weight map generating unit 74 so that the weight map has a size the same as that of the SR image. The upsampling unit 37 then supplies the upsampled weight map to the mixing unit 41 and the weight computing unit 43.

In step S76, the interpolation processing unit 39 performs an interpolation process on the supplied input image using the direction map supplied from the weight map generating unit 74 so as to generate an interpolated image. For example, the interpolation processing unit 39 selects a pixel to be generated in the interpolated image as a pixel of interest and sets a predetermined area, at the center of which is a pixel of the direction map, located at a position the same as that of the pixel of interest as an area of interest. Thereafter, the interpolation processing unit 39 obtains the direction of a line representing the subject displayed on the pixel of interest using the pixel values of the pixels in the area of interest of the direction map. Subsequently, the interpolation processing unit 39 computes the average of the pixel values of the pixels in the input image at positions the same as those of the pixels of the direction map having the pixel values indicating the direction. The interpolation processing unit 39 then generates an interpolated image using the computed average as the pixel value of the pixel of interest.

In this way, by using several pixels by which part of a line representing the subject in the input image, computing the pixel value of the pixel of interest by which part of the line is displayed, and generating an interpolated image, jaggies occurring when an image is enlarged (when the resolution of the image is increased) can be reduced. That is, when an interpolated image is generated using a direction map, a high-quality image with less jaggies can be obtained, as compared with an image generated by simply upsampling an image.

Upon generating the interpolated image, the interpolation processing unit 39 supplies the generated interpolated image to the mixing unit 41.

In step S77, the upsampling unit 40 upsamples the supplied input image and supplies the upsampled input image to the mixing unit 41.

In step S78, the mixing unit 41 mixes the interpolated image supplied from the interpolation processing unit 39 with the input image supplied from the upsampling unit 40 using the weight map supplied from the upsampling unit 37.

For example, the mixing unit 41 selects one of the pixels of an image to be obtained (hereinafter also referred to as an "interpolation mixing image") as a pixel of interest. The mixing unit 41 then computes, using the pixel value of a pixel of the weight map located at the same position as that of the pixel of interest, a weight Wp ($0 \leq Wp \leq 1$) of a pixel in the interpolated image located at a position the same as that of the pixel of interest and a weight Wo ($=1-Wp$) of a pixel in the input image located at a position the same as that of the pixel of interest.

The mixing unit 41 sums the pixel value of a pixel in the interpolated image located at a position the same as that of the pixel of interest and the pixel value of a pixel of the input image located at a position the same as that of the pixel of interest and multiplied by the weight Wo. The mixing unit 41 then assigns the sum to the pixel value of the pixel of interest. Thereafter, by assigning each of the pixels of the interpolation mixing image to the pixel of interest and computing the pixel value of the pixel in the same manner, the mixing unit 41 generates the interpolation mixing image.

Note that, when a weighted sum of the input image and the interpolated image is computed, the weight Wp is determined, for example, so as to be higher as the pixel value of a pixel of the weight map increases. For an area in which the pixel value of a pixel of the weight map is large, that is, an area in which it is highly likely that part of a line having a certain length is displayed, by increasing the contribution factor of the interpolated image to generation of an interpolation mixing image, the quality of the interpolation mixing image can be further increased.

In contrast, for an area in which the pixel value of a pixel of the weight map is small, that is, an area in which it is highly likely that part of a line having a certain length is not displayed, by increasing the contribution factor of the input image to generation of an interpolation mixing image, a decrease in the quality of the interpolation mixing image can be prevented.

After generating the interpolation mixing image, the mixing unit 41 supplies the generated interpolation mixing image to the flat filter processing unit 101, the flat adaptation mixing processing unit 102, and the edge adaptation mixing processing unit 104 of the enhancing unit 42.

In step S79, the flat filter processing unit 101 performs flat filter processing on the interpolation mixing image supplied from the mixing unit 41.

More specifically, for each of the pixels of the interpolation mixing image, the flat filter processing unit 101 performs flat filter processing on an area including the pixel and pixels in the vicinity of the pixel using a filter having a characteristic that attenuates a component of the interpolated image in a predetermined spatial frequency range. The flat filter processing unit 101 then supplies the flat image obtained through the flat filter processing to the flat adaptation mixing processing unit 102.

Figure 7:
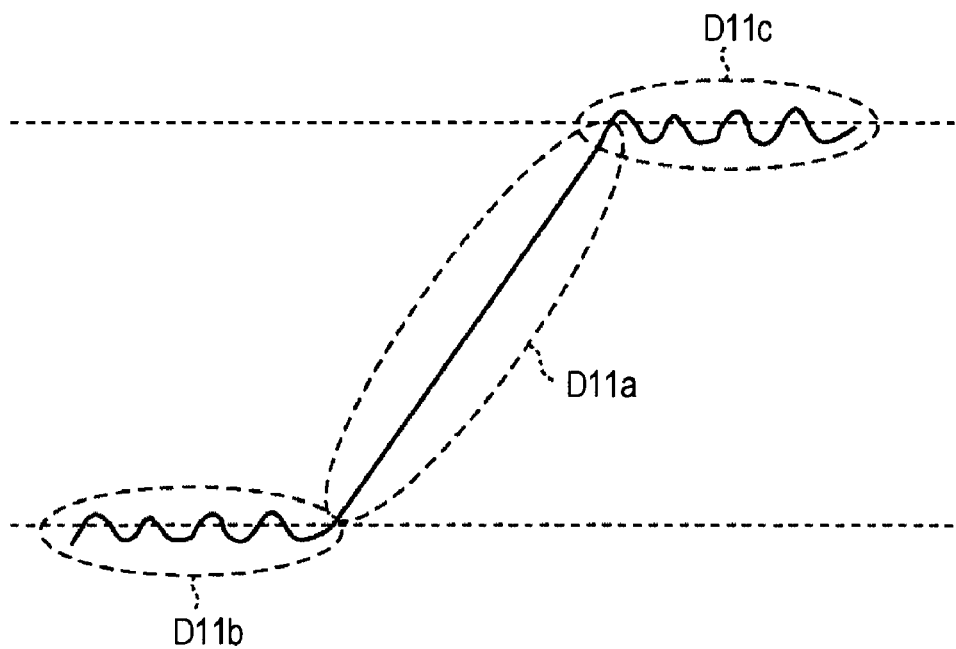
FIG. 7 illustrates an example of a variation in a pixel value in an image.
Figure 8:
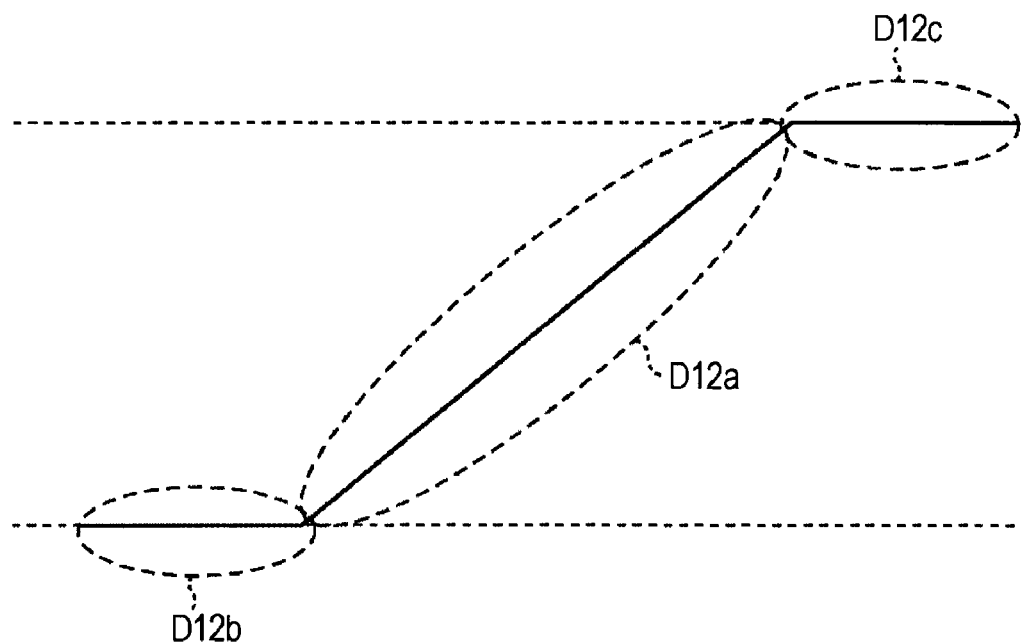
FIG. 8 illustrates an example of a variation in a pixel value in an image.

For example, a smoothing filter (e.g., a median filter or a lowpass filter) that attenuates components of an image in a high-frequency range is used in the flat filtering processing. In such a case, when, as shown in FIG. 7, an interpolation mixing image has an area in which the pixel value varies, the variation in the pixel value in an area corresponding to a flat image subjected to the flat filter processing is shown in FIG. 8.

That is, a variation in the pixel value is smoothened. Accordingly, the pixel value gradually varies (the edge strength is decreased) in an area D12a shown in FIG. 8 corresponding to an area D11a of the interpolation mixing image including an edge shown in FIG. 7. In addition, in areas D12b and D12c shown in FIG. 8 corresponding to areas D11b and D11c shown in FIG. 7, respectively, which are areas near the edge of the interpolation mixing image, small vibration (vibration having a small amplitude) of the pixel value can be prevented.

In step S80, the flat adaptation mixing processing unit 102 performs flat adaptation mixing processing on the interpolation mixing image supplied from the mixing unit 41 and the flat image supplied from the flat filter processing unit 101 using the flat strength information supplied from the upsampling unit 38.

For example, the flat adaptation mixing processing unit 102 considers a pixel of a flat mixing image to be obtained as a pixel of interest. The flat adaptation mixing processing unit 102 then computes, using the pixel value of a pixel of the flat strength information located at a position the same as that of the pixel of interest, a weight Wg ($0 \leq Wg \leq 1$) of a pixel in the interpolation mixing image located at a position the same as that of the pixel of interest and a weight Wf ($=1-Wg$) of a pixel in the flat image located at a position the same as that of the pixel of interest.

The flat adaptation mixing processing unit 102 sums the pixel value of a pixel in the interpolation mixing image located at a position the same as that of the pixel of interest and multiplied by the weight Wg and the pixel value of a pixel of the flat image located at a position the same as that of the pixel of interest and multiplied by the weight Wf. The flat adaptation mixing processing unit 102 then assigns the sum to the pixel value of the pixel of interest.

When a weighted sum of the interpolation mixing image and the flat image is constructed, it is constructed in such a manner that an area having a higher flat strength has a higher contribution factor of the flat image to generation of a flat mixing image, and an area having a lower flat strength has a higher contribution factor of the interpolation mixing image to generation of the flat mixing image.

Figure 9:
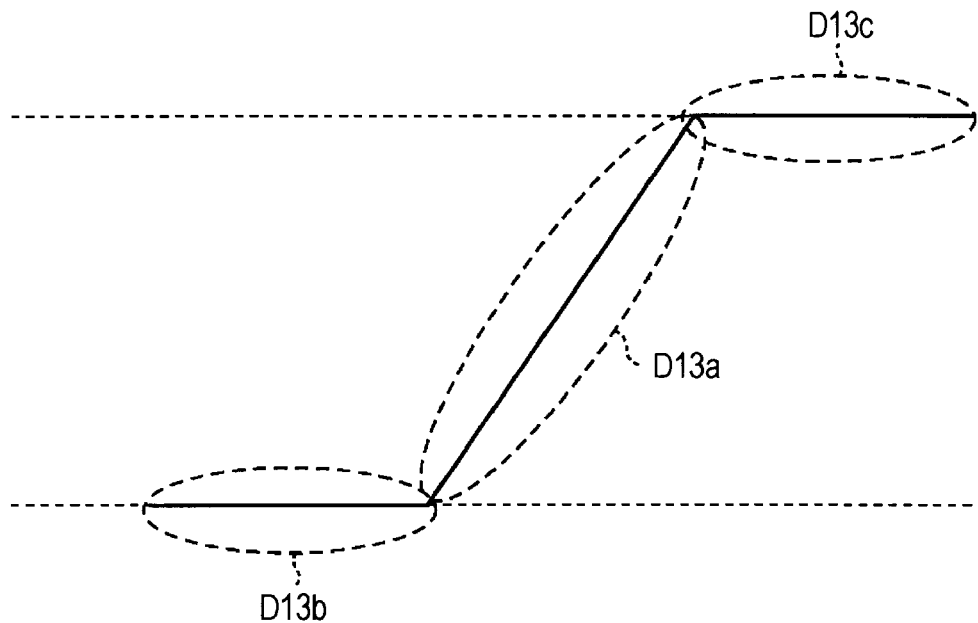
FIG. 9 illustrates an example of a variation in a pixel value in an image.

Accordingly, for example, when an interpolation mixing image in which the pixel value varies as shown in FIG. 7 and a flat image in which the pixel value varies as shown in FIG. 8 are input to the flat adaptation mixing processing unit 102, a variation in the pixel value of a flat mixing image output from the flat adaptation mixing processing unit 102 is shown in FIG. 9.

That is, as shown in FIG. 9, in an area D13a corresponding to the area D11a shown in FIG. 7, the pixel value varies while maintaining a slope the same as that in the area D11a shown in FIG. 7. That is, in a flat mixing image, the edge in the interpolation mixing image is maintained with few changes. In addition, in areas D13b and D13c shown in FIG. 9 corresponding to the areas D11b and D11c shown in FIG. 7, respectively, the pixel values vary in substantially the same manner as in the areas D12b and D12c shown in FIG. 8. As described above, in a flat mixing image, small vibration of the pixel value of a pixel in the vicinity of the edge in the interpolation mixing image can be prevented.

The flat adaptation mixing processing unit 102 supplies, to the edge filter processing unit 103, the flat mixing image obtained through the flat adaptation mixing processing.

In step S81, the edge filter processing unit 103 performs edge filter processing on the flat mixing image supplied from the flat adaptation mixing processing unit 102.

More specifically, for each of the pixels of the flat mixing image, the edge filter processing unit 103 performs filter processing on an area including the pixel and pixels in the vicinity of the pixel using a filter having a characteristic that passes a high-frequency component of an image through the filter. The edge filter processing unit 103 then supplies the edge image obtained through the edge filter processing to the edge adaptation mixing processing unit 104.

Figure 10:
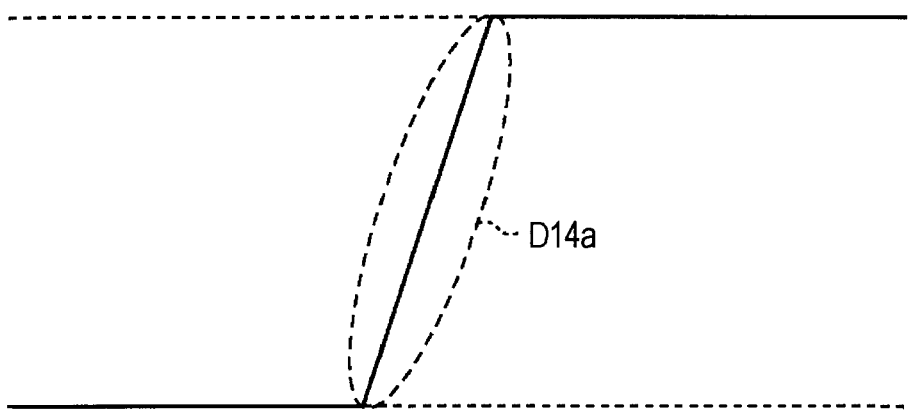
FIG. 10 illustrates an example of a variation in a pixel value in an image.

For example, when a flat mixing image in which the pixel value varies as shown in FIG. 9 is input to the edge filter processing unit 103, a variation in the pixel value in the edge image output from the edge filter processing unit 103 is shown in FIG. 10. That is, in an area D14*a* shown in FIG. 10 corresponding to the area D13*a* shown in FIG. 9 (the area D11*a* shown in FIG. 7), the pixel value varies with a slope greater than that in the area D13*a* shown in FIG. 9 (the area D11*a* shown in FIG. 7). As described above, in the edge image, the edge of the subject is enhanced.

In step S82, the edge adaptation mixing processing unit 104 performs, edge adaptation mixing processing on the interpolation mixing image supplied from the mixing unit 41 and the edge image supplied from the edge filter processing unit 103 using the edge strength information supplied from the upsampling unit 38.

For example, the edge adaptation mixing processing unit 104 considers a pixel of an enhancement image to be obtained as a pixel of interest. The edge adaptation mixing processing unit 104 then computes, using the pixel value of a pixel of the edge strength information located at a position the same as that of the pixel of interest, a weight Wm ($0 \leq$ Wm $\leq 1$) of a pixel in the interpolation mixing image located at a position the same as that of the pixel of interest and a weight Wn (=1−Wm) of a pixel in the edge image located at a position the same as that of the pixel of interest.

The edge adaptation mixing processing unit 104 sums the pixel value of a pixel in the interpolation mixing image located at the same position as that of the pixel of interest and multiplied by the weight Wm and the pixel value of a pixel of the edge image located at the same position as that of the pixel of interest and multiplied by the weight Wn. The edge adaptation mixing processing unit 104 then assigns the sum to the pixel value of the pixel of interest.

When a weighted sum of the interpolation mixing image and the edge image is constructed, it is constructed in such a manner that an area having a higher edge strength has a higher contribution factor of the edge image to generation of an enhancement image, and an area having a lower edge strength has a higher contribution factor of the interpolation mixing image to generation of the enhancement image.

Figure 11:
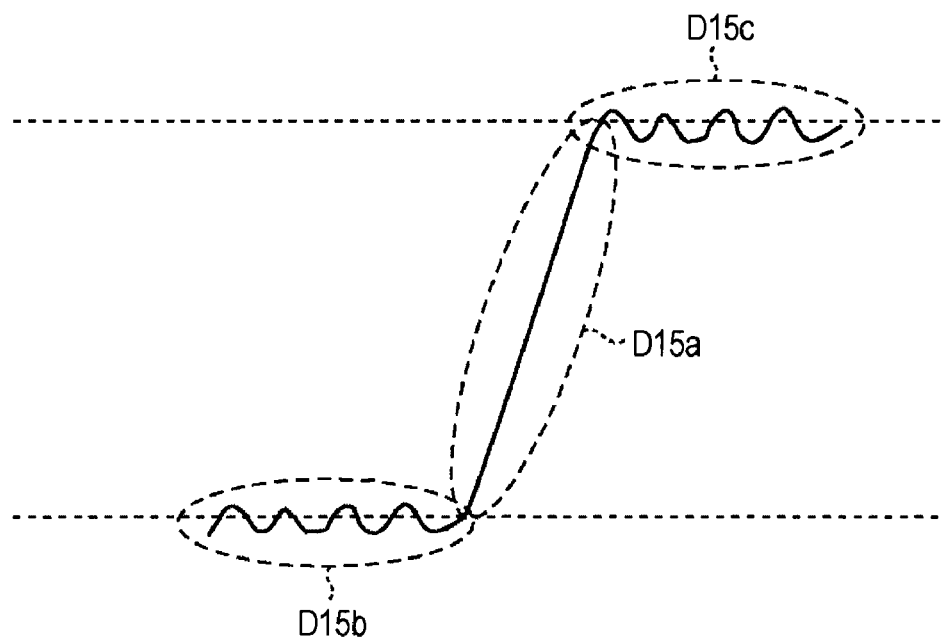
FIG. 11 illustrates an example of a variation in a pixel value in an image.

Accordingly, for example, when an interpolation mixing image in which the pixel value varies as shown in FIG. 7 and an edge image in which the pixel value varies as shown in FIG. 10 are input to the edge adaptation mixing processing unit 104, a variation in the pixel value of an enhancement image is shown in FIG. 11.

That is, as shown in FIG. 11, in an area D15*a* corresponding to the area D11*a* shown in FIG. 7, the pixel value varies while maintaining a slope the same as that in the area D14*a* shown in FIG. 10. In this way, in the enhancement image, the edge in the interpolation mixing image is enhanced.

In addition, in areas D15*b* and D15*c* shown in FIG. 11 corresponding to the areas D11*b* and D11*c* shown in FIG. 7, respectively, the pixel values vary in substantially the same manner as in the areas D11*b* and D11*c* shown in FIG. 7. That is, in the enhancement image, small vibration of the pixel value of a pixel in the vicinity of the edge in the interpolation mixing image is maintained with few changes.

Accordingly, in the enhancement image, only the edge in the interpolation mixing image (the input image) is enhanced. Thus, the sharpness of the edge is increased, although the quality of the image in the other area is substantially the same as that of the interpolation mixing image. Therefore, degradation of the image quality caused by noise enhancement and a decrease in contrast can be prevented. In addition, since the enhancement image is generated using the interpolation mixing image, the enhancement image has a higher quality with less jaggies than that of an image generated by upsampling the input image.

The edge adaptation mixing processing unit 104 supplies the enhancement image obtained through the edge adaptation mixing processing to the adder unit 44. After the enhancement image is generated in this manner, the edge adaptation mixing processing is completed. Thereafter, the processing proceeds to step S13 shown in FIG. 4.

Referring back to the flowchart shown in FIG. 4, when the SR image and the motion mask generated by the super-resolution processing unit 21 and the enhancement image and the weight map generated by the diagonal interpolation processing unit 22 are supplied to the mixing unit 23, the processing in step S13 is started.

In step S13, the weight computing unit 43 computes, using the motion mask supplied from the mask generating unit 33 and the weight map supplied from the upsampling unit 37, a weight Ws ($0 \leq$ Ws $\leq 1$) of the SR image and a weight Wh (=1−Ws) of the enhancement image for each of the pixels. Thereafter, the weight computing unit 43 supplies the computed weights Ws and Wh to the adder unit 44.

In step S14, the adder unit 44 mixes the SR image supplied from the back projection processing unit 35 with the enhancement image supplied from the edge adaptation mixing processing unit 104 using the weights supplied from the weight computing unit 43. Thereafter, the adder unit 44 outputs the resultant output image.

For example, the adder unit 44 sequentially selects one of the pixels of an output image to be computed from now as the pixel of interest. Thereafter, the adder unit 44 sums the pixel value of a pixel in the SR image located at a position the same as that of the pixel of interest and multiplied by the weight Ws and the pixel value of a pixel of the enhancement image located at a position the same as that of the pixel of interest and multiplied by the weight Wh. The adder unit 44 then assigns the sum to the pixel value of the pixel of interest. In this way, the adder unit 44 generates an output image. When the adder unit 44 generates and outputs the output image, the image conversion process is completed.

Note that the super-resolution processing for generating an SR image used for generating the output image has an advantage in that an aliasing area including jaggies and moirés can be restored to its original state in which jaggies and moirés are not included. However, the super-resolution processing has a disadvantage in that it is difficult to effectively increase the image quality of an area of a moving subject.

In contrast, the edge enhancement processing for generating an enhancement image used for generating the output image has an advantage in that, when an input image is converted into an enhancement image having a higher resolution, the occurrence of jaggies is reduced, and therefore, the image quality can be increased. In particular, the image quality of an area including a diagonal line representing a subject can be effectively increased.

In addition, in the edge enhancement processing, only a supplied input image is used. Accordingly, unlike the super-resolution processing in which a plurality of images having different capture times are used, even the image quality of an area of a moving subject can be increased. That is, an advantage in that the image quality of a moving image area is increased can be still provided.

Figure 12:
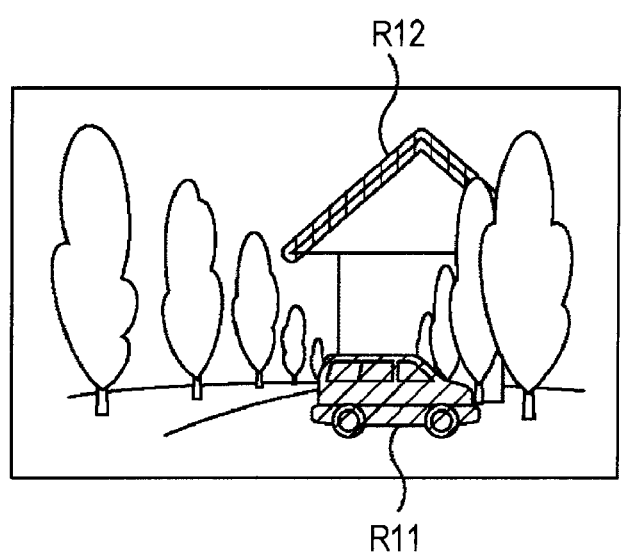
FIG. 12 illustrates computation of a weight.

Accordingly, for example, as shown in FIG. 12, the weight computing unit 43 increases the weight Wh of an enhancement image for a pixel of an area R11 of a moving subject for which the advantage of super-resolution processing is not obtained and a pixel of an area R12 including a diagonal line for which the edge enhancement processing is effective.

In the example shown in FIG. 12, a motor vehicle serving as a moving object is displayed in the area R11, and the profile of a roof of a house serving as a subject including a diagonal line is displayed in the area R12.

For example, the pixel value of a pixel of a motion mask indicates the level of motion of the subject. Accordingly, it is determined that a pixel having a pixel value larger than or equal to a predetermined threshold value is a pixel of the area of the moving subject. Thus, the weight Wh of a pixel of the enhancement image located at a position the same as that of the pixel is further increased.

In addition, for example, the pixel value of a pixel of the weight map indicates the likelihood of being a pixel of a diagonal line. Accordingly, it is determined that a pixel having a pixel value larger than or equal to a predetermined threshold value is a pixel of an area including the diagonal line. Thus, the weight Wh of a pixel of the enhancement image located at a position the same as that of the pixel is further increased.

As described above, the image converting apparatus 11 generates the SR image and the enhancement image through super-resolution processing and edge enhancement processing, respectively. In addition, the image converting apparatus 11 increases the contribution factor of the enhancement image to an area including a moving subject or a diagonal line. Furthermore, the image converting apparatus 11 increases the contribution factor of the SR image to the other area. In this way, the image converting apparatus 11 generates an output image.

As described above, by increasing the contribution factor of the enhancement image to an area including a moving subject or a diagonal line and increasing the contribution factor of the SR image to the other area and generating an output image, the quality of the output image can be further increased. That is, when a higher-resolution output image is acquired from the input image, the image quality of the entire area of the output image can be easily and reliably increased.

Second Embodiment
Configuration of Image Converting Apparatus

Figure 13:
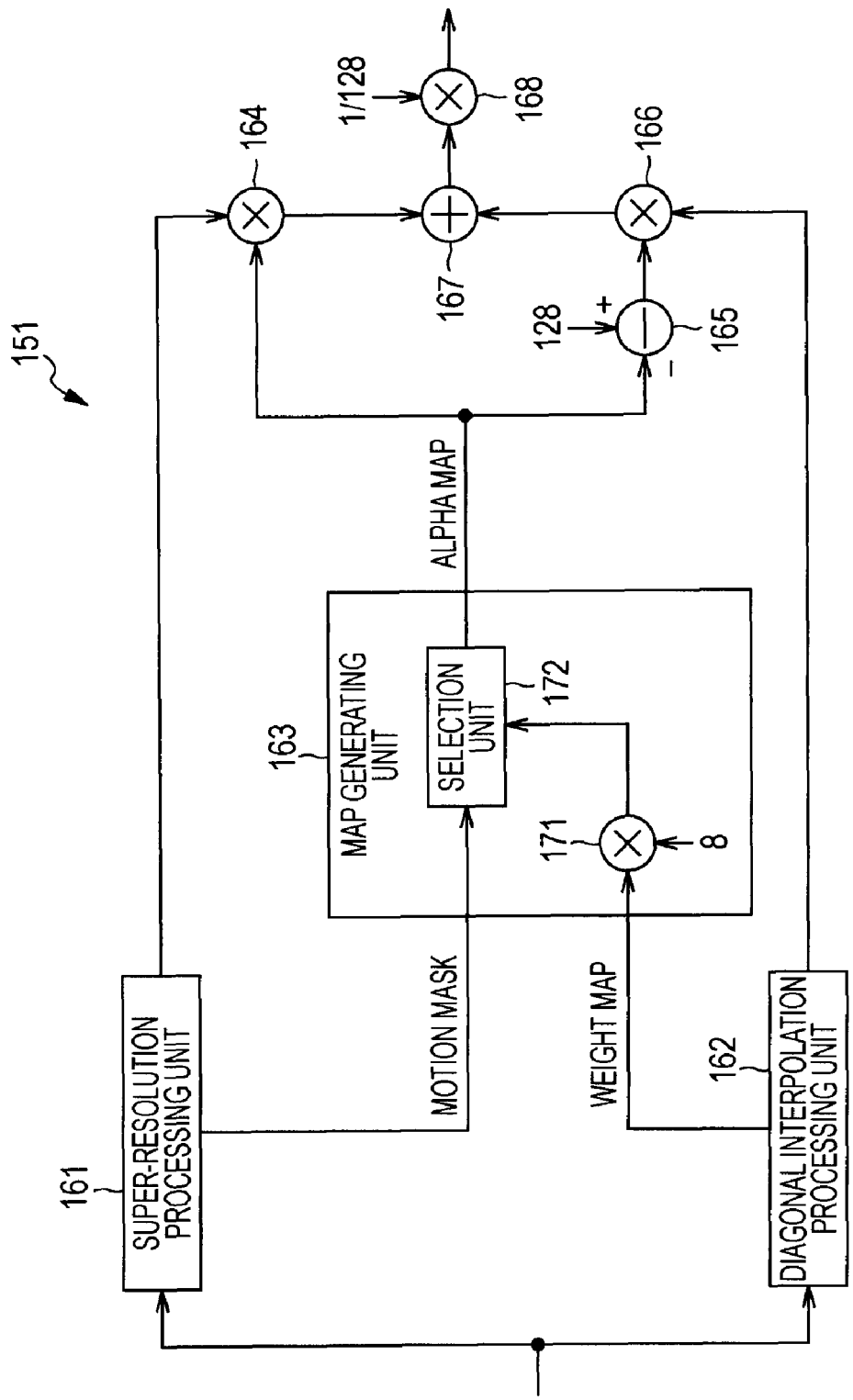
FIG. 13 illustrates another exemplary configuration of an image converting apparatus according to an embodiment of the present invention.

FIG. 13 illustrates an exemplary configuration of an image converting apparatus according to a second embodiment of the present invention.

An image converting apparatus 151 includes a super-resolution processing unit 161, a diagonal interpolation processing unit 162, a map generating unit 163, a multiplier unit 164, a subtracter unit 165, a multiplier unit 166, an adder unit 167, and a multiplier unit 168.

The image converting apparatus 151 converts an input image into an output image having a resolution higher than that of the input image and outputs the output image. As in the first embodiment, as input images, temporally continuously captured images are used. The input images are sequentially supplied to the super-resolution processing unit 161 and the diagonal interpolation processing unit 162 of the image converting apparatus 151 on a frame-by-frame basis.

The super-resolution processing unit 161 generates an SR image of a frame to be processed through super-resolution processing using the supplied input image and an SR image generated from another input image supplied earlier than the currently processed input image. The super-resolution processing unit 161 then supplies the generated SR image to the multiplier unit 164. The SR image is an image generated by magnifying the supplied input image to be processed so that the input image has a resolution the same as that of an output image.

In addition, the super-resolution processing unit 161 supplies a motion mask generated through super-resolution processing to the map generating unit 163. The motion mask serves as information used for identifying an area in which a moving subject is displayed in the input image. As the pixel value of a pixel of the motion mask increases, the super-resolution processing is more effective for an area of the input image located at a position the same as that of the pixel. That is, as the pixel value of a pixel of the motion mask increases, the image quality of an area of the SR image located at a position the same as that of the pixel can be more improved. For example, the pixel value of a pixel of the motion mask is an integer ranging from 0 to 128.

The diagonal interpolation processing unit 162 performs a diagonal interpolation process on the supplied input image and generate an enhancement image having a resolution that is the same as that of an output image. The diagonal interpolation processing unit 162 then supplies the generated enhancement image to the multiplier unit 166. In the diagonal interpolation process, pixels arranged in an edge direction in each area of the input image are used, and new pixels are interpolated between the pixels of the input image. The image obtained through the interpolation and having a resolution the same as that of the output image serves as an enhancement image. Note that the diagonal interpolation process is basically similar to the edge enhancement processing performed by the above-described diagonal interpolation processing unit 22.

In addition, the diagonal interpolation processing unit 162 supplies a weight map generated through the diagonal interpolation process to the map generating unit 163. The weight map indicates the likelihood of the direction of the edge detected in each of the areas of the input image. As the pixel value of each of the pixels in the weight map decreases, the diagonal interpolation process is more effective for an area located at a position the same as that of the pixel. That is, as the pixel value of each of the pixels in the weight map decreases, the image quality of the area of the enhancement image located at a position the same as that of the pixel can be increased. For example, the pixel value of a pixel of the weight map is an integer ranging from 0 to 16.

The map generating unit 163 generates an alpha map using the motion mask supplied from the super-resolution processing unit 161 and the weight map supplied from the diagonal interpolation processing unit 162. The alpha map is used for generating an output image by mixing the SR image with the enhancement image. The pixel value of each of the pixels of the alpha map serves as a weight that is multiplied by the pixel value of a pixel of the SR image located at a position the same as that of the pixel.

The map generating unit 163 includes a multiplier unit 171 and a selection unit 172. The weight map and the motion mask are supplied to the multiplier unit 171 and the selection unit 172, respectively.

The multiplier unit 171 multiplies the pixel value of each of the pixels of the weight map supplied from the diagonal interpolation processing unit 162 by 8. The multiplier unit 171 then supplies the resultant weight map to the selection unit 172. In this way, the weight map is normalized so that each of the pixel value is an integer ranging from 0 to 128. The selection unit 172 generates an alpha map using the motion mask supplied from the super-resolution processing unit 161 and the weight map supplied from the multiplier unit 171. The selection unit 172 then supplies the alpha map to the multiplier unit 164 and the subtracter unit 165.

The multiplier unit 164 multiplies the pixel value of each of the pixels of the SR image supplied from the super-resolution processing unit 161 by the pixel value of the corresponding pixel of the alpha map supplied from the selection unit 172. The multiplier unit 164 then supplies the computed values to the adder unit 167. The subtracter unit 165 subtracts the pixel value of the pixel of the alpha map supplied from the selection unit 172 from 128 and supplies the computed values to the multiplier unit 166. That is, the value "−128" is added to the pixel value of each of the pixels of the alpha map.

The multiplier unit 166 multiplies the pixel value of each of the pixels of the enhancement image supplied from the diagonal interpolation processing unit 162 by the value supplied from the subtracter unit 165. The multiplier unit 166 then supplies the computed values to the adder unit 167. The adder unit 167 sums the SR image supplied from the multiplier unit 164 and the enhancement image supplied from the multiplier unit 166 and supplies the resultant image to the multiplier unit 168.

The multiplier unit 168 multiplies the pixel value of each of the pixels of the image supplied from the adder unit 167 by $1/128$ and outputs the resultant output image. That is, the output image is generated by constructing a weighted sum of the SR image and the enhancement image using the pixel values of the pixels of the alpha map as the weights.

Figure 14:
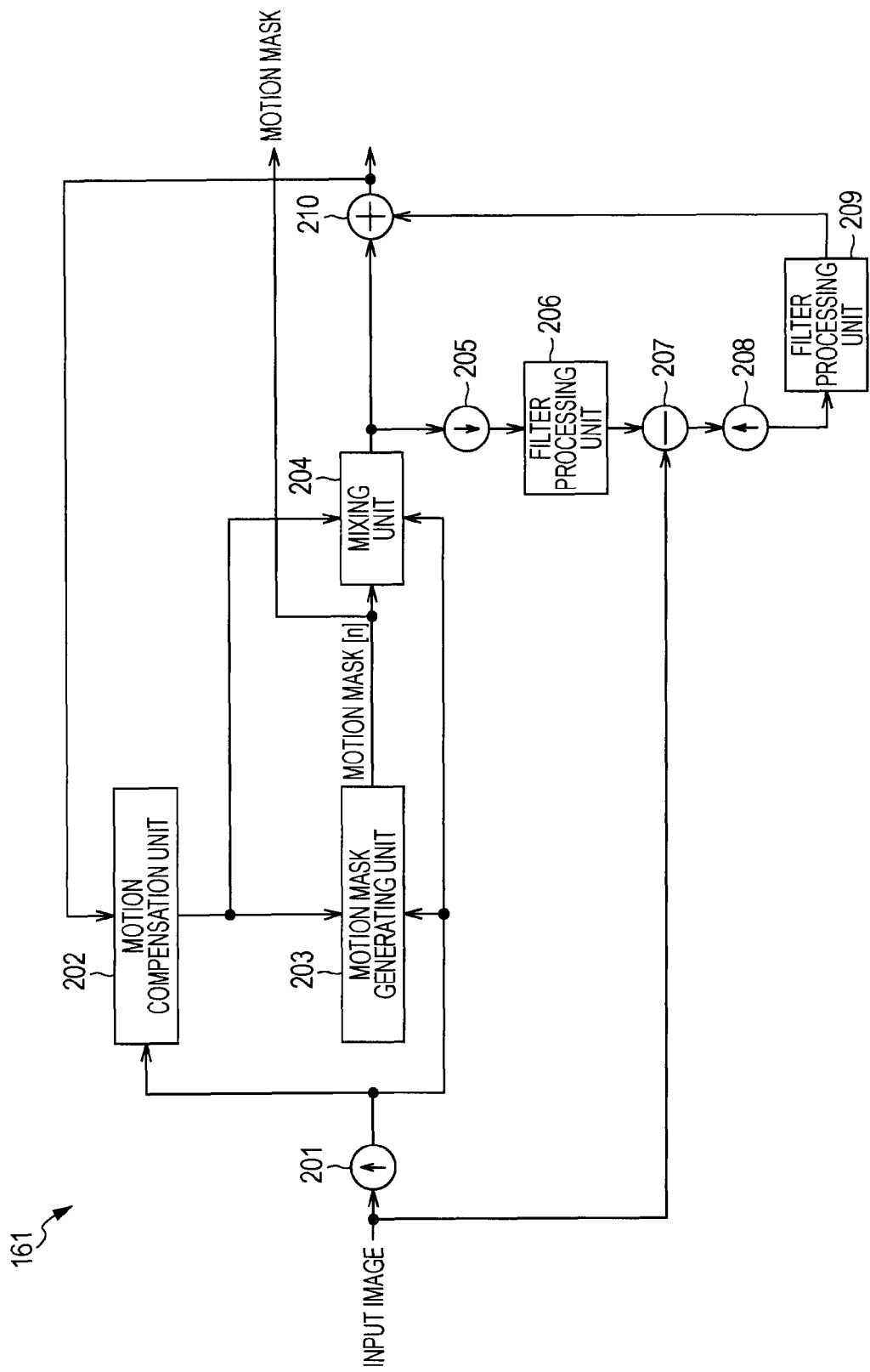
FIG. 14 illustrates an exemplary configuration of a super-resolution processing unit.

More specifically, the super-resolution processing unit 161 shown in FIG. 13 is configured as shown in FIG. 14.

The super-resolution processing unit 161 includes an upsampling unit 201, a motion compensation unit 202, a motion mask generating unit 203, a mixing unit 204, a downsampling unit 205, a filter processing unit 206, a subtracter unit 207, an upsampling unit 208, a filter processing unit 209, and an adder unit 210.

The upsampling unit 201 upsamples the supplied input image into an image having a resolution of an SR image to be generated. The upsampling unit 201 then supplies the generated image to the motion compensation unit 202, the motion mask generating unit 203, and the mixing unit 204.

The motion compensation unit 202 computes a motion vector of an SR image using the input image supplied from the upsampling unit 201 and an SR image supplied from the adder unit 210. The SR image supplied from the adder unit 210 is an SR image of a frame obtained earlier than the currently processed frame.

In addition, the motion compensation unit 202 performs motion compensation using the computed motion vector and the SR image supplied from the adder unit 210 so as to generate an estimation image. That is, the motion compensation unit 202 moves the entire SR image by a distance that is the same as the size of the motion vector in a direction indicated by the motion vector. The motion compensation unit 202 then uses the obtained image as the estimation image.

The estimation image is obtained by estimating the SR image of a current frame through motion compensation using an SR image for the one frame previous image. The estimation image is supplied from the motion compensation unit 202 to the motion mask generating unit 203 and the mixing unit 204.

The motion mask generating unit 203 generates a motion mask using the input image supplied from the upsampling unit 201 and the estimation image supplied from the motion compensation unit 202. The mask generating unit 203 then supplies the generated motion mask to the mixing unit 204 and the selection unit 172. The mixing unit 204 constructs a weighted sum of the estimation image supplied from the motion compensation unit 202 and the input image supplied from the upsampling unit 201 using the motion mask supplied from the mask generating unit 203. The mixing unit 204 then supplies the obtained mixing image to the downsampling unit 205 and the adder unit 210.

The downsampling unit 205 downsamples the mixing image supplied from the mixing unit 204 into an image having a resolution that is the same as that of the input image and supplies the downsampled mixing image to the filter processing unit 206. The filter processing unit 206 performs filter processing on the mixing image supplied from the downsampling unit 205 using a lowpass filter and supplies the resultant image to the subtracter unit 207.

The subtracter unit 207 computes a difference between the input image and the mixing image by subtracting the mixing image supplied from the filter processing unit 206 from the supplied input image. The subtracter unit 207 then supplies the obtained difference image to the upsampling unit 208. The upsampling unit 208 upsamples the difference image supplied from the subtracter unit 207 into an image having a resolution the same as that of the SR image. The upsampling unit 208 then supplies the image to the filter processing unit 209.

The filter processing unit 209 performs filter processing on the difference image supplied from the upsampling unit 208 using a highpass filter and supplies the difference image to the adder unit 210. The adder unit 210 sums the mixing image supplied from the mixing unit 204 and the difference image supplied from the filter processing unit 209 so as to generate an SR image. The adder unit 210 then supplies the SR image to the motion compensation unit 202 and the multiplier unit 164.

Figure 15:
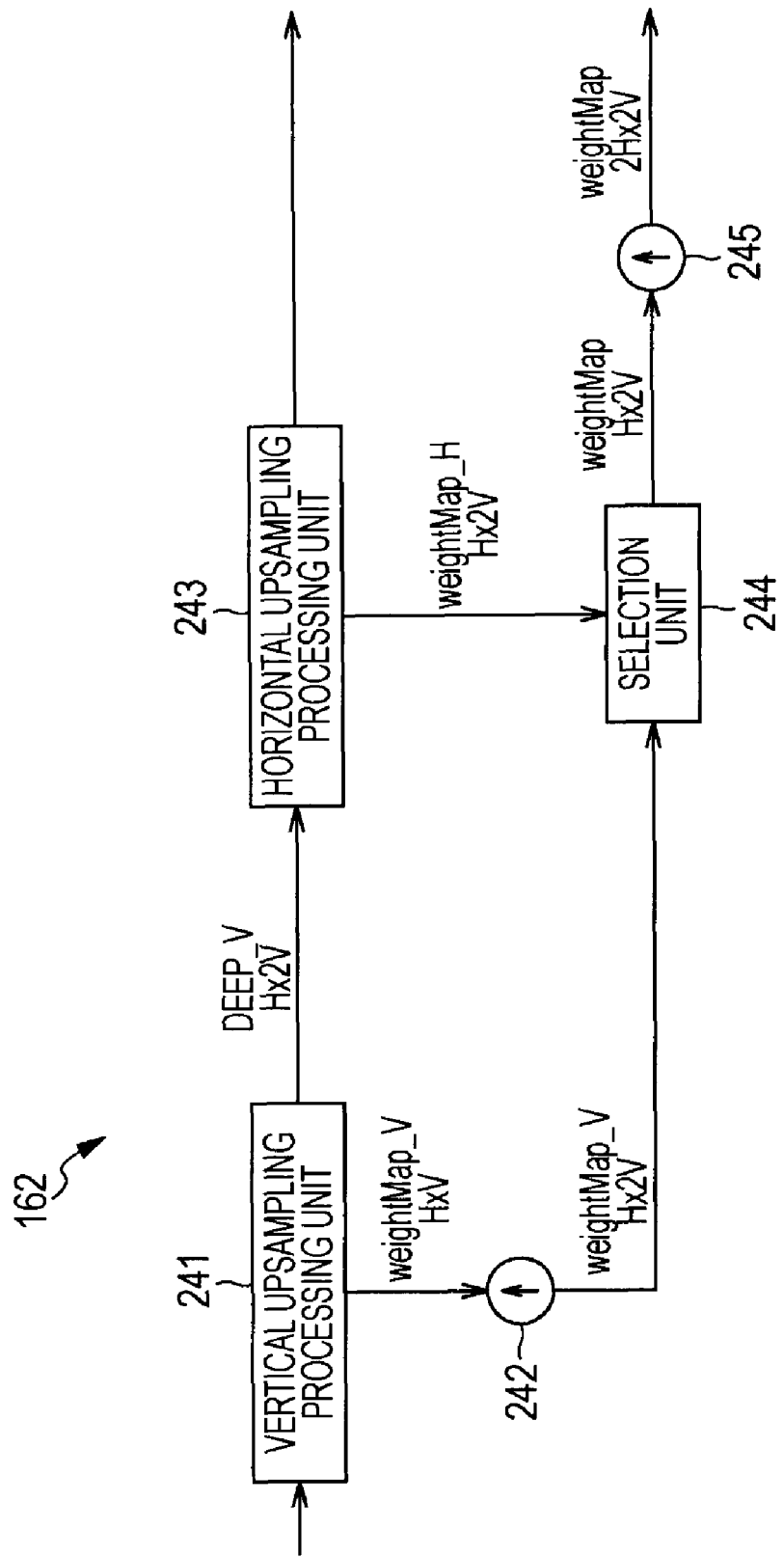
FIG. 15 illustrates an exemplary configuration of a diagonal interpolation processing unit.

Furthermore, more specifically, the diagonal interpolation processing unit 162 shown in FIG. 13 is configured as shown in FIG. 15. That is, the diagonal interpolation processing unit 162 includes a vertical upsampling processing unit 241, an upsampling unit 242, a horizontal upsampling processing unit 243, a selection unit 244, and an upsampling unit 245.

The vertical upsampling processing unit 241 detects the direction of an edge in each area of the supplied input image. The vertical upsampling processing unit 241 then upsamples the input image in a predetermined direction (hereinafter referred to as a "vertical direction" or "y direction") through an interpolation process using pixels arranged in the direction. The vertical upsampling processing unit 241 supplies the upsampled input image to the horizontal upsampling processing unit 243. The vertical upsampling processing unit 241 further supplies a weight map obtained through the upsampling processing to the upsampling unit 242.

The upsampling unit 242 upsamples the weight map supplied from the vertical upsampling processing unit 241 in the vertical direction and supplies the weight map to the selection unit 244.

The horizontal upsampling processing unit 243 detects the direction of an edge in each area of the supplied input image supplied from the vertical upsampling processing unit 241. The horizontal upsampling processing unit 243 then upsamples the input image in a direction perpendicular to the vertical direction (hereinafter referred to as a "horizontal direction" or "x direction") through an interpolation process using pixels arranged in the direction. The horizontal upsampling processing unit 243 supplies the upsampled input image to the multiplier unit 166 as an enhancement image. The horizontal upsampling processing unit 243 further supplies a weight map obtained through the upsampling processing to the selection unit 244.

The selection unit 244 selects a smaller one of the pixel value of a pixel of the weight map supplied from the upsampling unit 242 and the pixel value of a corresponding pixel of the weight map supplied from the horizontal upsampling processing unit 243 and generates a weight map formed from pixels having the selected pixel values. The selection unit 244 then supplies the generated weight map to the upsampling unit 245. The upsampling unit 245 upsamples the weight map supplied from the selection unit 244 in the horizontal direction. Thereafter, the upsampling unit 245 supplies the resultant weight map to the multiplier unit 171 as a final weight map.

Figure 16:
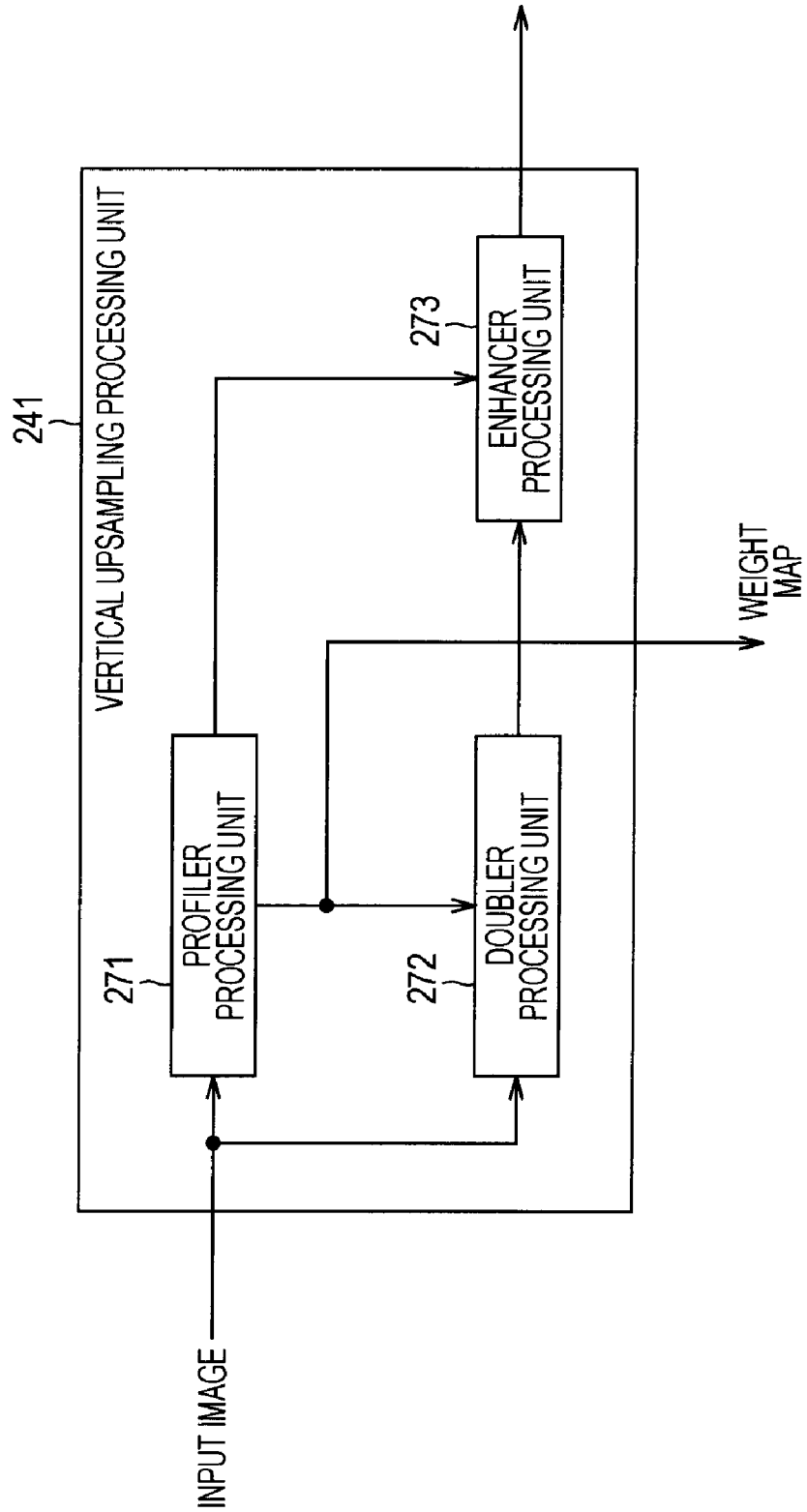
FIG. 16 illustrates an exemplary configuration of a vertical upsampling processing unit.

Furthermore, more specifically, the vertical upsampling processing unit 241 is configured as shown in FIG. 16. That is, the vertical upsampling processing unit 241 includes a profiler processing unit 271, a doubler processing unit 272, and an enhancer processing unit 273. The input image supplied to the diagonal interpolation processing unit 162 is supplied to the profiler processing unit 271 and the doubler processing unit 272.

The profiler processing unit 271 generates a weight map on the basis of the supplied input image and supplies the generated weight map to the doubler processing unit 272 and the upsampling unit 242. In addition, the profiler processing unit 271 generates, using the supplied input image, edge strength information representing the weights based on the edge strengths in individual areas of the input image and texture strength information representing the weights based on the strengths of texture components in individual areas of the input image.

As used herein, the term "texture component" refers to one of pixels forming a texture area in which the pixel value varies to a certain degree (as in a pattern formed on the surface of an object), but a variation in the pixel value is smaller than that of an edge area in which the pixel value abruptly varies. The profiler processing unit 271 supplies the generated edge strength information and texture strength information to the enhancer processing unit 273.

The doubler processing unit 272 upsamples the supplied input image in the vertical direction using the weight map supplied from the profiler processing unit 271 and supplies the input image to the enhancer processing unit 273.

The enhancer processing unit 273 performs an edge and texture enhancement process on the input image supplied from the doubler processing unit 272 using the edge strength information and the texture strength information supplied from the profiler processing unit 271. The enhancer processing unit 273 then supplies the resultant input image to the horizontal upsampling processing unit 243.

Figure 17:
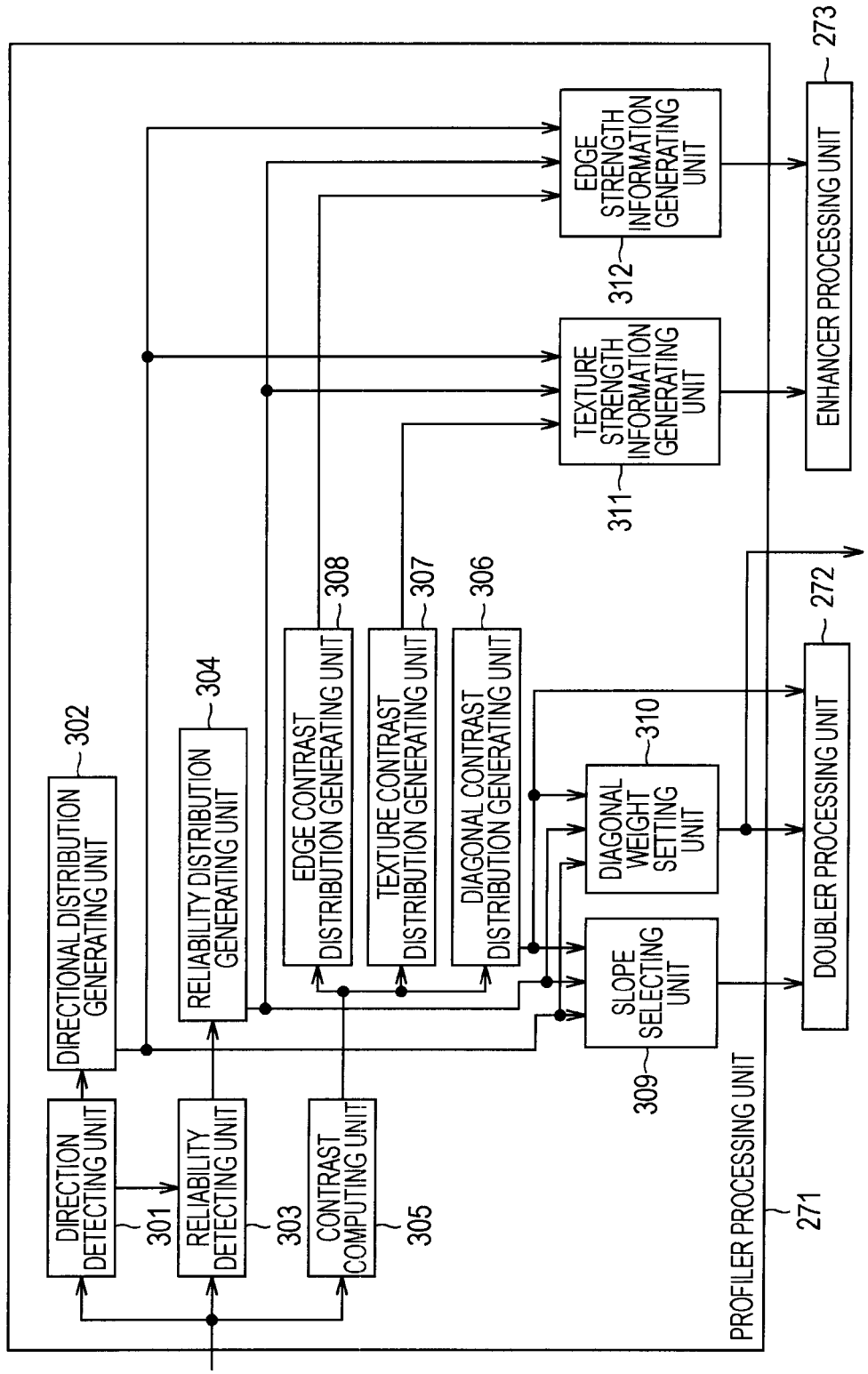
FIG. 17 illustrates an exemplary configuration of a profiler processing unit.
Figure 18:
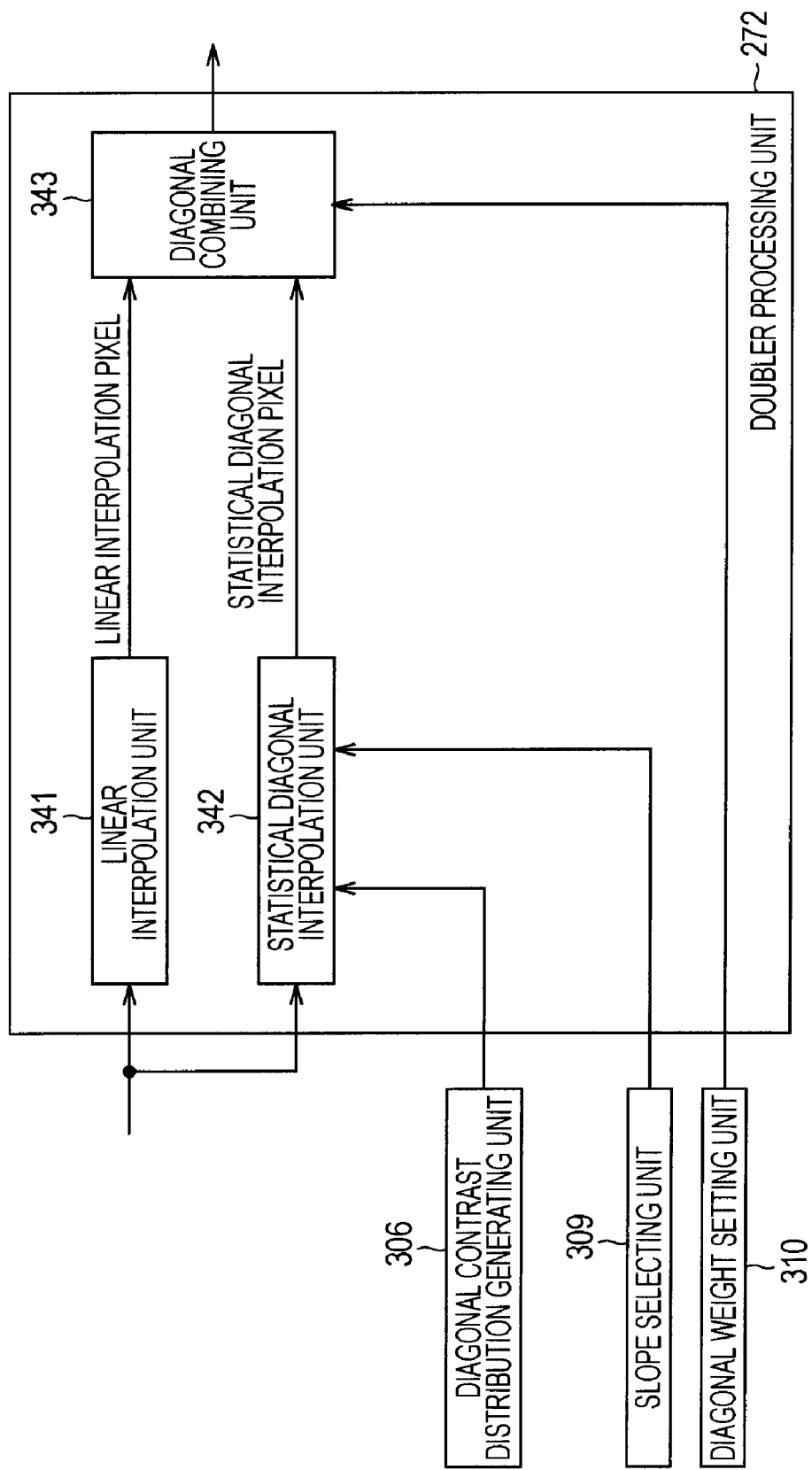
FIG. 18 illustrates an exemplary configuration of a doubler processing unit.
Figure 19:
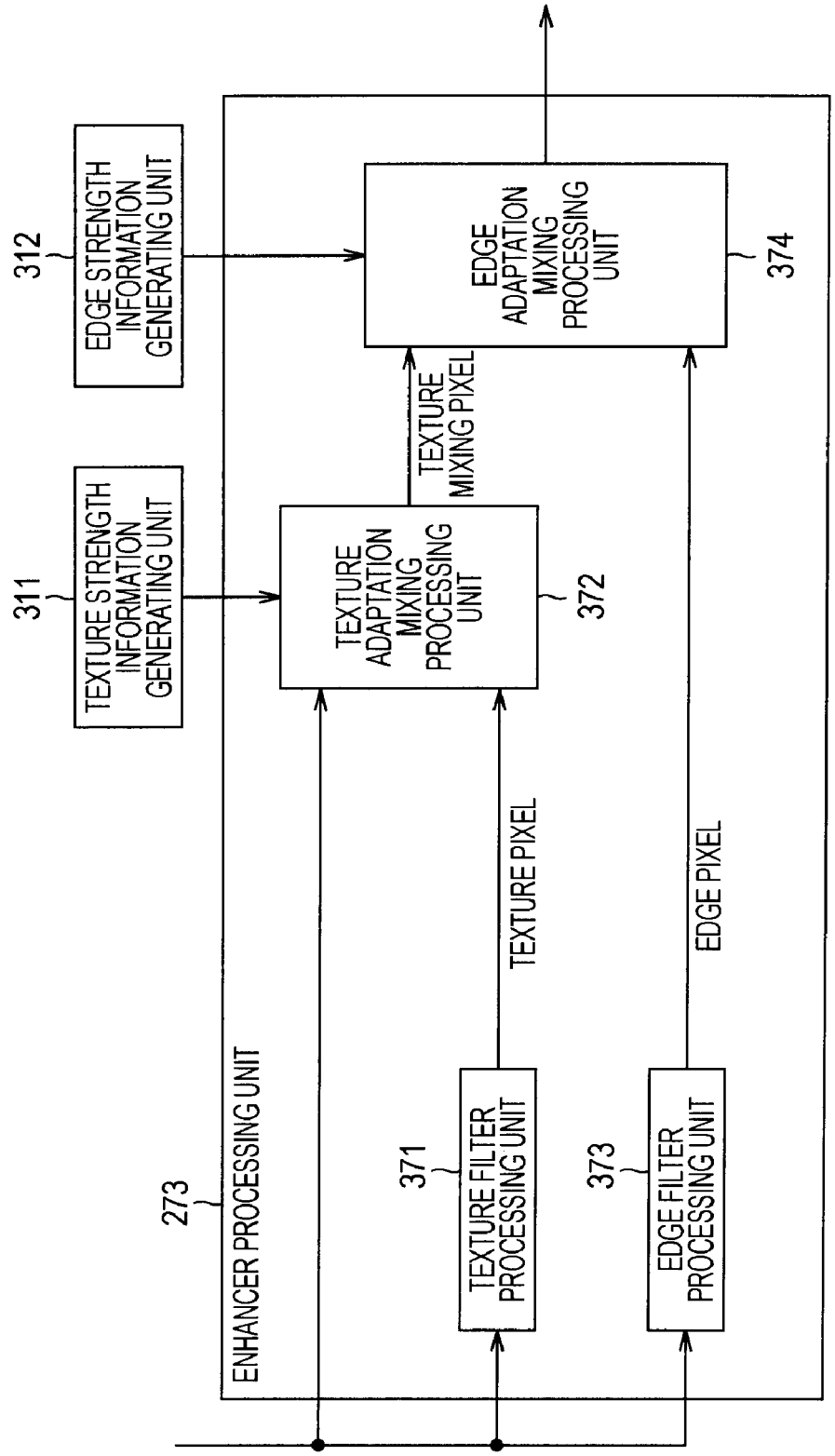
FIG. 19 illustrates an exemplary configuration of an enhancer processing unit.

Furthermore, more specifically, the profiler processing unit 271, the doubler processing unit 272, and the enhancer processing unit 273 of the vertical upsampling processing unit 241 are configured as shown in FIGS. 17 to 19, respectively.

FIG. 17 illustrates an exemplary configuration of the profiler processing unit 271 in detail.

The profiler processing unit 271 includes a direction detecting unit 301, a directional distribution generating unit 302, a reliability detecting unit 303, a reliability distribution generating unit 304, a contrast computing unit 305, a diagonal contrast distribution generating unit 306, a texture contrast distribution generating unit 307, an edge contrast distribution generating unit 308, a slope selecting unit 309, a diagonal weight setting unit 310, a texture strength information generating unit 311, and an edge strength information generating unit 312.

The profiler processing unit 271 sequentially selects, as the pixel of interest, one of pixels to be generated by interpolation (hereinafter referred to as an "interpolation pixel") in the input image to be upsampled in the vertical direction. Thereafter, the profiler processing unit 271 computes a weight map, edge strength information, and texture strength information. Hereinafter, the input image to be upsampled in the vertical direction is also referred to as a "vertically interpolated image".

For the pixel of interest in the vertically interpolated image, the direction detecting unit 301 generates, using the supplied input image, edge direction information indicating the edge direction of an interpolation pixel in a predetermined area at the center of which is the pixel of interest (hereinafter referred to as an "area of interest"). The generated edge direction information is supplied to the directional distribution generating unit 302 and the reliability detecting unit 303.

For each of the pixels of interest, the directional distribution generating unit 302 generates, using the edge direction information supplied from the direction detecting unit 301, a directional distribution including the edge direction information of each of the interpolation pixels in the area of interest. The generated directional distribution is supplied to the slope selecting unit 309, the diagonal weight setting unit 310, the texture strength information generating unit 311, and the edge strength information generating unit 312.

Using the supplied input image and the edge direction information supplied from the direction detecting unit 301, the reliability detecting unit 303 generates reliability information indicating the likelihood of the edge direction indicated by each of the items of edge direction information, that is, the reliability of the edge direction. The reliability detecting unit 303 then supplies the reliability information to the reliability distribution generating unit 304. The reliability distribution generating unit 304 generates, for each of the pixels of interest, the reliability distribution including the reliability information of the interpolation pixels in the area of interest. The generated reliability distribution is supplied to the slope selecting unit 309, the diagonal weight setting unit 310, the texture strength information generating unit 311, and the edge strength information generating unit 312.

The contrast computing unit 305 generates, for each of the pixels of interest in the vertically interpolated image, contrast strength indicating the contrast strength of an interpolation pixel in the area of interest using the supplied input image. The generated contrast strength is supplied to the diagonal contrast distribution generating unit 306, the texture contrast distribution generating unit 307, and the edge contrast distribution generating unit 308.

The diagonal contrast distribution generating unit 306 generates, for each of the pixels of interest, contrast distribution including the weights based on the contrast strengths of the interpolation pixels in the area of interest using the contrast strengths supplied from the contrast computing unit 305. As the contrast strength increases, the value of the contrast distribution increases. The generated contrast distribution is supplied from the diagonal contrast distribution generating unit 306 to the slope selecting unit 309, the diagonal weight setting unit 310, and the doubler processing unit 272.

The texture contrast distribution generating unit 307 generates, for each of the pixels of interest, texture contrast distribution including the weights based on the contrast strengths of the interpolation pixels in the area of interest using the contrast strengths supplied from the contrast computing unit 305. The generated texture contrast distribution is supplied from the texture contrast distribution generating unit 307 to the texture strength information generating unit 311.

The edge contrast distribution generating unit 308 generates, for each of the pixels of interest, edge contrast distribution including the weights based on the contrast strengths of the interpolation pixels in the area of interest using the contrast strengths supplied from the contrast computing unit 305. The generated edge contrast distribution is supplied from the edge contrast distribution generating unit 308 to the edge strength information generating unit 312.

The slope selecting unit 309 generates slope selection information using the directional distribution, the reliability distribution, and the contrast distribution supplied from the directional distribution generating unit 302, the reliability distribution generating unit 304, and the diagonal contrast distribution generating unit 306, respectively. The slope selecting unit 309 then supplies the generated slope selection information to the doubler processing unit 272. The slope selection information represents a direction in which the pixels of the vertically interpolated image (the input image) that are used for generating the interpolation pixels of the vertically interpolated image are arranged.

The diagonal weight setting unit 310 generates a weight map using the directional distribution, the reliability distribution, and the contrast distribution supplied from the directional distribution generating unit 302, the reliability distribution generating unit 304, and the diagonal contrast distribution generating unit 306, respectively. The diagonal weight setting unit 310 then supplies the generated weight map to the doubler processing unit 272 and the upsampling unit 242.

The texture strength information generating unit 311 generates texture strength information using the directional distribution, the reliability distribution, and the texture contrast distribution supplied from the directional distribution generating unit 302, the reliability distribution generating unit 304, and the texture contrast distribution generating unit 307, respectively. The texture strength information generating unit 311 then supplies the generated texture strength information to the enhancer processing unit 273.

The edge strength information generating unit 312 generates edge strength information using the directional distribution, the reliability distribution, and the edge contrast distribution supplied from the directional distribution generating unit 302, the reliability distribution generating unit 304, and the edge contrast distribution generating unit 308, respectively. The edge strength information generating unit 312 then supplies the generated edge strength information to the enhancer processing unit 273.

FIG. 18 illustrates an exemplary configuration of the doubler processing unit 272 shown in FIG. 16 in detail.

The doubler processing unit 272 includes a linear interpolation unit 341, a statistical diagonal interpolation unit 342, and a diagonal combining unit 343.

The linear interpolation unit 341 computes each of the interpolation pixels of the vertically interpolated image (hereinafter also referred to as a "linear interpolation pixel") by linearly interpolating the supplied input image in the vertical direction. The linear interpolation unit 341 then supplies the obtained interpolation pixels and the input image to the diagonal combining unit 343.

The statistical diagonal interpolation unit 342 computes each of the interpolation pixels of the vertically interpolated image using the contrast distribution supplied from the diagonal contrast distribution generating unit 306 and a pixel identified by the slope selection information supplied from the slope selecting unit 309. The statistical diagonal interpolation unit 342 supplies the interpolation pixels to the diagonal combining unit 343. Hereinafter, the interpolation pixel computed by the statistical diagonal interpolation unit 342 is also referred to as a "statistical diagonal interpolation pixel".

The diagonal combining unit 343 combines the linear interpolation pixels supplied from the linear interpolation unit 341 with the statistical diagonal interpolation pixels supplied from the statistical diagonal interpolation unit 342 using the weight map supplied from the diagonal weight setting unit 310. In this way, the diagonal combining unit 343 computes the pixel values of the interpolation pixels of the vertically interpolated image. In addition, the diagonal combining unit 343 generates the vertically interpolated image using the obtained interpolation pixels and the input image supplied from the linear interpolation unit 341. The diagonal combining unit 343 then supplies the generated vertically interpolated image to the enhancer processing unit 273.

FIG. 19 illustrates an exemplary configuration of the enhancer processing unit 273 shown in FIG. 16 in detail.

The enhancer processing unit 273 includes a texture filter processing unit 371, a texture adaptation mixing processing unit 372, an edge filter processing unit 373, and an edge adaptation mixing processing unit 374.

The texture filter processing unit 371 performs texture filter processing on the vertically interpolated image supplied from the diagonal combining unit 343. The texture filter processing is aimed to be performed mainly on a texture area. The texture filter processing unit 371 then supplies the vertically interpolated image to the texture adaptation mixing processing unit 372.

The texture adaptation mixing processing unit 372 mixes the vertically interpolated image supplied from the diagonal combining unit 343 with the vertically interpolated image supplied from the texture filter processing unit 371 using the texture strength information supplied from the texture strength information generating unit 311. The texture adaptation mixing processing unit 372 then supplies the image obtained through the mixture (hereinafter also referred to as a "texture mixing image") to the edge adaptation mixing processing unit 374.

The edge filter processing unit 373 performs edge filter processing on the vertically interpolated image supplied from the diagonal combining unit 343. The edge filter processing is aimed to be performed mainly on an edge area. The edge filter processing unit 373 then supplies the vertically interpolated image to the edge adaptation mixing processing unit 374.

The edge adaptation mixing processing unit 374 mixes the texture mixing image supplied from the texture adaptation mixing processing unit 372 with the vertically interpolated image supplied from the edge filter processing unit 373 using the edge strength information supplied from the edge strength information generating unit 312. The edge adaptation mixing processing unit 374 then supplies the image obtained through the mixture to the horizontal upsampling processing unit 243 as a final vertically interpolated image.

Note that the detailed configuration of the horizontal upsampling processing unit 243 shown in FIG. 15 is similar to the configuration of the vertical upsampling processing unit 241 shown in FIGS. 16 to 19. Accordingly, the drawings and the descriptions of the horizontal upsampling processing unit 243 are not repeated. However, unlike the vertical upsampling processing unit 241 in which the input image is processed in the vertical direction, the input image (the vertically interpolated image) is processed in the horizontal direction, and pixels of the input image are interpolated in the horizontal direction.

Operation Performed by Image Converting Apparatus

An exemplary image conversion process performed by the image converting apparatus 151 shown in FIG. 13 is described next with reference to the flowchart shown in FIG.

20. The image conversion process is performed each time an input image for one frame is supplied to the image converting apparatus 151.

In step S111, the super-resolution processing unit 161 performs super-resolution processing on the supplied input image and generates an SR image. The super-resolution processing unit 161 then supplies the SR image generated through the super-resolution processing to the multiplier unit 164. The super-resolution processing unit 161 further supplies a motion mask generated through the super-resolution processing to the selection unit 172.

In step S112, the diagonal interpolation processing unit 162 performs a diagonal interpolation process on the supplied input image and generates an enhancement image. The diagonal interpolation processing unit 162 then supplies the enhancement image generated through the diagonal interpolation process to the multiplier unit 166. The diagonal interpolation processing unit 162 further supplies a weight map generated through the diagonal interpolation process to the multiplier unit 171. Note that the super-resolution process and the diagonal interpolation process are described in more detail below.

For example, in the image conversion process, an input image having H pixels in the horizontal direction and V pixels in the vertical direction is converted into an output image having 2H pixels in the horizontal direction and 2V pixels in the vertical direction. In such a case, each of the motion mask and the weight map is information including 2H pixels in the horizontal direction and 2V pixels in the vertical direction. Hereinafter, an example in which an input image is converted into an image having a double number of pixels (a double resolution) in each of the horizontal direction and the vertical direction is described.

In step S113, the map generating unit 163 generates an alpha map using the motion mask supplied from the motion mask generating unit 203 of the super-resolution processing unit 161 and the weight map supplied from the upsampling unit 245 of the diagonal interpolation processing unit 162.

That is, the multiplier unit 171 multiplies the pixel value of each of the pixels of the supplied weight map by a value "8" and supplies the resultant weight map to the selection unit 172.

The selection unit 172 sequentially selects one of the pixels of the alpha map to be generated from now as a pixel of interest and computes the pixel value of the pixel of interest using the motion mask supplied from the super-resolution processing unit 161 and the weight map supplied from the multiplier unit 171. In this way, the multiplier unit 171 generates the alpha map.

For example, the selection unit 172 selects, as the pixel value of the pixel of interest, a smaller one of the pixel value of a pixel of the motion mask located at a position the same as that of the pixel of interest and the pixel value of a pixel of the weight map located at a position the same as that of the pixel of interest.

In order to further increase the image quality of the output image obtained by mixing the SR image and the enhancement image, it is necessary that the weight for the image obtained through one of the super-resolution processing and the diagonal interpolation process having a higher effect be increased more.

Here, the pixel values of the pixels of the alpha map represent weights multiplied by the SR image. Accordingly, the pixel values of the pixels of the alpha map can be set in such a manner that an area having a higher effect of the super-resolution processing has larger pixel values of the pixels of the alpha map.

For example, the super-resolution processing has an advantage in that a high-frequency signal component of the original image can be restored. However, as illustrated in FIG. 12, the super-resolution processing has a disadvantage in that it has little effect on the area that includes local movement of an image, such as the area R11 shown in FIG. 12.

The reason is as follows. In the super-resolution processing, an SR image is obtained through estimation using motion compensation. However, the accuracy of motion compensation in the super-resolution processing is not so high. Accordingly, it is difficult to increase the image quality of the SR image by overlapping images having different capture times. In the super-resolution processing, only an advantage the same as that of upsampling can be provided for an area including local movement.

In contrast, the diagonal interpolation process has an advantage in that an area in which jaggies of a diagonal line tend to occur, such as the area R12 shown in FIG. 12, that is, a diagonal edge area can be sharply reproduced. However, the diagonal interpolation process has a disadvantage in that it is unable to reproduce the original frequency component of the image. For example, if the image contains a pattern different from the original pattern to be displayed (e.g., moirés), the pattern, such as moirés, is enhanced and, therefore, the image quality is decreased.

In addition, in the diagonal interpolation process, only an image in a currently processed frame is used. That is, the use of images having different capture times is not necessary. Accordingly, the diagonal interpolation process is effective for even an area including local movement of an image. Thus, the image quality is not decreased.

As described above, an area including local movement and having a large error of motion compensation, that is, an area in which the pixel values of pixels of the motion mask are small is an area in which the effect of the super-resolution processing is small. In addition, an area including a diagonal edge, that is, an area in which the pixel values of pixels of the weight map are small is an area in which the effect of the diagonal interpolation process is large.

Therefore, the selection unit 172 selects a smaller one of the pixel value of the motion mask and the pixel value of the weight map as the pixel value of the alpha map.

For example, when both the pixel values of the motion mask and the weight map are relatively large, the pixel value of the alpha map is large and, therefore, the contribution factor of the SR image to generation of an output image is large. In this case, since the pixel value of the motion mask is relatively large, a sufficient effect of the super-resolution processing can be obtained. Accordingly, the image quality of the output image can be increased.

In contrast, if the pixel value of the motion mask is not so large and is less than the pixel value of the weight map, the pixel value of the motion mask is used as the pixel value of the alpha map. Thus, the contribution factor of the SR image to generation of an output image is small. In this case, it is highly likely that the diagonal interpolation process can provide a greater effect than the super-resolution processing. Accordingly, by increasing the contribution factor of the enhancement image to generation of an output image, the image quality of the output image can be increased.

Furthermore, if the pixel value of the weight map is not so large and is less than the pixel value of the motion mask, the pixel value of the weight map is used as the pixel value of the alpha map. Thus, the contribution factor of the SR image to generation of an output image is small. In this case, it is highly likely that the diagonal interpolation process can provide a sufficient effect, since the pixel value of the weight map is small. Accordingly, by increasing the contribution factor of the enhancement image to generation of an output image, the image quality of the output image can be increased.

As described above, the pixel value of the alpha map is decreased as the pixel value of the motion mask is decreased, that is, as the accuracy of estimation through motion compensation in the super-resolution processing is decreased. In addition, the pixel value of the alpha map is decreased as the pixel value of the weight map is decreased, that is, as the likelihood of the edge direction is higher.

After generating the alpha map in this manner, the selection unit 172 supplies the generated alpha map to the multiplier unit 164 and the subtracter unit 165. Thereafter, the processing proceeds to step S114.

In step S114, the units from the multiplier unit 164 to the multiplier unit 168 mix the SR image with the enhancement image and generates an output image. Thus, the image conversion process is completed.

That is, the multiplier unit 164 multiplies the pixel value of a pixel of the SR image supplied from the adder unit 210 of the super-resolution processing unit 161 by the pixel value of a pixel of the alpha map (supplied from the selection unit 172) located at a position the same as that of the pixel. The multiplier unit 164 then supplies the resultant SR image to the adder unit 167.

In addition, the subtracter unit 165 subtracts the pixel value of the original pixel of the alpha map supplied from the selection unit 172 from an input value "128" and uses the resultant value as a new pixel value of the pixel of the alpha map. The subtracter unit 165 then supplies the alpha map to the multiplier unit 166.

The multiplier unit 166 multiplies the pixel value of a pixel of the enhancement image supplied from the horizontal upsampling processing unit 243 of the diagonal interpolation processing unit 162 by the pixel value of a pixel of the alpha map supplied from the subtracter unit 165 located at a position the same as that of the pixel. The multiplier unit 166 then supplies the resultant enhancement image to the adder unit 167.

In addition, the adder unit 167 sums the SR image supplied from the multiplier unit 164 and the enhancement image supplied from the multiplier unit 166 and supplies the resultant image to the multiplier unit 168. That is, the pixel value of each of the pixel of the image obtained from the adder unit 167 represents the sum of the pixel value of a pixel of the SR image located at a position the same as that of the pixel and the pixel value of a pixel of the enhancement image located at a position the same as that of the pixel. The multiplier unit 168 multiplies the pixel value of each of the pixels of the image supplied from the adder unit 167 by an input value "1/128". The multiplier unit 168 then outputs the resultant image as an output image.

Accordingly, let Go(x, y) denote the pixel value of a pixel Go of the output image. Then, in the process performed by the units from the multiplier unit 164 to the multiplier unit 168, the pixel value Go(x, y) is computed using the following equation:

$$Go(x,y)=((\alpha \times Gr)+((128-\alpha) \times Gd))/128 \quad (1)$$

where Gr and Gd denote the pixel values of pixels of the SR image and the enhancement image located at a position the same as that of the pixel Go, and α denotes the pixel value of a pixel of the alpha map located at a position the same as that of the pixel Go.

In addition, the reason why the weight multiplied by the pixel value Gd is defined as a value obtained by subtracting α from 128 and the sum of the pixel values is divided by 128 is that the pixel value α of the alpha map has 128 gradation levels.

In computation using equation (1), the weighted sum of the SR image and the enhancement image is constructed. As the pixel value α of the alpha map serving as a weight increases, the contribution factor of the SR image to generation of an output image increases.

In this way, the image converting apparatus 151 performs a super-resolution process and a diagonal interpolation process on the input image and generates the SR image and the enhancement image. In addition, the image converting apparatus 151 generates the alpha map that increases the contribution factor of the enhancement image to generation of the output image for an area in which the effect of the super-resolution processing is small and the effect of the diagonal interpolation process is large. Thereafter, the image converting apparatus 151 mixes the SR image with the enhancement image using the generated alpha map and generates the output image.

As described above, by mixing the SR image with the enhancement image using the alpha map, an output image including a large number of components of an image obtained through a more effective process can be generated. Thus, the image quality of the output image can be increased. That is, when an output image having a resolution higher than that of an input image is generated from the input image, the image quality can be easily and reliably increased for the entire area of the output image.

Figure 20:
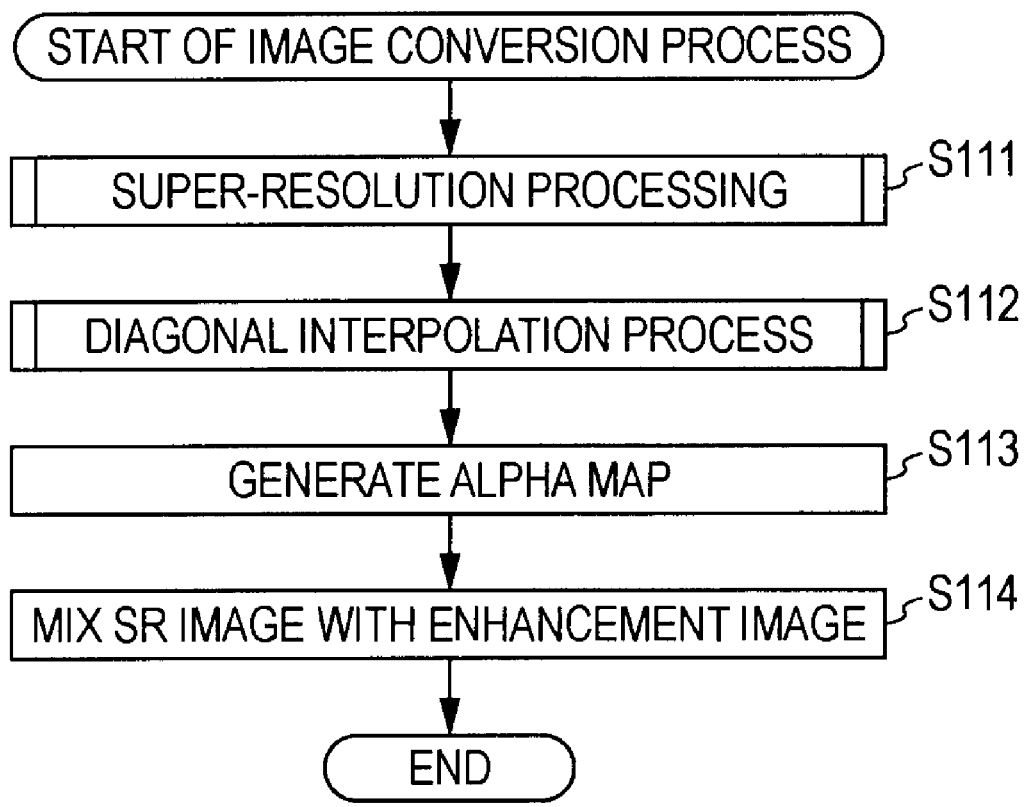
FIG. 20 is a flowchart illustrating an image conversion process.
Figure 21:
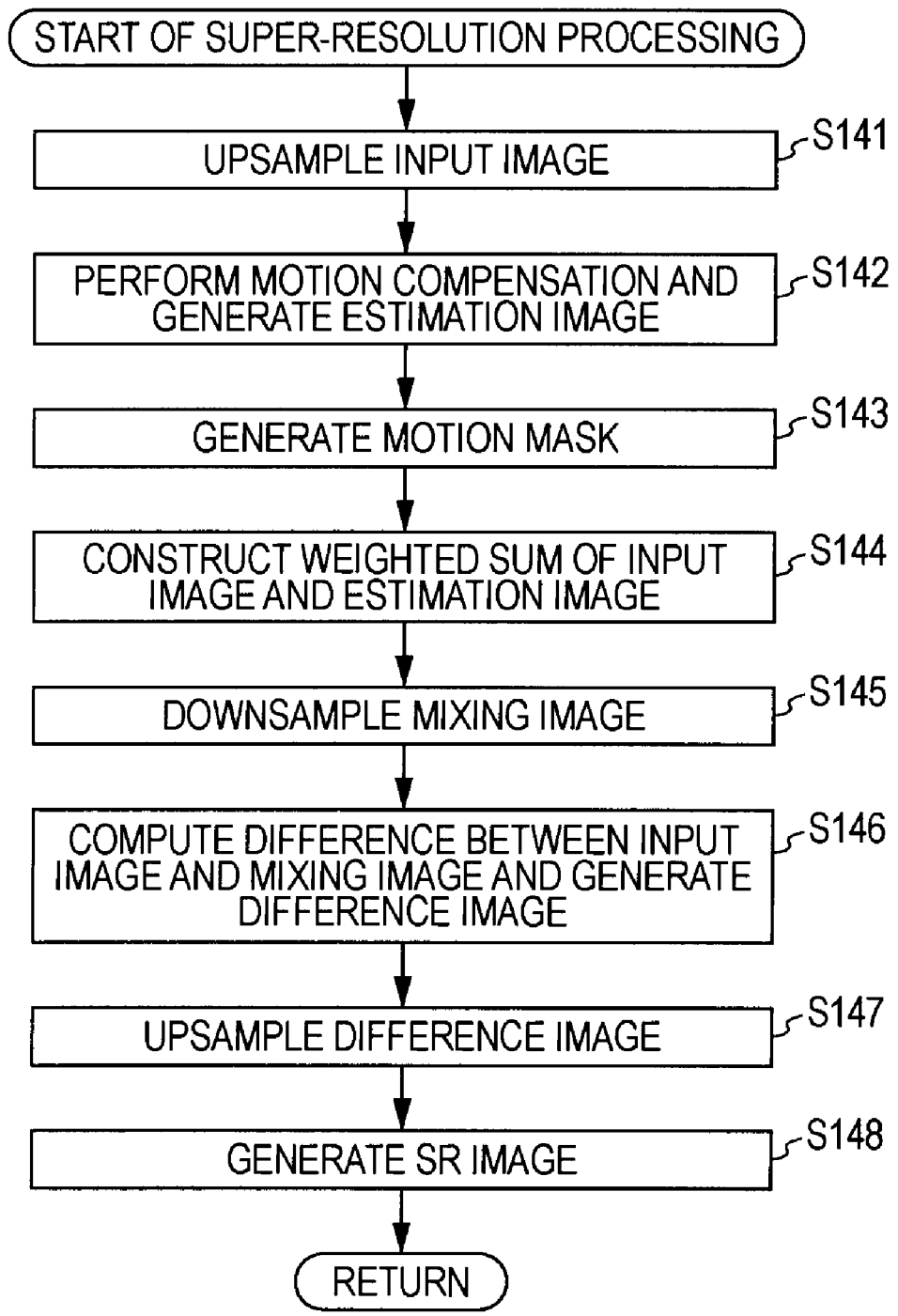
FIG. 21 is a flowchart illustrating a super-resolution process.

The super-resolution processing corresponding to the processing performed in step S111 shown in FIG. 20 is described next with reference to the flowchart shown in FIG. 21.

In step S141, the upsampling unit 201 upsamples a supplied input image so that the input image has a resolution the same as that of an SR image to be generated from now. The upsampling unit 201 then supplies the generated image to the motion compensation unit 202, the motion mask generating unit 203, and the mixing unit 204.

In step S142, the motion compensation unit 202 performs motion compensation on the supplied image and generates an estimation image.

That is, the motion compensation unit 202 obtains a motion vector for the entire SR image using the input image supplied from the upsampling unit 201 and the SR image supplied from the adder unit 210. In addition, the motion compensation unit 202 moves the entire SR image by a distance the same as the size of the motion vector and generates the estimation image. The motion compensation unit 202 then supplies the generated estimation image to the motion mask generating unit 203 and the mixing unit 204.

In step S143, the motion mask generating unit 203 generates a motion mask using the input image supplied from the upsampling unit 201 and the estimation image supplied from the motion compensation unit 202. Thereafter, the motion mask generating unit 203 supplies the generated motion mask to the mixing unit 204 and the selection unit 172.

For example, the motion mask generating unit 203 sequentially selects a pixel of the motion mask to be obtained from now as a pixel of interest. The motion mask generating unit 203 then computes a difference between the pixel value of a pixel of the input image located at a position the same as that of the pixel of interest and the pixel value of a pixel of the estimation image located at a position the same as that of the pixel of interest. Thereafter, the motion mask generating unit 203 assigns a value predetermined in accordance with the difference to the pixel value of the pixel of interest. For example, the pixel value of the pixel of interest is determined so as to be larger as the absolute value of the difference decreases.

Accordingly, in the motion mask, an area having a smaller pixel value of the pixel has a larger difference between the input image and the estimation image and, therefore, has a larger error of estimation obtained through motion compensation. That is, for the area, the accuracy of the estimation is low. In other words, an area of the motion mask including pixels having small pixel values represents an area of the input image in which a subject moves differently from the motion of the entire input image, that is, an area of the subject moving relatively (locally) with respect to the entire image.

In step S144, the mixing unit 204 generates a mixing image by constructing the weighted sum of the estimation image supplied from the motion compensation unit 202 and the input image supplied from the upsampling unit 201 using the motion mask supplied from the motion mask generating unit 203.

For example, the mixing unit 204 sequentially selects a pixel of a mixing image to be obtained from now as a pixel of interest. The mixing unit 204 then computes, using the pixel value of a pixel of the motion mask located at a position the same as that of the pixel of interest, a weight Wi ($0 \leq Wi \leq 1$) of a pixel in the input image located at a position the same as that of the pixel of interest and a weight Wj ($=1-Wi$) of a pixel in the estimation image located at a position the same as that of the pixel of interest.

The mixing unit 204 sums the pixel value of a pixel of the input image located at the same position as that of the pixel of interest and multiplied by the weight Wi and the pixel value of a pixel of the estimation image located at the same position as that of the pixel of interest and multiplied by the weight Wj. The mixing unit 204 then assigns the resultant value to the pixel value of the pixel of interest. Thereafter, by assigning each of the pixels of the mixing image to the pixel of interest and computing the pixel value of the pixel in this manner, the mixing unit 204 generates the mixing image.

Note that, when the weighted sum of the input image and the estimation image is computed, it is constructed in such a manner that, for example, the weight Wi increases as the pixel value of a pixel of the motion mask decreases. This is because, by increasing the contribution factor of the input image to generation of the mixing image for an area in which the pixel values of the pixels of the motion mask are small, that is, an area in which the accuracy of estimation through motion compensation is low, a decrease in the quality of the mixing image can be prevented.

Upon generating the mixing image, the mixing unit 204 supplies the generated mixing image to the downsampling unit 205 and the adder unit 210. Thereafter, the processing proceeds to step S145.

In step S145, the downsampling unit 205 downsamples the mixing image supplied from the mixing unit 204 to an image having a resolution that is the same as that of the input image and supplies the downsampled mixing image to the filter processing unit 206. For example, a mixing image having 2V pixels in the vertical direction and 2H pixels in the horizontal direction is downsampled into an image having V pixels in the vertical direction and H pixels in the horizontal direction.

The filter processing unit 206 performs filter processing on the mixing image supplied from the downsampling unit 205 using a lowpass filter and supplies the mixing image to the subtracter unit 207.

In step S146, the subtracter unit 207 computes a difference between the supplied input image and the mixing image supplied from the filter processing unit 206 and generates a difference image. That is, the pixel value of a pixel of the difference image represents a difference between the pixel value of a pixel of the input image located at a position the same as that of the pixel and the pixel value of a pixel of the mixing image located at a position the same as that of the pixel.

The pixel values of the pixels of the difference image generated in this manner represent the difference between the mixing image generated through estimation using the input image (the SR image) and the actual input image. Accordingly, by correcting the mixing image by the difference, the SR image that is obtained by faithfully magnifying the input image, that is, the SR image including the original waveform of the input image can be obtained. The subtracter unit 207 supplies the generated difference image to the upsampling unit 208.

In step S147, the upsampling unit 208 upsamples the difference image supplied from the subtracter unit 207 into an image having a resolution the same as that of the SR image. The upsampling unit 208 then supplies the upsampled difference image to the filter processing unit 209. The filter processing unit 209 performs filter processing on the difference image supplied from the upsampling unit 208 using a highpass filter and supplies the difference image to the adder unit 210.

In step S148, the adder unit 210 sums the mixing image supplied from the mixing unit 204 and the difference image supplied from the filter processing unit 209 and generates an SR image for the currently processed frame. The adder unit 210 then supplies the generated SR image to the motion compensation unit 202 and the multiplier unit 164. Thereafter, the super-resolution processing is completed. After the super-resolution processing is completed, the processing proceeds to step S112 shown in FIG. 20.

In this way, the super-resolution processing unit 161 performs super-resolution processing on the input image so that the input image is converted into the SR image. By converting an input image into an SR image using super-resolution processing in this manner, the SR image having a higher resolution and a restored original high-frequency component can be obtained.

The diagonal interpolation process corresponding to the process performed in step S112 shown in FIG. 20 is described next with reference to the flowchart shown in FIG. 22.

In step S171, the profiler processing unit 271 of the vertical upsampling processing unit 241 performs vertical direction profiler processing using the supplied input image.

Figure 22:
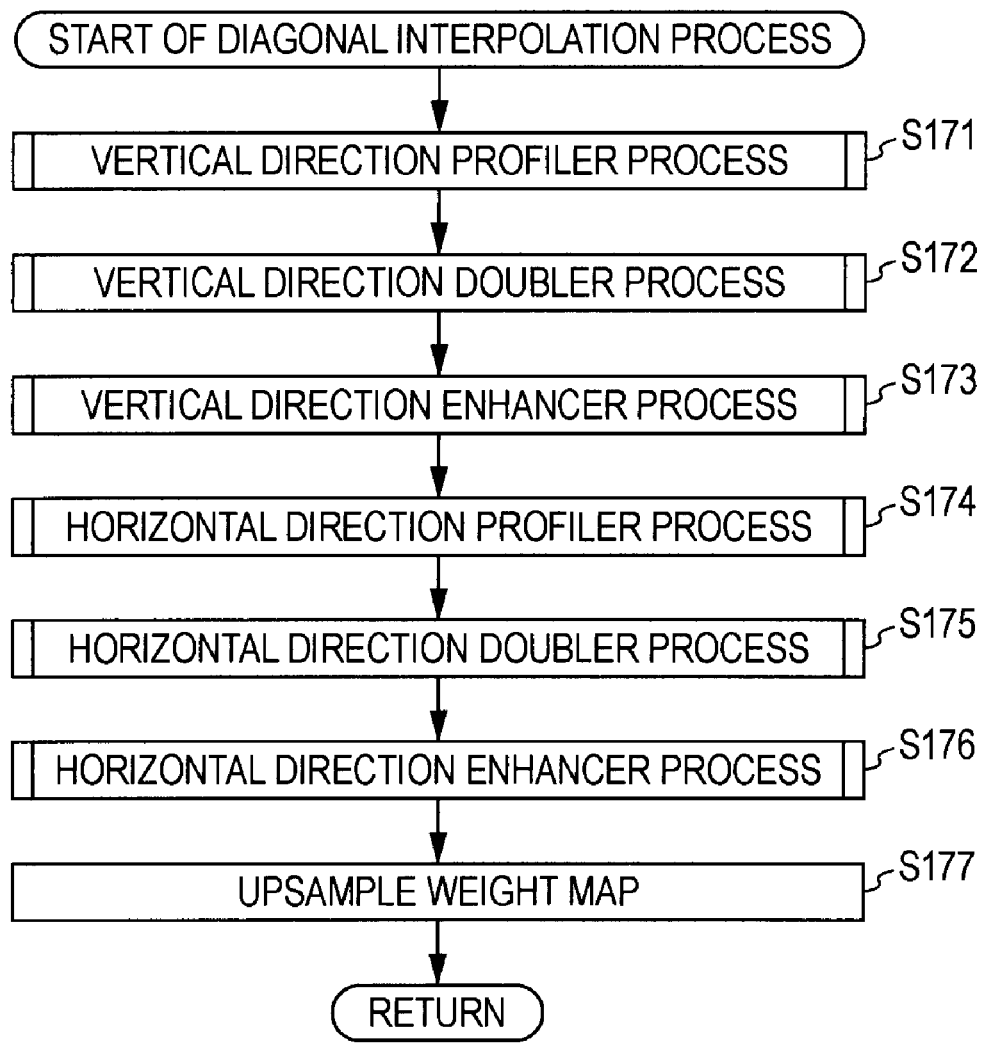
FIG. 22 is a flowchart illustrating a diagonal interpolation process.

The vertical direction profiler processing corresponding to the processing performed in step S171 shown in FIG. 22 is described next with reference to the flowchart shown in FIGS. 23 and 24.

In step S201, the profiler processing unit 271 sets a pixel of interest and an area of interest.

More specifically, when converting the input image having V pixels in the vertical direction and H pixels in the horizontal direction into a vertically interpolated image having 2V pixels in the vertical direction and H pixels in the horizontal direction, the profiler processing unit 271 selects, as the interpolation pixels, pixels to be added to the input image through interpolation. Thereafter, the profiler processing unit 271 further selects one of the interpolation pixels that has not yet been selected as a pixel of interest and uses the selected pixel as the pixel of interest.

In addition, the profiler processing unit 271 selects, from the vertically interpolated image, a predetermined area at the center of which is the pixel of interest as an area of interest. For example, the profiler processing unit 271 selects an area having Mt pixels in the vertical direction and Nt pixels in the horizontal direction as the area of interest. Note that Mt and Nt are variable.

Figure 25:
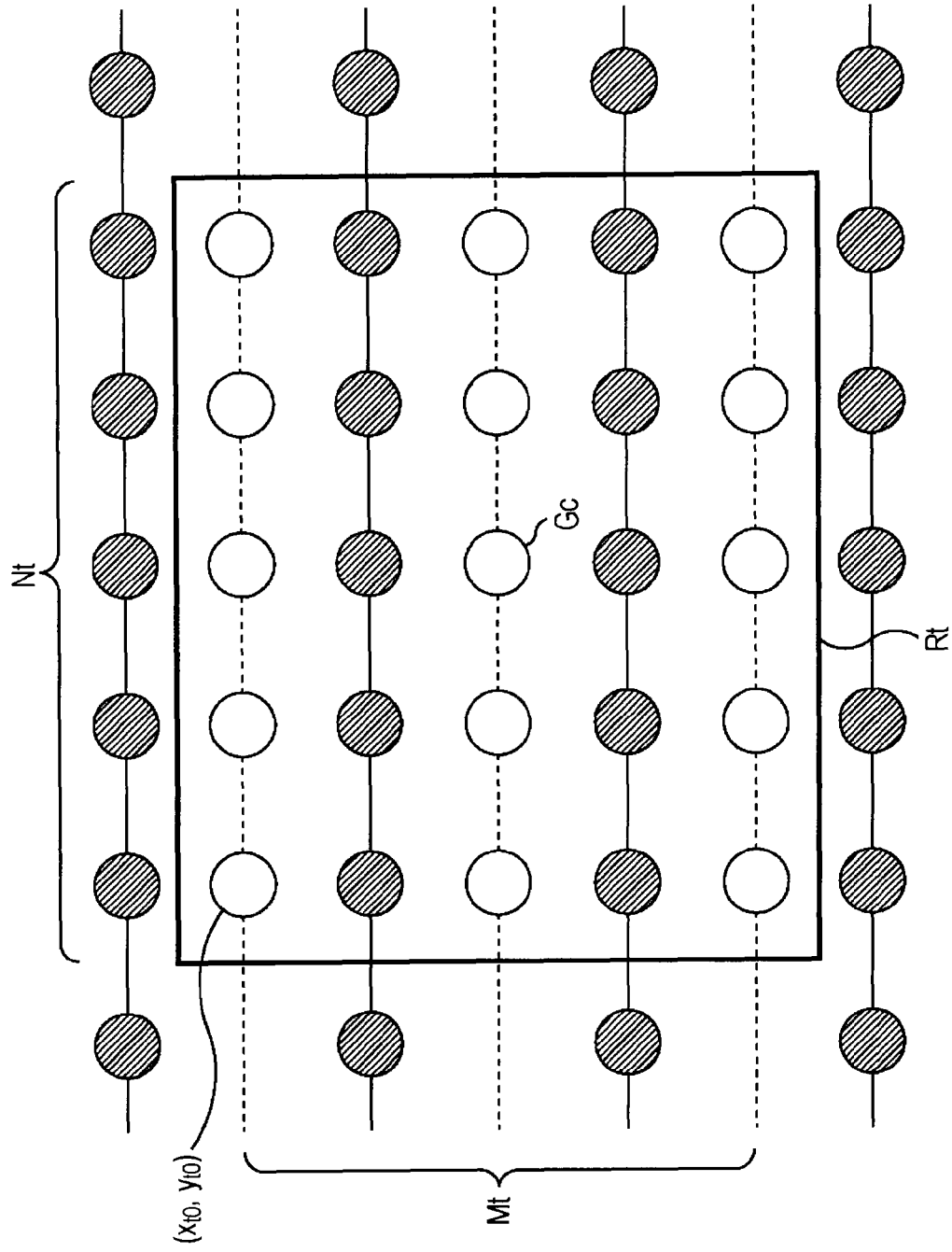
FIG. 25 illustrates an example of an area of interest.

For example, as shown in FIG. 25, the area of interest is set to an area at the center of which is a pixel of interest Gc. Note that, in FIG. 25, the longitudinal direction represents the vertical direction (the y direction), and the lateral direction represents the horizontal direction (the x direction).

In addition, a circle having cross-hatchings represents a pixel that is not an interpolation pixel in the vertically interpolated image, that is, the original pixel of the input image (hereinafter referred to as a "real pixel"). A circle without cross-hatchings represents an interpolation pixel. The solid lines extending in the horizontal direction represent horizontal rows including real pixels (hereinafter referred to as "real rows"). The dotted lines extending in the horizontal direction represent horizontal rows including interpolation pixels (hereinafter referred to as "interpolation rows").

In the example shown in FIG. 25, an area Rt including the pixel of interest Gc at the center thereof and having 5 pixels in the vertical direction (Mt=5) and 5 pixels in the horizontal direction (Nt=5) is selected as the area of interest. In the following description, an example in which Mt=5 and Nt=5 is used where appropriate.

In addition, in the following description, a direction corresponding to the vertical direction (the y-direction) of each image processed by the diagonal interpolation processing unit 162, that is, the downward direction in FIG. 25 is defined as a positive direction. Hereinafter, the y-direction is also referred to as a "y-axis direction" where appropriate. Similarly, a direction corresponding to the horizontal right direction (the x-direction) of each image processed by the diagonal interpolation processing unit 162, that is, the right direction in FIG. 25 is defined as a positive direction. Hereinafter, the x-direction is also referred to as an "x-axis direction" where appropriate.

Furthermore, in the following description, the coordinates of a pixel in an xy coordinate system including axes in the x direction and the y direction is denoted as "(x, y)". The coordinates of an interpolation pixel at the upper left corner of the area of interest in FIG. 25 is denoted as "$(x_{r0}, y_{r0})$".

Figure 23:
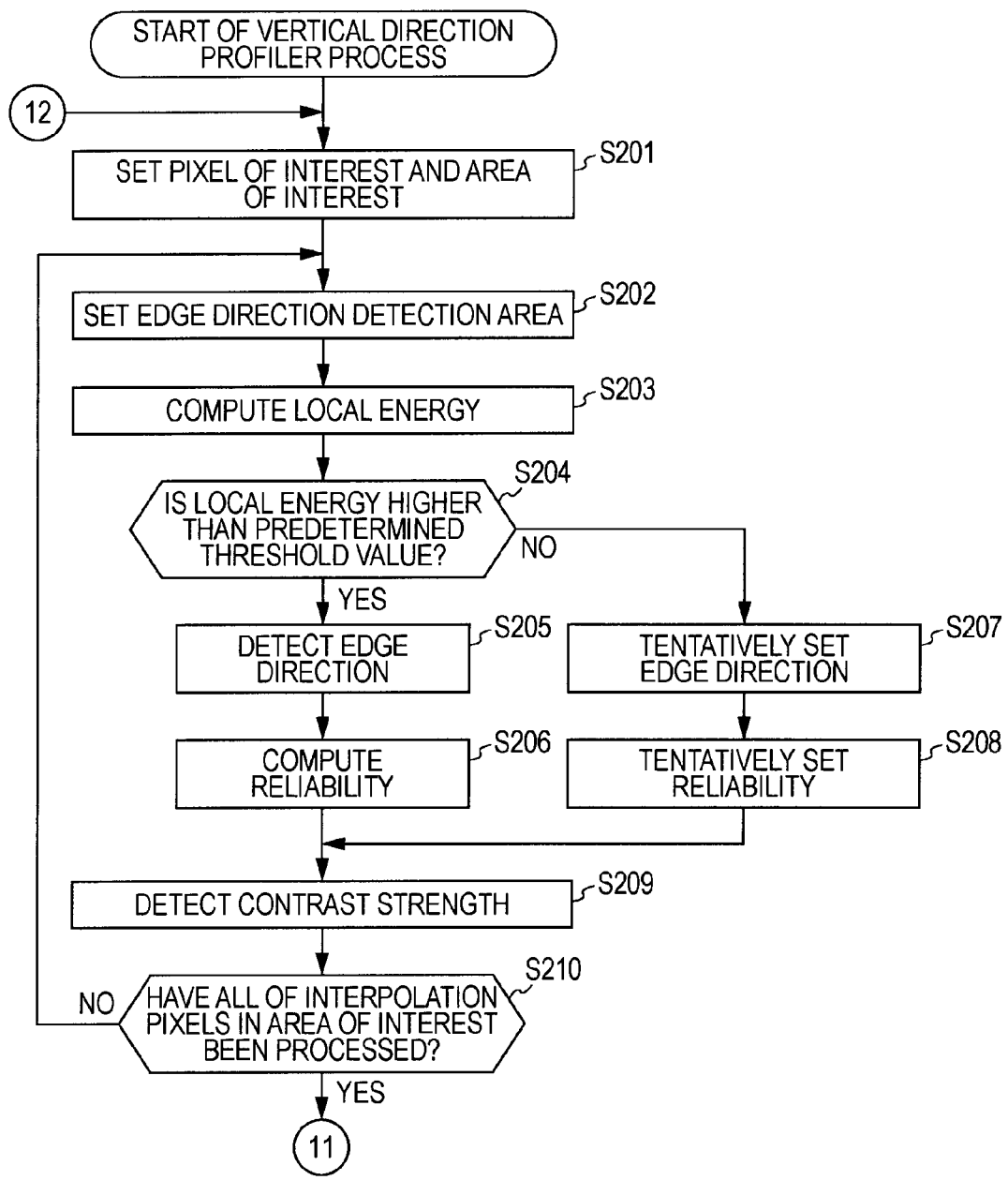
FIG. 23 is a flowchart illustrating a vertical direction profiler process.
Figure 24:
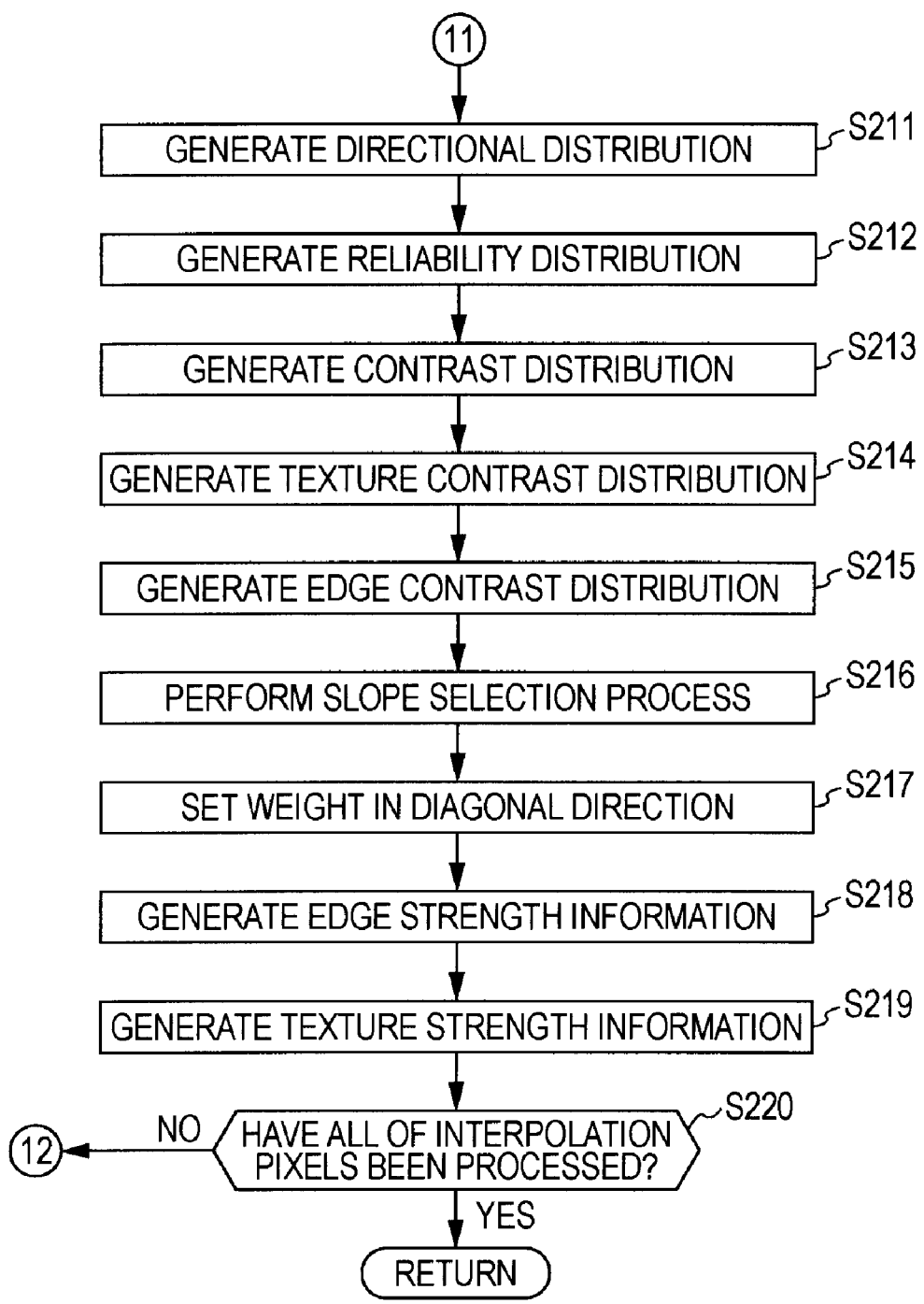
FIG. 24 is a continuation of the flowchart of FIG. 23.

Referring back to the flowchart shown in FIG. 23, in step S202, the direction detecting unit 301 sets an edge direction detection area. More specifically, the profiler processing unit 271 selects, from the interpolation pixels in the area of interest, one of the interpolation pixels that has not yet been selected as a pixel of interest. Hereinafter, the selected interpolation pixel (an interpolation pixel of interest) is referred to as an "edge direction detection pixel".

The direction detecting unit 301 extracts, from the pixels in the real row adjacent to the edge direction detection pixel in the negative vertical direction, Nd real pixels at the center of which is a pixel adjacent to the edge direction detection pixel in the vertical direction. In addition, the direction detecting unit 301 extracts, from the pixels in the real row adjacent to the edge direction detection pixel in the positive vertical direction, Nd real pixels at the center of which is a pixel adjacent to the edge direction detection pixel in the vertical direction. Note that Nd is variable.

The direction detecting unit 301 sequentially generates a virtual pixel to be present between a pair of the extracted real pixels in the horizontal direction and inserts the virtual pixel between the pair of real pixels. Note that the pixel value of the generated virtual pixel is the average of the pixel values of two real pixels adjacent to the virtual pixel in the horizontal direction. Thereafter, the direction detecting unit 301 defines an area including the edge direction detection pixel, the extracted real pixels, and the virtual pixels, each being inserted between a pair of the real pixels, as an edge direction detection area.

Figure 26:
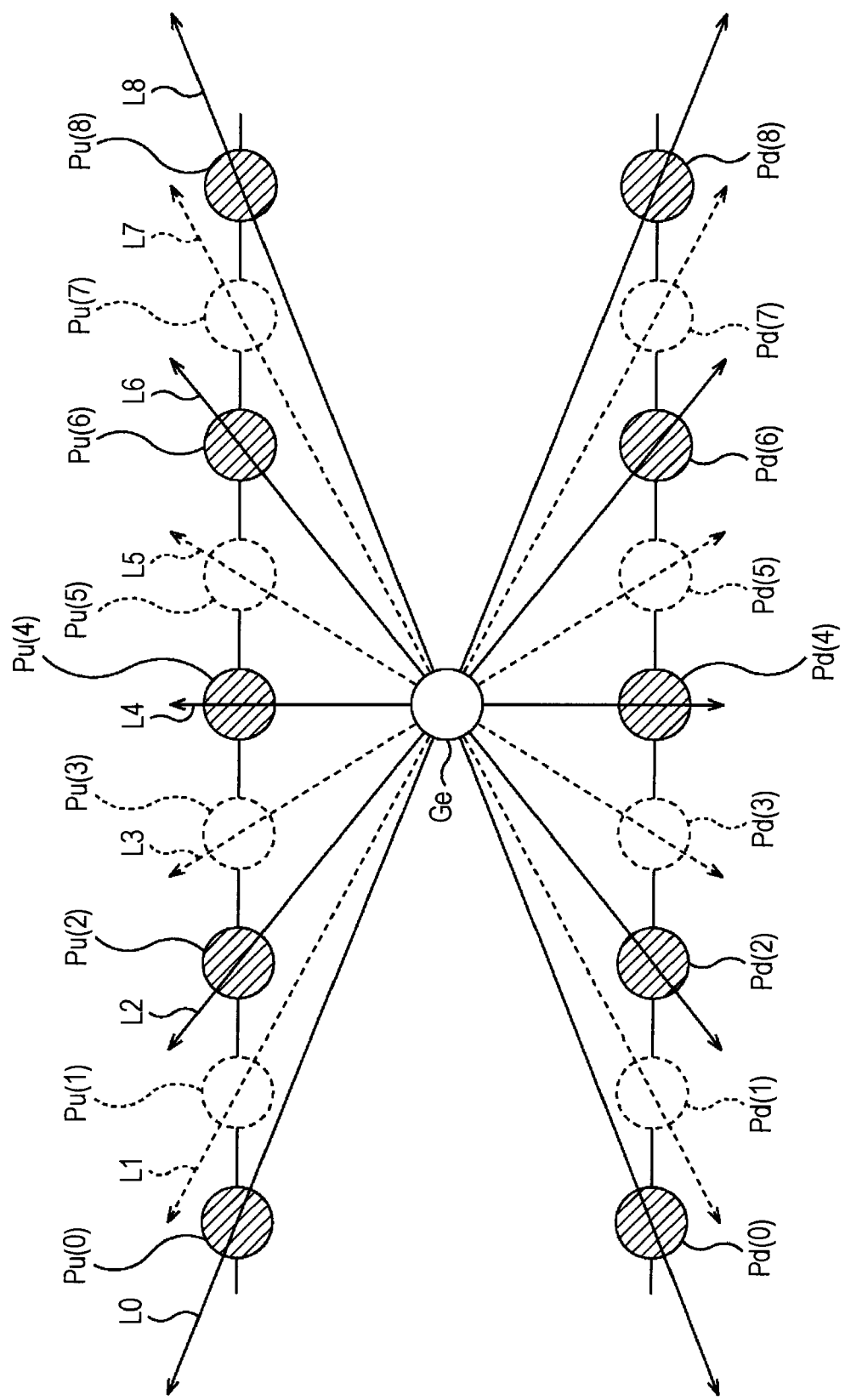
FIG. 26 illustrates an example of an edge direction detection area.

For example, as shown in FIG. 26, when Nd=5, an area having an edge direction detection pixel Ge at the center thereof and including several pixels in the vertically interpolated image is defined as the edge direction detection area. Note that, in FIG. 26, a circle with cross-hatchings represents a real pixel, and a circle shown with a dotted line represents a virtual pixel.

In the example shown in FIG. 26, the area including five real pixels in each of two real rows adjacent to the edge direction detection pixel Ge in the upward direction and the downward direction and four virtual pixels, each being inserted (interpolated) between a pair of the real pixels, is defined as the edge direction detection area.

In the following description, the pixels in the row adjacent to the edge direction detection pixel Ge in the upward direction are denoted as Pu(i) (i=0, 1, 2, . . . 2Nd−2), and the pixels in the row adjacent to the edge direction detection pixel Ge in the downward direction are denoted as Pd(i) (i=0, 1, 2, . . . 2Nd−2), where the leftmost pixels in the two rows are denoted as Pu(0) and Pd(0), and the rightmost pixels in the two rows are denoted as Pu(2Nd−2) and Pd(2Nd−2).

For example, in FIG. 26, Nd=5. Accordingly, the rightmost pixels in the two rows are denoted as Pu(8) and Pd(8). In addition, the pixel value of a pixel Pu(i) is also denoted as Pu(i), and the pixel value of a pixel Pd(i) is also denoted as Pd(i).

In addition, in the following description, a direction of a line extending between two pixels that face each other with the edge direction detection pixel at the center of the line in the edge direction detection area, that is, a direction that passes through two pixels located in the diagonal direction of the edge direction detection pixel is denoted as Ldir (dir=0, 1, 2, . . . 2Nd−2). Note that the variable dir indicates a number (a value) used for identifying a direction.

For example, in FIG. 26, the variable dir for a direction L0 that passes through the pixels Pu(0) and Pd(8) is 0. The variable dir for a direction L1 that passes through the pixels Pu(1) and Pd(7) is 1. In this way, dir is set to one of values between 0 to 8.

Furthermore, in the following description, a direction that passes through the real pixels is referred to as a "real direction", and a direction that passes through the virtual pixels is referred to as a "virtual direction". In the example shown in FIG. 26, the directions L0, L2, L4, L6, and L8 are real directions, and the directions L1, L3, L5, and L7 are virtual directions.

The direction detecting unit 301 further performs a smoothing process on the pixels Pu(i) and Pd(i) in the edge direction detection area using, for example, a lowpass filter and obtains pixels values Pu'(i) and Pd'(i) (i=0, 1, 2, . . . 2Nd−2). Hereinafter, the pixel value of a pixel subjected to the smoothing process is also referred to as a "smoothed pixel value".

More specifically, the direction detecting unit 301 defines the pixel values of pixels of an image generated by smoothening the input image located at positions corresponding to those of the real pixels in the edge direction detection area as smoothed pixel values Pu'(i) and Pd'(i) of the real pixels. The input image is smoothened by limiting the frequency range using, for example, a lowpass filter. Hereinafter, the image generated from the input image through the smoothing process is also referred to as a "smoothed image".

In addition, the direction detecting unit 301 defines the average of the smoothed pixel values of the real pixels adjacent to the virtual image in the edge direction detection area in the horizontal direction as the smoothed pixel values Pu'(i) and Pd'(i) of the virtual pixels.

Referring back to the flowchart shown in FIG. 23, in step S203, the direction detecting unit 301 computes the local energy EL of the edge direction detection area as follows:

$$EL = \Sigma_{(i=0,\ldots Nd-1)}\{Coef\_EL(i) \times |Pu'(2i) - Pd'(2i)|\} \quad (2)$$

That is, the direction detecting unit 301 computes the absolute value of the difference between the smoothed pixel values Pu'(2i) and Pd'(2i) (i=0, 1, 2, . . . Nd−1) of neighboring real pixels in the vertical direction in the edge direction detection area. Thereafter, the direction detecting unit 301 multiplies the obtained absolute value by a predetermined weight Coef_EL(i). In this way, the direction detecting unit 301 computes the sum of the absolute values multiplied by the weights as the local energy EL.

The local energy represents the sum of the absolute differences between the pixel values of pixels in the edge direction detection area. Accordingly, the edge direction detection area including a more noticeable edge has a higher local energy.

In step S204, the direction detecting unit 301 determines whether the local energy is higher than a predetermined threshold value. That is, the direction detecting unit 301 determines whether the edge direction detection area includes a noticeable edge.

If, in step S204, it is determined that the local energy is higher than the predetermined threshold value, the direction detecting unit 301, in step S205, detects the edge direction of the edge direction detection area.

More specifically, in order to obtain an energy E(dir), the direction detecting unit 301 repeats computation of the following equation while incrementing the value of the variable dir that starts from zero by one until the value of the variable dir reaches 2Nd−2:

$$E(dir) = |Pu'(dir) - Pd'(2N-2-dir)| \quad (3)$$

That is, the energy E(dir) represents the absolute value of the difference between the smoothed pixel values of neighboring pixels in the direction Ldir of an edge direction detection pixel indicated by the variable dir.

Subsequently, the direction detecting unit 301 defines the value of the variable dir corresponding to a direction in which the energy E(dir) is maximized as "max_dir". In addition, the direction detecting unit 301 defines the value of the variable dir corresponding to a direction in which the energy E(dir) is minimized among directions tilted from the vertical direction to the left (the left up directions) in FIG. 26 as "left_dir". For example, in the example shown in FIG. 26, the value of the variable dir of a the direction in which the energy E(dir) is minimized among the directions L0 to L4 is defined as left_dir.

Similarly, the direction detecting unit 301 defines the value of the variable dir corresponding to a direction in which the energy E(dir) is minimized among directions tilted from the vertical direction to the right (the right up directions) in FIG. 26 as "right_dir". For example, in the example shown in FIG. 26, the value of the variable dir of a the direction in which the energy E(dir) is minimized among the directions L4 to L8 is defined as right_dir.

In addition, in the following description, the variable dir corresponding to the vertical direction at the center of which is the edge direction detection pixel is referred to as "mid_dir". For example, in the example shown in FIG. 26, the variable dir corresponding to the direction L4 is defined as the mid_dir. Furthermore, hereinafter, the directions corresponding to the variable dir, max_dir, left_dir, right_dir, and mid_dir are referred to as a "direction dir", a "direction max_dir", a "direction left_dir", a "direction right_dir", a direction "mid_dir", respectively.

Subsequently, the direction detecting unit 301 computes an edge direction sel_dir of the edge direction detection pixel.

More specifically, the direction detecting unit 301 defines the angle between the direction max_dir and the direction left_dir, that is, the angle formed from the two directions as angle(max_dir, left_dir), and defines the angle between the direction max_dir and the direction right_dir as angle (max_dir, right_dir).

Thereafter, the direction detecting unit 301 sets the edge direction sel_dir to left_dir (i.e., sel_dir=left_dir) if one of the following conditional expressions (4) to (6) is satisfied:

$$|angle(max\_dir, left\_dir)| > |angle(max\_dir, right\_dir)| \quad (4)$$

$$(|angle(max\_dir, left\_dir)| = |angle(max\_dir, right\_dir)|) \quad (5)$$
$$\wedge (angle(max\_dir, mid\_dir) > 0)$$

$$(|angle(max\_dir, left\_dir)| = |angle(max\_dir, right\_dir)|) \quad (6)$$
$$\wedge (angle(max\_dir, mid\_dir) = 0)$$
$$\wedge (E(right\_dir) > E(left\_dir))$$

In addition, the direction detecting unit 301 sets the edge direction sel_dir to right_dir (i.e., sel_dir=left_dir) if one of the following conditional expressions (7) to (9) is satisfied:

$$(|angle(max\_dir, left\_dir)| < |angle(max\_dir, right\_dir)|) \quad (7)$$

$$(|angle(max\_dir, left\_dir)| = |angle(max\_dir, right\_dir)|) \wedge \quad (8)$$
$$(angle(max\_dir, mid\_dir) < 0)$$

$$(|angle(max\_dir, left\_dir)| = |angle(max\_dir, right\_dir)|) \wedge \quad (9)$$
$$(angle(max\_dir, mid\_dir) = 0) \wedge (E(right\_dir) < E(left\_dir))$$

Furthermore, if all of the conditional expressions (4) to (9) are not satisfied, the direction detecting unit 301 sets the edge direction sel_dir to mid_dir (i.e., sel_dir=mid_dir).

Here, since the direction max_dir is a direction in which the difference between the pixel values of the pixels is maximized, the direction max_dir is supposed to be substantially perpendicular to the edge direction. In addition, it is supposed that the angle between the edge direction and a direction perpendicular to the edge direction is about 90 degrees and, therefore, the energy E(dir) of the edge direction is minimized. Accordingly, a direction Ldir that satisfies almost all of conditional expressions (4) to (9) is selected as the edge direction sel_dir.

Note that when the edge direction sel_dir is a virtual direction and if the following conditional expression (10) is satisfied, the direction detecting unit 301 sets the edge direction sel_dir to sel_dir+1; however, if the following conditional expression (11) is satisfied, the direction detecting unit 301 sets the edge direction sel_dir to sel_dir−1:

$$(E(\text{sel\_dir}+1) < E(\text{sel\_dir}-1)) \wedge \\ (\textit{diff}(\text{sel\_dir}+1) < \textit{diff}(\text{sel\_dir}-1)) \wedge (\text{sel\_dir}+1 \neq \text{mid\_dir}) \quad (10)$$

$$(E(\text{sel\_dir}+1) > E(\text{sel\_dir}-1)) \wedge \\ (\textit{diff}(\text{sel\_dir}+1) > \textit{diff}(\text{sel\_dir}-1)) \wedge (\text{sel\_dir}-1 \neq \text{mid\_dir}) \quad (11)$$

In conditional expressions (10) and (11), diff(sel_dir+1) and diff(sel_dir−1) are obtained by setting the variable dir of diff(dir) to sel_dir+1 and sel_dir−1, respectively, and diff(dir) is computed as follows:

$$\text{diff}(\text{dir}) = |Pu(\text{dir}) - Pd(2N-2-\text{dir})| \quad (12)$$

That is, diff(dir) is the absolute difference between the pixel values Pu(dir) and Pd(2Nd−2−dir) of two pixels arranged in a direction that is determined by the variable dir and that passes through the edge direction detection pixel in the edge direction detection area.

After the edge direction is obtained in this manner, the direction detecting unit 301 supplies, to the directional distribution generating unit 302 and the reliability detecting unit 303, information indicating that the local energy is higher than the threshold value and edge direction information indicating the edge direction sel_dir.

In step S206, the reliability detecting unit 303 detects the reliability of the edge direction using the supplied input image and the edge direction information supplied from the direction detecting unit 301. More specifically, let Pp denote the pixel value of the edge direction detection pixel. Then, the reliability detecting unit 303 computes the average of the pixel values of two pixels adjacent to the edge direction detection pixel in the edge direction sel_dir in the edge direction detection area. The reliability detecting unit 303 considers the computed average as the pixel value Pp. For example, when the edge direction sel_dir is the direction L0 shown in FIG. 26, the average of the pixel values of the pixels Pu(0) and Pd(8) is considered as the pixel value Pp.

Subsequently, the reliability detecting unit 303 determines whether the coherence is present between the pixel value Pp computed for the edge direction detection pixel and the pixel value of a pixel in the vicinity of the edge direction detection pixel. For example, the reliability detecting unit 303 computes a value indicating a variation in the pixel value of a pixel in the vicinity of the edge direction detection pixel in the vertical direction as follows:

$$Vv = (Pu(Nd-1) - Pp) \times (Pp - Pd(Nd-1)) \quad (13)$$

Subsequently, the reliability detecting unit 303 computes a value Vh_up indicating a variation in the pixel values of pixels arranged in the horizontal direction in the vicinity of the edge direction detection pixel in the edge direction detection area adjacent to the edge direction detection pixel in the negative vertical direction as follows:

$$Vh\_up = (Pu(Nd-1) - Pu(Nd)) \times (Pu(Nd-2) - Pu(Nd-1)) \quad (14)$$

In addition, the reliability detecting unit 303 computes a value Vh_down indicating a variation in the pixel values of pixels arranged in the horizontal direction in the vicinity of the edge direction detection pixel in the edge direction detection area adjacent to the edge direction detection pixel in the positive vertical direction as follows:

$$Vh\_down = (Pd(Nd-1) - Pd(Nd)) \times (Pd(Nd-2) - Pd(Nd-1)) \quad (15)$$

If all of the following conditional expressions (16) to (24) are satisfied, the reliability detecting unit 303 determines that the coherence is not present between the pixel value Pp and the pixel value of the pixel in the vicinity of the edge direction detection pixel. That is, the reliability detecting unit 303 determines that the reliability of the detected edge direction sel_dir is low and, therefore, the pixel value Pp computed on the basis of the edge direction sel_dir is not appropriate.

$$Vv < 0 \quad (16)$$

$$Vh\_up < 0 \quad (17)$$

$$Vh\_down < 0 \quad (18)$$

$$|Pu(Nd-1) - Pp| > Tc1 \quad (19)$$

$$|Pp - Pd(Nd-1)| > Tc2 \quad (20)$$

$$|Pu(Nd-1) - Pu(Nd)| > Tc3 \quad (21)$$

$$|Pu(Nd-2) - Pu(Nd-1)| > Tc4 \quad (22)$$

$$|Pd(Nd-1) - Pd(Nd)| > Tc5 \quad (23)$$

$$|Pd(Nd-2) - Pd(Nd-1)| > Tc6 \quad (24)$$

Note that, in equations (19) to (24), Tc1 to Tc6 represent predetermined threshold values.

In such a case, the reliability detecting unit 303 sets the reliability of the edge direction detected for the edge direction detection pixel to 0. The reliability of the edge direction of 0 indicates that the reliability of the edge direction sel_dir is low. In contrast, the reliability of the edge direction of 1 indicates that the reliability of the edge direction sel_dir is high, that is, the edge direction sel_dir is correct. In addition, the reliability of the edge direction of 2 indicates that the reliability of the edge direction sel_dir is uncertain.

When all of the conditional expressions (16) to (24) are satisfied and if the edge direction detection pixel is included in the edge in the edge direction sel_dir, there is no relationship between the edge direction detection pixel and the pixel in the vicinity of the edge direction detection pixel. That is, it is unlikely that the edge direction of the edge direction detection pixel is the edge direction sel_dir.

In contrast, when at least one of the conditional expressions (16) to (24) is not satisfied, the reliability detecting unit 303 determines that the coherence is present between the pixel value Pp and the pixel value of the pixel in the vicinity of the edge direction detection pixel. That is, the reliability detecting unit 303 determines that the reliability of the detected edge direction sel_dir is high and, therefore, the pixel value Pp computed on the basis of the edge direction sel_dir is appropriate.

In this case, the reliability detecting unit 303 sets the reliability of the edge direction detected for the edge direction detection pixel to 1.

In this way, the reliability of the edge direction is determined on the basis of the coherence between the pixel value Pp computed using pixels adjacent to the edge direction detection pixel in the edge direction sel_dir and the pixel value of a pixel in the vicinity of the edge direction detection pixel.

The reliability detecting unit 303 supplies reliability information indicating the determined reliability to the reliability distribution generating unit 304. Thereafter, the processing proceeds to step S209. Hereinafter, the reliability of the edge direction sel_dir of an interpolation pixel located at coordinates (x, y) is referred to as "reliability(x, y)".

However, if, in step S204, it is determined that the local energy is lower than or equal to the predetermined threshold value, the processing proceeds to step S207.

In step S207, the direction detecting unit 301 tentatively determines the edge direction. More specifically, the direction detecting unit 301 considers the current edge direction detection area as a flat low-energy area that does not include an edge. Thus, the direction detecting unit 301 tentatively sets the edge direction sel_dir to mid_dir (i.e., sel_dir=mid_dir).

Subsequently, the direction detecting unit 301 supplies, to the directional distribution generating unit 302 and the reliability detecting unit 303, information indicating that the local energy is lower than or equal to the threshold value and the edge direction information indicating the edge direction sel_dir.

In step S208, the reliability detecting unit 303 tentatively determines the reliability. More specifically, the reliability detecting unit 303 sets the reliability of the edge direction of the current edge direction detection pixel to 2, which indicates that the reliability is uncertain. The reliability detecting unit 303 then supplies reliability information indicating the determined reliability to the reliability distribution generating unit 304.

After the reliability is determined in step S206 or S208, the contrast computing unit 305, in step S209, detects the contrast strength on the basis of the supplied input image.

More specifically, the contrast computing unit 305 uses, as a contrast detection area, an area at the center of which is a position corresponding to the edge direction detection pixel, the area having Mc pixels in the vertical direction and Nc pixels in the horizontal direction. Thereafter, the contrast computing unit 305 extracts the pixels in the contrast detection area.

Note that the values of Mc and Nc are variable. Hereinafter, the coordinate system for the contrast detection area is defined as a coordinate system having a reference position indicating the end of the contrast detection area in the negative vertical direction and in the negative horizontal direction. That is, the coordinates of the reference position is (0, 0), and the coordinates of a pixel remote from the reference position by i positions in the horizontal direction and by j positions in the vertical direction is (i, j).

The contrast computing unit 305 computes the contrast_strength(x, y) of the edge direction detection pixel using the following equation (25). Note that the contrast_strength (x, y) represents the contrast strength of the edge direction detection pixel located at coordinates (x, y) in the vertical interpolation pixel generated through interpolation.

$$\text{Contrast\_strength}(x, y) = \sum_{\substack{i1=0,\\Nc-1}} \sum_{\substack{j1=0,\\Mc-1}} \sum_{\substack{i2=0,\\Nc-1}} \sum_{\substack{j2=0,\\Mc-1}} \left\{ \begin{array}{l} \text{Coef\_Contrast}(i1-i2, j1-j2) \times \\ |Porg(i1, j1) - Porg(i2, j2)| \end{array} \right\} \quad (25)$$

where Porg(i1, j1) and Porg(i2, j2) represent the pixel values of the pixels located at the coordinates (i1, j1) and (i2, j2) in the contrast detection area, respectively, and Coef_Contrast (i1−i2, j1−j2) represents a weight that is proportional to the distance between the coordinates (i1, j1) and the coordinates (i2, j2). As the distance decreases, the weight Coef_Contrast (i1−i2, j1−j2) increases.

That is, the edge contrast strength of the edge direction detection pixel is defined as the sum of values, each obtained by multiplying the absolute difference between the pixel values of pixels in the contrast detection area by a weight determined in accordance with the distance between the pixels. Accordingly, the contrast strength indicates the level of the strength of the contrast for the entire area in the vicinity of the edge direction detection pixel in the vertically interpolated image.

The contrast computing unit 305 supplies the computed contrast strength to the diagonal contrast distribution generating unit 306, the texture contrast distribution generating unit 307, and the edge contrast distribution generating unit 308.

In step S210, the profiler processing unit 271 determines whether the processing has been performed on all of the interpolation pixels in the area of interest, that is, whether all of the interpolation pixels in the area of interest have been selected as the edge direction detection pixels.

If, in step S210, it is determined that an interpolation pixel on which the processing has not yet been performed still remains in the area of interest, the processing returns to step S202. Thereafter, the above-described processing is repeated. That is, an interpolation pixel that has not yet been selected as an edge direction detection pixel is selected as the next edge direction detection pixel. Thereafter, the edge direction, the reliability of the edge direction, and the contrast strength are computed for the edge direction detection pixel.

However, if, in step S210, it is determined that the processing has been performed for all of the interpolation pixels in the area of interest, the processing proceeds to step S211.

In step S211, the directional distribution generating unit 302 generates directional distribution indicating the distribution of the edge directions in the area of interest using the edge direction information supplied from the direction detecting unit 301.

For example, when the area Rt shown in FIG. 25 is selected as the area of interest, the edge direction information indicating the edge directions sel_dir computed for 15 interpolation pixels in the area of interest and arranged at locations the same as those of the pixels is used as the directional distribution.

The directional distribution generating unit 302 then supplies the generated directional distribution to the slope selecting unit 309, the diagonal weight setting unit 310, the texture strength information generating unit 311, and the edge strength information generating unit 312.

In step S212, the reliability distribution generating unit 304 generates reliability distribution indicating the distribution of the levels of the reliability in the area of interest using the reliability information supplied from the reliability detecting unit 303.

For example, when the area Rt shown in FIG. 25 is selected as the area of interest, the reliability information indicating the levels of reliability of the edge directions sel_dir computed for 15 interpolation pixels in the area of interest and arranged at locations the same as those of the pixels is used as the reliability distribution.

The reliability distribution generating unit 304 then supplies the generated reliability distribution to the slope selecting unit 309, the diagonal weight setting unit 310, the texture strength information generating unit 311, and the edge strength information generating unit 312.

In step S213, the diagonal contrast distribution generating unit 306 generates contrast distribution used for generating a statistical diagonal interpolation pixel using the contrast strength supplied from the contrast computing unit 305.

More specifically, the diagonal contrast distribution generating unit 306 computes a weight weight_contrast_S for each of the interpolation pixels, that is, the edge direction detection pixels in the area of interest using the following equation:

$$\text{weight\_contrast\_S}(x, y) = \begin{cases} 0.0 & (\text{contrast\_strength}(x, y) < Ts1) \\ \dfrac{\text{contrast\_strength}(x, y) - Ts1}{Ts2 - Ts1} & (Ts1 \leq \text{contrast\_strength}(x, y) \leq Ts2) \\ 1.0 & (\text{contrast\_strength}(x, y) > Ts2) \end{cases} \quad (26)$$

where weight_contrast_S(x, y) represents the weight weight_contrast_S of an interpolation pixel located at the coordinates (x, y) in the area of interest, and Ts1 and Ts2 represent predetermined threshold values (Ts1<Ts2). The threshold values Ts1 and Ts2 are variable.

The value of the weight weight_contrast_S computed using equation (26) increases as the contrast strength increases.

Subsequently, the diagonal contrast distribution generating unit 306 generates contrast distribution indicating the distribution of the weights in the area of interest using the computed weights weight_contrast_S.

For example, when the area Rt shown in FIG. 25 is selected as the area of interest, information in which the weights weight_contrast_S computed for 15 interpolation pixels in the area of interest are arranged at locations the same as those of the pixels is used as the contrast distribution.

The diagonal contrast distribution generating unit 306 then supplies the generated contrast distribution to the slope selecting unit 309, the diagonal weight setting unit 310, and the statistical diagonal interpolation unit 342 of the doubler processing unit 272.

In step S214, the texture contrast distribution generating unit 307 generates texture contrast distribution using the contrast strength supplied from the contrast computing unit 305.

More specifically, the texture contrast distribution generating unit 307 computes a weight weight_contrast_T for each of the interpolation pixels, that is, the edge direction detection pixels in the area of interest using the following equation:

$$\text{weight\_contrast\_T}(x, y) = \begin{cases} 0.0 & (\text{contrast\_strength}(x, y) < Tt1) \\ \dfrac{\text{contrast\_strength}(x, y) - Tt1}{Tt2 - Tt1} & (Tt1 \leq \text{contrast\_strength}(x, y) \leq Tt2) \\ 1.0 & (Tt2 < \text{contrast\_strength}(x, y) < Tt3) \\ \dfrac{-\text{contrast\_strength}(x, y) + Tt4}{Tt4 - Tt3} & (Tt3 \leq \text{contrast\_strength}(x, y) \leq Tt4) \\ 0.0 & (\text{contrast\_strength}(x, y) > Tt4) \end{cases} \quad (27)$$

where weight_contrast_T(x, y) represents the weight weight_contrast_T of an interpolation pixel located at the coordinates (x, y) in the area of interest, and Tt1 to Tt4 represent predetermined threshold values (Tt1<Tt2<Tt3<Tt4). The threshold values Tt1 to Tt4 are variable.

The value of the weight weight_contrast_T computed using equation (27) increases as the contrast strength increases when the contrast strength is in the range from the threshold value Tt1 to the threshold value Tt2. In contrast, the value of the weight weight_contrast_T decreases as the contrast strength increases when the contrast strength is in the range from the threshold value Tt3 to the threshold value Tt4. The value of the weight weight_contrast_T is 1 when the contrast strength is in the range from the threshold value Tt2 to the threshold value Tt3.

The contrast strength equal to the threshold value Tt2 or higher and equal to the threshold value Tt3 or lower is a contrast strength that frequently appears in the texture area (for the pixels of the texture area). In contrast, the contrast strength lower than the threshold value Tt1 and higher than the threshold value Tt4 is a contrast strength that less frequently appears in the texture area (for the pixels of the texture area). Accordingly, the value of the weight weight_contrast_T increases for an interpolation pixel that has high probability of being included in the texture area.

Subsequently, the texture contrast distribution generating unit 307 generates texture contrast distribution indicating the distribution of the weights in the area of interest using the computed weights weight_contrast_T.

For example, when the area Rt shown in FIG. 25 is selected as the area of interest, information in which the weights weight_contrast_T computed for 15 interpolation pixels in the area of interest are arranged at locations the same as those of the pixels is used as the texture contrast distribution.

The texture contrast distribution generating unit 307 supplies the texture contrast distribution to the texture strength information generating unit 311.

In step S215, the edge contrast distribution generating unit 308 generates edge contrast distribution using the contrast strength supplied from the contrast computing unit 305.

More specifically, the edge contrast distribution generating unit 308 computes a weight weight_contrast_E for each of the interpolation pixels, that is, the edge direction detection pixels in the area of interest using the following equation:

$$\text{weight\_contrast\_E}(x, y) = \begin{cases} 0.0 & (\text{contrast\_strength}(x, y) < Te1) \\ \dfrac{\text{contrast\_strength}(x, y) - Te1}{Te2 - Te1} & (Te1 \leq \text{contrast\_strength}(x, y) \leq Te2) \\ 1.0 & (\text{contrast\_strength}(x, y) > Te2) \end{cases} \quad (28)$$

where weight_contrast_E(x, y) represents the weight weight_contrast_E of an interpolation pixel located at the coordinates (x, y) in the area of interest, and Te1 and Te2 represent predetermined threshold values (Te1<Te2). The threshold values Te1 to Te2 are variable.

The value of the weight weight_contrast_E computed using equation (28) increases as the contrast strength increases.

Subsequently, the edge contrast distribution generating unit 308 generates edge contrast distribution indicating the distribution of the weights in the area of interest using the computed weights weight_contrast_E.

For example, when the area Rt shown in FIG. 25 is selected as the area of interest, information in which the weights weight_contrast_E computed for 15 interpolation pixels in the area of interest are arranged at locations the same as those of the pixels is used as the edge contrast distribution.

The edge contrast distribution generating unit 308 then supplies the generated edge contrast distribution to the edge strength information generating unit 312.

In step S216, the slope selecting unit 309 performs slope selection processing using the directional distribution, the reliability distribution, and the contrast distribution supplied from the directional distribution generating unit 302, the reliability distribution generating unit 304, and the diagonal contrast distribution generating unit 306, respectively.

More specifically, the slope selecting unit 309 computes Balance(x, y) of a pixel of interest located at coordinates (x, y) in the vertically interpolated image using the following equation:

$$\text{Balance}(x, y) = \sum_{dir=N,\ldots 2N-2} \text{Population}(Ldir) - \sum_{i=0,\ldots N-2} \text{Population}(Ldir) \quad (29)$$

where Population(Ldir) represents the number of interpolation pixels having an edge direction sel_dir that is equal to the direction Ldir, the reliability of the edge direction sel_dir that is equal to 1, and a weight weight_contrast_S that is higher than or equal to a predetermined threshold value among the interpolation pixels in the area of interest.

Accordingly, Balance(x, y) represents the difference between the number of interpolation pixels having an edge direction of one of LN to L(2N−2) and the number of interpolation pixels having an edge direction of one of L0 to L(N−2) among the interpolation pixels having the reliability of 1 and a weight weight_contrast_S higher than or equal to a predetermined threshold value.

For example, when the area Rt shown in FIG. 25 is selected as the area of interest and if the number of the interpolation pixels having reliable edge directions extending towards the right of the drawing is greater than the number of the interpolation pixels having reliable edge directions extending towards the left of the drawing, the value of Balance(x, y) of the pixel of interest Gc is positive.

In contrast, if the number of the interpolation pixels having reliable edge directions extending towards the left of the drawing is greater than the number of the interpolation pixels having reliable edge directions extending towards the right of the drawing, the value of Balance(x, y) of the pixel of interest Gc is negative.

When Balance(x, y)=0, the slope selecting unit 309 selects a direction L(N−1), that is, the vertical direction, as a direction used for selecting a pixel used for interpolation of the pixel of interest.

In contrast, when Balance(x, y)>0, the slope selecting unit 309 selects directions LN to L(2N−2), that is, directions tilted from the vertical direction to the right (the right up directions) in the drawing, as a direction used for selecting a pixel used for interpolation of the pixel of interest. This is because since, in the area of interest, the number of interpolation pixels having a reliable edge direction extending towards the right is greater than the number of interpolation pixels having a reliable edge direction extending towards the left, it is highly likely that the edge direction of the pixel of interest is directed towards the right.

When Balance(x, y)<0, the slope selecting unit 309 selects directions L0 to L(N−2), that is, directions tilted from the vertical direction to the left (the left up directions) in the drawing, as a direction used for selecting a pixel used for interpolation of the pixel of interest. This is because, in contrast to the case of Balance(x, y)>0, since the number of interpolation pixels having a reliable edge direction extending towards the left is greater than the number of interpolation pixels having a reliable edge direction extending towards the right in the area of interest, it is highly likely that the edge direction of the pixel of interest is directed towards the left.

In this way, the direction used for selecting a pixel used for interpolation of the pixel of interest is selected on the basis of the distribution of the edge directions of the interpolation pixels having a high reliability of the edge direction and a high weight weight_contrast_S in the area of interest.

The slope selecting unit 309 then supplies slope selection information indicating the selected direction, the directional distribution, and the reliability distribution to the statistical diagonal interpolation unit 342 of the doubler processing unit 272.

In step S217, the diagonal weight setting unit 310 determines the weight in the diagonal direction using the directional distribution, the reliability distribution, and the contrast distribution supplied from the directional distribution generating unit 302, the reliability distribution generating unit 304, and the diagonal contrast distribution generating unit 306, respectively.

More specifically, the diagonal weight setting unit 310 computes a weight weight_slant determined based on the noticeability of the edge direction in the area of interest using the following equation:

$$\text{weight\_slant}(x, y) = \sum_{i=0}^{Nt-1} \sum_{j=0}^{\frac{Mt-1}{2}} \left\{ \begin{array}{c} \text{Coef\_Balance}(\text{sel\_dir}(x_{t0}+i, y_{t0}+2i)) \times \\ \text{reliability}(x_{t0}+i, y_{t0}+2i) \times \\ \text{weight\_contrast\_S}(x_{t0}+i, y_{t0}+2i) \end{array} \right\} \quad (30)$$

where weight_slant(x, y) represents the weight weight_slant of a pixel of interest located at the coordinates (x, y) in the vertically interpolated image, and Coef_Balance (sel_dir ($x_{t0}$+i, $y_{t0}$+2i) represents a weight determined in accordance with the edge direction sel_dir($x_{t0}$+i, $y_{t0}$+2i) of an interpolated image located at the coordinates ($x_{t0}$+i, $y_{t0}$+2i) in the area of interest.

The weight weight_slant(x, y) can be computed by summing the multiplication results of the reliability of the edge direction, the weight weight_contrast_S, and the weight Coef_Balance determined in accordance with the edge direction sel_dir of each of the interpolation pixels in the area of interest.

That is, the weight weight_slant(x, y) increases as the reliability of the edge direction of each of the interpolation pixels in the area of interest increases and as the weight weight_contrast_S increases (i.e., as the edge direction in the area of interest is more noticeable).

Subsequently, the diagonal weight setting unit 310 supplies the computed weight weight_slant to the diagonal combining unit 343 of the doubler processing unit 272 and the upsampling unit 242 shown in FIG. 15. Note that information in which the weights weight_slant computed for the interpolation pixels (the pixels of interest) in the vertically interpolated image are arranged at locations the same as those of the interpolation pixels is used as the weight map. That is, the pixel value of the pixel of the weight map serves as the weight weight_slant of the interpolation pixel of the vertically interpolated image corresponding to the pixel of the weight map.

In step S218, the edge strength information generating unit 312 generates edge strength information using the directional distribution, the reliability distribution, and the edge contrast distribution supplied from the directional distribution generating unit 302, the reliability distribution generating unit 304, and the edge contrast distribution generating unit 308, respectively.

More specifically, the edge strength information generating unit 312 computes a weight weight_edge on the basis of the edge strength in the area of interest using the following equation:

$$\text{weight\_edge}(x, y) = \sum_{i=0}^{Nt-1} \sum_{j=0}^{\frac{Mt-1}{2}} \left\{ \begin{array}{c} \text{Coef\_edge}(\text{sel\_dir}(x_{t0} + i, y_{t0} + 2i)) \times \\ \text{reliability}(x_{t0} + i, y_{t0} + 2i) \times \\ \text{weight\_contrast\_E}(x_{t0} + i, y_{t0} + 2i) \end{array} \right\} \quad (31)$$

where weight_edge(x, y) represents the weight weight_edge of a pixel of interest located at the coordinates (x, y) in the vertically interpolated image, and Coef_edge(sel_dir($x_{t0}$+i, $y_{t0}$+2i)) represents a weight determined in accordance with the edge direction sel_dir ($x_{t0}$+i, $y_{t0}$+2i) of an interpolation pixel located at the coordinates ($x_{t0}$+i, $y_{t0}$+2i) in the area of interest. For example, when it is desired that an edge in a particular direction be enhanced, the weight Coef_edge corresponding to the edge direction is increased to a value greater than the weights Coef_edge corresponding to the other directions.

The weight weight_edge(x, y) can be computed by summing the multiplication results of the reliability of the edge direction, the weight weight_contrast_E, and the weight Coef_edge determined in accordance with the edge direction sel_dir of each of the interpolation pixels in the area of interest.

That is, the weight weight_edge(x, y) increases as the reliability of the edge direction of each of the interpolation pixels in the area of interest increases and as the weight weight_contrast_E increases (i.e., as the edge strength in the area of interest increases).

The edge strength information generating unit 312 supplies edge strength information indicating the computed weight_edge(x, y) to the edge adaptation mixing processing unit 374 of the enhancer processing unit 273. Note that the edge strength information indicating the weight_edge(x, y) computed for each of the interpolation pixels (the pixels of interest) in the vertically interpolated image is upsampled by the edge adaptation mixing processing unit 374 in the vertical direction. That is, the edge strength information includes the weights weight_edge(x, y) of the pixels of the vertically interpolated image through upsampling.

In step S219, the texture strength information generating unit 311 generates texture strength information using the directional distribution, the reliability distribution, and the texture contrast distribution supplied from the directional distribution generating unit 302, the reliability distribution generating unit 304, and the texture contrast distribution generating unit 307, respectively.

More specifically, the texture strength information generating unit 311 computes a weight weight_texture on the basis of the texture strength in the area of interest using the following equation:

$$\text{weight\_texture}(x, y) = \sum_{i=0}^{Nt-1} \sum_{j=0}^{\frac{Mt-1}{2}} \left\{ \begin{array}{c} \text{Coef\_texture}(\text{sel\_dir}(x_{t0} + i, y_{t0} + 2i)) \times \\ \text{reliability}(x_{t0} + i, y_{t0} + 2i) \times \\ \text{weight\_contrast\_T}(x_{t0} + i, y_{t0} + 2i) \end{array} \right\} \quad (32)$$

where weight_texture(x, y) represents the weight weight_texture of a pixel of interest located at the coordinates (x, y) in the vertically interpolated image, and Coef_texture (sel_dir ($x_{t0}$+ i, $y_{t0}$+2i)) represents a weight determined in accordance with the edge direction sel_dir($x_{t0}$+i, $y_{t0}$+2i) of an interpolated pixel located at the coordinates ($x_{t0}$+i, $y_{t0}$+2i) in the area of interest.

The weight weight_texture(x, y) can be computed by summing the multiplication results of the reliability of the edge direction, the weight weight_contrast_T, and the weight Coef_texture determined in accordance with the edge direction sel_dir of each of the interpolation pixels in the area of interest.

That is, the weight weight_texture(x, y) increases as the reliability of the edge direction of each of the interpolation pixels in the area of interest increases and as the weight weight_contrast_T increases (i.e., as the texture strength in the area of interest increases).

The texture strength information generating unit 311 supplies texture strength information indicating the computed weight_texture(x, y) to the texture adaptation mixing processing unit 372 of the enhancer processing unit 273. Note that the edge strength information indicating the weight_texture(x, y) computed for each of the interpolation pixels (the pixels of interest) in the vertically interpolated image is upsampled by the texture adaptation mixing processing unit 372 in the vertical direction. That is, the texture strength information includes the weights weight_texture(x, y) of the pixels of the vertically interpolated image through upsampling.

In step S220, the profiler processing unit 271 determines whether the processing has been performed on all of the interpolation pixels in the vertically interpolated image, that is, whether all of the interpolation pixels in the vertically interpolated image have been selected as the pixels of interest.

If, in step S220, it is determined that an interpolation pixel on which the processing has not yet been performed still remains in the vertically interpolated image, the processing returns to step S201. Thereafter, the above-described processing is repeated. That is, an interpolation pixel that has not yet been selected as a pixel of interest is selected as the next pixel of interest.

However, if, in step S220, it is determined that the processing has been performed for all of the interpolation pixels in the vertically interpolated image, the vertical direction profiler processing is completed, and the processing proceeds to step S172 shown in FIG. 22.

Referring back to the flowchart shown in FIG. 22, when the vertical direction profiler processing in step S171 is completed, the doubler processing unit 272, in step S172, performs vertical direction doubler processing.

Figure 27:
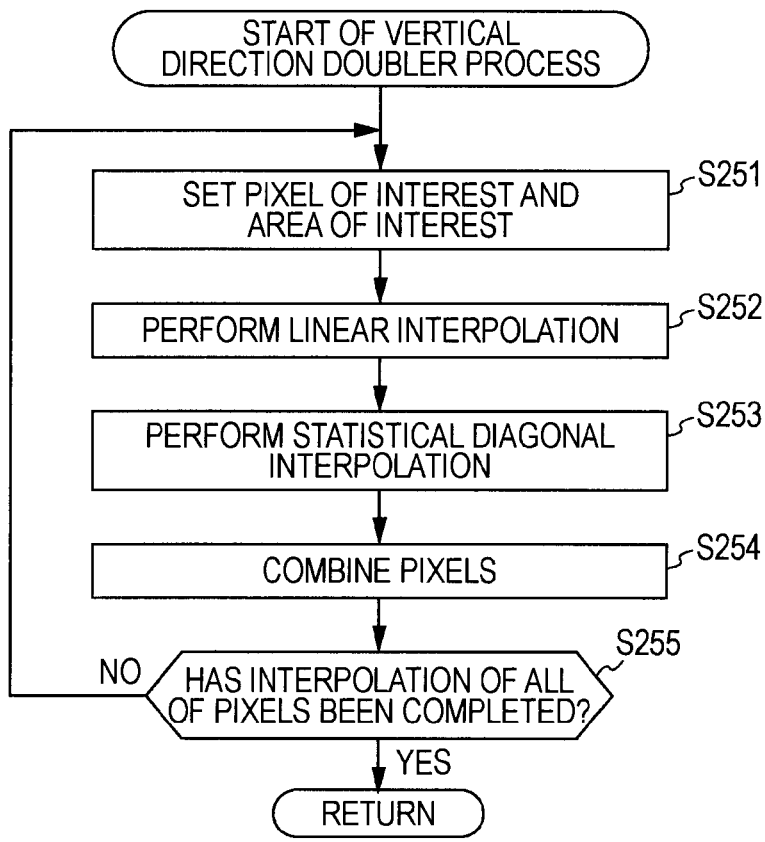
FIG. 27 is a flowchart illustrating a vertical direction doubler process.

The vertical direction doubler processing corresponding to the processing performed in step S172 shown in FIG. 22 is described next with reference to the flowchart shown in FIG. 27.

In step S251, the doubler processing unit 272 sets a pixel of interest and an area of interest. That is, as in step S201 shown in FIG. 23, the doubler processing unit 272 selects one of the interpolation pixels that has not yet been selected as a pixel of interest in a vertically interpolated image to be generated from now, that is, one of the interpolation pixels whose pixel value has not yet been computed and uses the selected pixel as the pixel of interest. In addition, the doubler processing unit 272 selects, as the area of interest, an area including the pixel of interest at the center thereof and having Mt pixels in the vertical direction and Nt pixels in the horizontal direction.

In step S252, the linear interpolation unit 341 performs linear interpolation using the supplied input image by performing filter processing on a plurality of pixels adjacent to the pixel of interest in the vertical direction in the vertically interpolated image. In this way, the linear interpolation unit 341 computes the pixel value of the pixel of interest. The linear interpolation unit 341 then supplies the computed pixel value of the pixel of interest to the diagonal combining unit 343 as the pixel value of a linear interpolation pixel. The linear interpolation unit 341 further supplies the supplied input image to the diagonal combining unit 343.

Hereinafter, the pixel value computed by the linear interpolation unit 341, that is, the pixel value of the interpolation pixel located at coordinates (x, y) is referred to as linear_interpolation_pixel(x, y). Note that an interpolation method employed by the linear interpolation unit 341 is not limited to a linear interpolation method. Any method other than the method employed by the statistical diagonal interpolation unit 342 can be employed.

In step S253, the statistical diagonal interpolation unit 342 performs statistical diagonal interpolation using the supplied input image, the contrast distribution supplied from the diagonal contrast distribution generating unit 306, and the slope selection information, the directional distribution, and the reliability distribution supplied from the slope selecting unit 309.

More specifically, if the direction indicated by the slope selection information is a direction tilted from the vertical direction to the left, the statistical diagonal interpolation unit 342 computes the pixel value of the pixel of interest obtained by statistical diagonal interpolation, that is, the pixel value of the statistical diagonal interpolation pixel using the following equation:

$$\text{statistical\_diagonal\_interpolation\_pixel}(x, y) = \quad (33)$$

$$\frac{\sum_{dir=0}^{Nd-2} \{\text{Population}(L_{dir}) \times \text{diagonal\_average\_pixel}(L_{dir})\}}{\sum_{dir=0}^{Nd-2} \text{Population}(L_{dir})}$$

where statistical_diagonal_interpolation_pixel(x, y) represents the pixel value of the statistical diagonal interpolation pixel (the pixel of interest), and diagonal_average_pixel(Ldir) represents the average of the pixel values of two pixels of the vertically interpolated image adjacent to the pixel of interest in the direction Ldir.

When the direction Ldir is a virtual direction, the above-described virtual pixels are generated, and the pixel value of a diagonal average pixel is computed using the virtual pixels.

In addition, Population(Ldir) in equation (33) is similar to that in equation (29). That is, Population(Ldir) represents the number of interpolation pixels having an edge direction sel_dir of the direction Ldir, the reliability of the edge direction sel_dir of 1, and a weight weight_contrast_S higher than a predetermined threshold value among the interpolation pixels in the area of interest.

Accordingly, when the direction indicated by the slope selection information is a direction tilted from the vertical direction to the left, the statistical diagonal interpolation pixel has a pixel value obtained by summing the pixel values of pixels adjacent to the pixel of interest in the direction tilted from the vertical direction towards the left weighted in accordance with the edge direction distribution in the area of interest.

In contrast, if the direction indicated by the slope selection information is a direction tilted from the vertical direction to the right, the statistical diagonal interpolation unit 342 computes the pixel value of the pixel of interest obtained by statistical diagonal interpolation, that is, the pixel value of the statistical diagonal interpolation pixel using the following equation:

$$\text{statistical\_diagonal\_interpolation\_pixel}(x, y) = \quad (34)$$

$$\frac{\sum_{dir=Nd} \{\text{Population}(L_{dir}) \times \text{diagonal\_average\_pixel}(L_{dir})\}}{\sum_{dir=Nd}^{2Nd-2} \text{Population}(L_{dir})}$$

Note that, in equation (34), statistical_diagonal_interpolation_pixel(x, y) and diagonal_average_pixel(Ldir) are similar to those in equation (33).

Accordingly, when the direction indicated by the slope selection information is a direction tilted from the vertical direction to the right, the statistical diagonal interpolation pixel has a pixel value obtained by summing the pixel values of pixels adjacent to the pixel of interest in the direction tilted from the vertical direction towards the right weighted in accordance with the edge direction distribution in the area of interest.

Furthermore, if the direction indicated by the slope selection information is the vertical direction, the statistical diagonal interpolation unit 342 computes the average of the pixels adjacent to the pixel of interest in the vertical direction and uses the average as the pixel value of the statistical diagonal interpolation pixel.

After the pixel value of the statistical diagonal interpolation pixel is computed, the statistical diagonal interpolation unit 342 supplies the computed statistical diagonal interpolation pixel to the diagonal combining unit 343.

In step S254, the diagonal combining unit 343 combines the linear interpolation pixel supplied from the linear interpolation unit 341 with the statistical diagonal interpolation pixel supplied from the statistical diagonal interpolation unit 342 using the weight weight_slant, that is, the weight map supplied from the diagonal weight setting unit 310. In this way, the diagonal combining unit 343 generates the vertically interpolated image.

That is, the diagonal combining unit 343 computes the pixel value of each of the interpolation pixels of the interpolated image by constructing the weighted sum of the linear interpolation pixel and the statistical diagonal interpolation pixel using the weight weight_slant as follows:

$$\text{diagonal\_combined\_pixel}(x, y) = \quad (35)$$
$$(1 - \text{weight\_slant}(x, y)) \times (\text{linear\_interpolation\_pixel}(x, y)) +$$
$$\text{weight\_slant}(x, y) \times (\text{statistical\_diagonal\_interpolation\_pixel}(x, y))$$

In equation (35), the linear interpolation pixel multiplied by a value obtained by subtracting the weight from 1 is added to the statistical diagonal interpolation pixel multiplied by the weight. The sum is used as the pixel value (diagonal_combined_pixel(x, y)) of the pixel of interest.

Accordingly, as the weight weight_slant increases (for a pixel located in an area having a noticeable edge direction), the factor of the statistical diagonal interpolation pixel increases and the factor of the linear interpolation pixel decreases.

In step S255, the doubler processing unit 272 determines whether the interpolation has been performed on all of the interpolation pixels, that is, whether all of the interpolation pixels in the vertically interpolated image have been selected as the pixels of interest.

If, in step S255, it is determined that interpolation of all of the pixel has not yet been completed, the processing returns to step S251. Thereafter, the above-described processing is repeated. That is, the pixel value of the next pixel of interest is computed.

However, if, in step S255, it is determined that interpolation has been performed for all of the interpolation pixels, the diagonal combining unit 343 generates the vertically interpolated image using the computed pixel values of the pixels of interest and the input image supplied from the linear interpolation unit 341. The diagonal combining unit 343 then supplies the generated vertically interpolated image to the texture filter processing unit 371, the texture adaptation mixing processing unit 372, and the edge filter processing unit 373. Thus, the vertical direction doubler processing is completed. Thereafter, the processing proceeds to step S173 shown in FIG. 22.

Referring back to the flowchart shown in FIG. 22, when the vertical direction doubler processing in step S172 is completed, the enhancer processing unit 273, in step S173, performs vertical direction enhancer processing.

Figure 28:
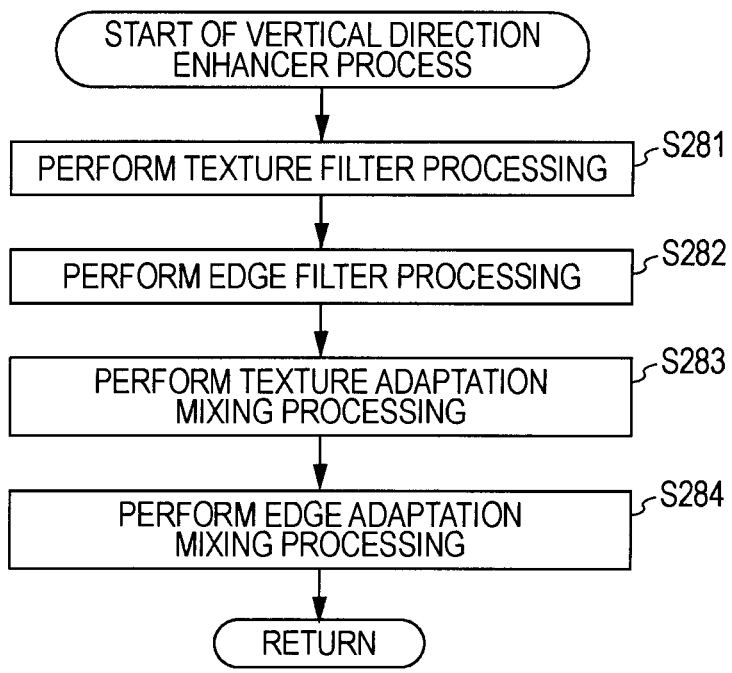
FIG. 28 is a flowchart illustrating a vertical enhancer process.

The vertical direction doubler processing corresponding to the processing performed in step S173 shown in FIG. 22 is described below with reference to the flowchart shown in FIG. 28.

In step S281, the texture filter processing unit 371 performs texture filter processing on the vertically interpolated image supplied from the diagonal combining unit 343 and supplies the vertically interpolated image to the texture adaptation mixing processing unit 372. In the texture filter processing, a component in a predetermined frequency range of the vertically interpolated image, that is, a texture area is enhanced in order to make the entire image clearer.

In step S282, the edge filter processing unit 373 performs edge filter processing on the vertically interpolated image supplied from the diagonal combining unit 343 and supplies the vertically interpolated image to the edge adaptation mixing processing unit 374. In the edge filter processing, an edge in the vertically interpolated image is enhanced.

In step S283, the texture adaptation mixing processing unit 372 performs texture adaptation mixing processing on the vertically interpolated image supplied from the diagonal combining unit 343 and the texture filter processing unit 371 using the texture strength information supplied from the texture strength information generating unit 311.

More specifically, the texture adaptation mixing processing unit 372 upsamples the supplied texture strength information so that the texture strength information has a size the same as that of a texture mixing image to be generated from now.

As used herein, a pixel of the interpolated image supplied from the texture filter processing unit 371 is referred to as a "texture pixel", and a pixel of the interpolated image supplied from the diagonal combining unit 343 is referred to as a "vertical interpolation pixel". In addition, the weight of a pixel of the texture strength information is referred to as "weight_texture".

The texture adaptation mixing processing unit 372 sums the pixel value of the texture pixel multiplied by the weight_texture and the pixel value of the vertical interpolation pixel multiplied by (1−weight_texture). The texture adaptation mixing processing unit 372 then uses the sum as the pixel value of a pixel of the texture mixing image. Thus, the texture adaptation mixing processing unit 372 generates the texture mixing image.

Accordingly, in the texture mixing image, an area including more texture components includes more components of the vertically interpolated image subjected to the texture filter processing. The texture adaptation mixing processing unit 372 supplies the texture mixing image generated in this manner to the edge adaptation mixing processing unit 374.

In step S284, the edge adaptation mixing processing unit 374 performs edge adaptation mixing processing on the texture mixing image supplied from the texture adaptation mixing processing unit 372 and the vertically interpolated image supplied from the edge filter processing unit 373 using the edge strength information supplied from the edge strength information generating unit 312.

More specifically, the edge adaptation mixing processing unit 374 upsamples the supplied edge strength information so that the edge strength information has a size the same as that of a final vertically interpolated image to be generated from now.

As used herein, a pixel of the vertically interpolated image supplied from the edge filter processing unit 373 is referred to as an "edge pixel", and a pixel of the texture mixing image is referred to as a "texture mixing pixel". In addition, the weight of a pixel indicated by the edge strength information is referred to as "weight_edge".

The edge adaptation mixing processing unit 374 sums the pixel value of the edge pixel multiplied by the weight_edge and the pixel value of the texture mixture pixel multiplied by (1−weight_edge). The edge adaptation mixing processing unit 374 then uses the sum as the pixel value of a pixel of a final vertically interpolated image.

Accordingly, in the final vertically interpolated image, the edge is more enhanced in an area including more edge components. The edge adaptation mixing processing unit 374 supplies the obtained vertically interpolated image to the horizontal upsampling processing unit 243.

When the final vertically interpolated image is output in this manner, the vertical direction enhancer processing is completed. Thereafter, the processing proceeds to step S174 shown in FIG. 22.

Referring back to the flowchart shown in FIG. 22, after the vertical direction enhancer processing is completed, the processing in steps S174 to S176 is performed. Since the processing is similar to the processing performed in steps S171 to S173, the description thereof is not repeated.

However, in the processing performed in steps S174 to S176, the generated vertically interpolated image is the target of the processing. The horizontal direction profiler processing, the horizontal direction doubler processing, and the horizontal direction enhancer processing are performed for the horizontal direction of the vertically interpolated image.

That is, interpolation of a pixel is performed in the horizontal direction of the vertically interpolated image. For example, an enhancement image having 2V pixels in the vertical direction and 2H pixels in the horizontal direction is generated from an image having 2V pixels in the vertical direction and H pixels in the horizontal direction.

The enhancement image generated in this manner is supplied from the horizontal upsampling processing unit 243 to the multiplier unit 166 shown in FIG. 13. In addition, a weight map generated through the horizontal direction profiler processing and having 2V pixels in the vertical direction and H pixels in the horizontal direction is supplied from the horizontal upsampling processing unit 243 to the selection unit 244.

In step S177, the upsampling unit 245 upsamples the weight map supplied from the selection unit 244.

That is, the upsampling unit 242 upsamples the weight map supplied from the vertical upsampling processing unit 241 and having V pixels in the vertical direction and H pixels in the horizontal direction into a weight map having 2V pixels in the vertical direction and H pixels in the horizontal. For example, the upsampling is performed using the nearest neighbor algorithm. The upsampling unit 242 supplies the computed weight map to the selection unit 244.

The selection unit 244 selects a smaller one of the pixel value of a pixel of the weight map supplied from the upsampling unit 242 and the pixel value of a pixel of the weight map supplied from the horizontal upsampling processing unit 243 located at a position the same as that of the pixel and uses the selected pixel value as the pixel value of a pixel of an output weight map located at a position the same as that of the pixel.

The weight map indicates that an area including the pixels of smaller pixel values is an area from which a higher effect of the diagonal interpolation processing can be obtained. Accordingly, by selecting a smaller one of the pixel values of the two weight map as the pixel value of the output weight map, an area that can provide a high effect of the diagonal interpolation process can be easily identified.

The selection unit 244 supplies the obtained weight map to the upsampling unit 245. The upsampling unit 245 upsamples the weight map supplied from the selection unit 244 using, for example, the nearest neighbor algorithm and supplies the upsampled weight map to the multiplier unit 171 shown in FIG. 13. In this way, for example, a weight map having 2V pixels in the vertical direction and H pixels in the horizontal direction is upsampled into a weight map having 2V pixels in the vertical direction and 2H pixels in the horizontal direction.

When the weight map is output from the upsampling unit 245, the diagonal interpolation process is completed. Thereafter, the processing proceeds to step S113 shown in FIG. 20.

By generating a pixel by interpolation using the edge direction of the image, the reliability of the edge direction, and the contrast strength while taking into account the edge direction, a pixel that is harmonized with the neighboring pixels can be generated through the interpolation. As a result, the image quality of the enhancement image can be increased.

In addition, by performing the texture adaptation mixing processing and the edge adaptation mixing processing using the texture strength information and the edge strength information, the image quality can be optimally controlled in accordance with the characteristics of the areas of the image. As a result, the image quality of the image can be increased.

Third Embodiment
Configuration of Image Converting Apparatus

In the foregoing embodiments, an SR image and an enhancement image are generated. By mixing the two images, an output image is generated. However, an SR image may be generated using an enhancement image generated from an input image, and the SR image may be used as an output image.

Figure 29:
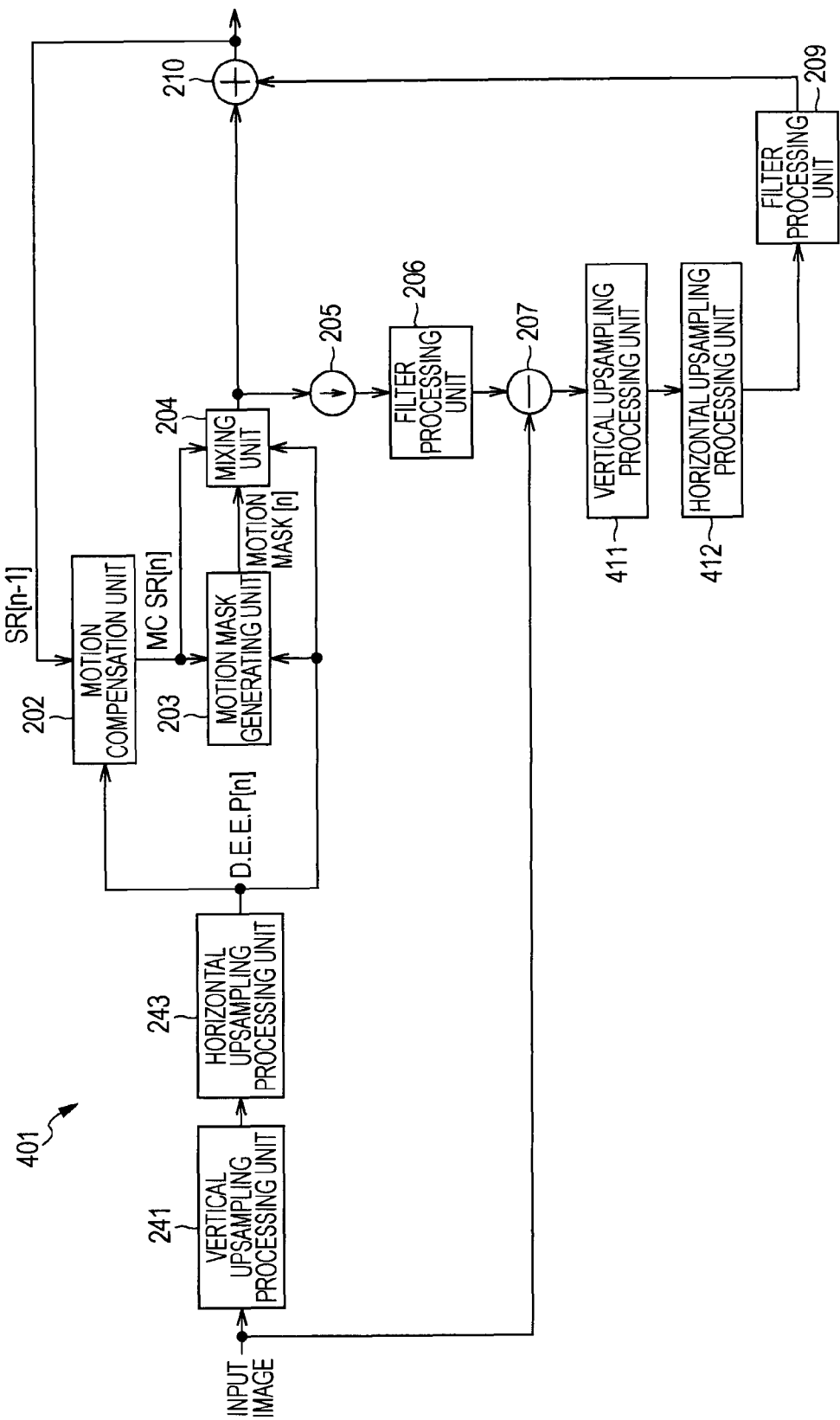
FIG. 29 illustrates another exemplary configuration of an image converting apparatus according to an embodiment of the present invention.

In such a case, for example, an image converting apparatus is configured as shown in FIG. 29.

An image converting apparatus 401 includes a vertical upsampling processing unit 241, a horizontal upsampling processing unit 243, a motion compensation unit 202, a motion mask generating unit 203, a mixing unit 204, a downsampling unit 205, a filter processing unit 206, a subtracter unit 207, a filter processing unit 209, an adder unit 210, a vertical upsampling processing unit 411, and a horizontal upsampling processing unit 412.

The same numbering will be used in describing FIG. 29 as was utilized above in describing FIGS. 14 and 15, and the descriptions thereof are not repeated where appropriate.

In the image converting apparatus 401, an input image is supplied to the vertical upsampling processing unit 241 and the subtracter unit 207. The vertical upsampling processing unit 241 upsamples the input image in the vertical direction and generates a vertically interpolated image. The vertical upsampling processing unit 241 then supplies the vertically interpolated image to the horizontal upsampling processing unit 243.

The horizontal upsampling processing unit 243 upsamples the vertically interpolated image supplied from the vertical upsampling processing unit 241 in the horizontal direction and generates an enhancement image. The horizontal upsampling processing unit 243 then supplies the generated enhancement image to the motion compensation unit 202, the motion mask generating unit 203, and the mixing unit 204.

In the image converting apparatus 401, the vertical upsampling processing unit 411 and the horizontal upsampling processing unit 412 are disposed between the subtracter unit 207 and the filter processing unit 209. The vertical upsampling processing unit 411 and the horizontal upsampling processing unit 412 operate in a manner similar to the vertical upsampling processing unit 241 and the horizontal upsampling processing unit 243, respectively.

That is, a difference image output from the subtracter unit 207 is upsampled by the vertical upsampling processing unit 411 in the vertical direction and is further upsampled by the horizontal upsampling processing unit 412 in the horizontal direction. The upsampled difference image is then supplied to the filter processing unit 209.

Operation Performed by Image Converting Apparatus

An exemplary image conversion process performed by the image converting apparatus 401 is described next with reference to the flowchart shown in FIG. 30. The image conversion process is performed each time an input image for one frame is supplied to the image converting apparatus 401.

In step S311, the vertical upsampling processing unit 241 and the horizontal upsampling processing unit 243 perform upsampling processing using diagonal interpolation and generate an enhancement image from the input image. For example, an enhancement image having 2V pixels in the vertical direction and 2H pixels in the horizontal direction is generated from an image having V pixels in the vertical direction and H pixels in the horizontal direction.

The generated enhancement image is supplied from the horizontal upsampling processing unit 243 to the motion compensation unit 202, the motion mask generating unit 203, and the mixing unit 204. The upsampling processing using diagonal interpolation is described below in more detail.

After the enhancement image is generated through upsampling processing using diagonal interpolation, the processing in steps S312 to S316 is performed. Since the processing performed in steps S312 to S316 is similar to the processing performed in steps S142 to S146 shown in FIG. 21, the description thereof is not repeated.

However, in the image converting apparatus 401, motion compensation and generation of a mixing image are performed using the enhancement image. In addition, in the subtracter unit 207, the difference between the mixing image and the input image is computed, and a difference image is generated. The difference image is then supplied to the vertical upsampling processing unit 411.

In step S317, the vertical upsampling processing unit 411 and the horizontal upsampling processing unit 412 perform upsampling processing using diagonal interpolation and upsamples the difference image. The vertical upsampling processing unit 411 then supplies the upsampled difference image to the filter processing unit 209.

For example, the difference image having V pixels in the vertical direction and H pixels in the horizontal direction is upsampled into an image having 2V pixels in the vertical direction and 2H pixels in the horizontal direction. Note that the processing performed in step S317 is similar to the upsampling processing using diagonal interpolation performed in step S311. Accordingly, the description thereof is not repeated.

After the difference image is upsampled in this manner and is supplied from the horizontal upsampling processing unit 412 to the filter processing unit 209, the filter processing unit 209 performs filter processing on the difference image using a highpass filter. The filter processing unit 209 then supplies the difference image to the adder unit 210.

In step S318, the adder unit 210 sums a mixing image supplied from the mixing unit 204 and the difference image supplied from the filter processing unit 209 and generates an SR image. The adder unit 210 then outputs the generated SR image as an output image. In addition, the adder unit 210 supplies the SR image to the motion compensation unit 202. Thereafter, the image conversion process is completed.

In this way, by performing, in a super-resolution process, the upsampling processing using diagonal interpolation, the image quality of the output image can be easily increased.

That is, by upsampling the input image using a diagonal interpolation process, an enhancement image in which a diagonal line appearing in the input image is sharply reproduced can be obtained. If super-resolution processing is performed using the enhancement image, that is, an image having an image quality higher than that of the input image, the image quality of the output image can be further increased.

In addition, by upsampling the difference image using diagonal interpolation, an error of estimation indicated by the difference image is fed back to the mixing image so that a diagonal line appearing in the input image is sharply reproduced. In this way, the image quality of the output image can be further increased.

Figure 30:
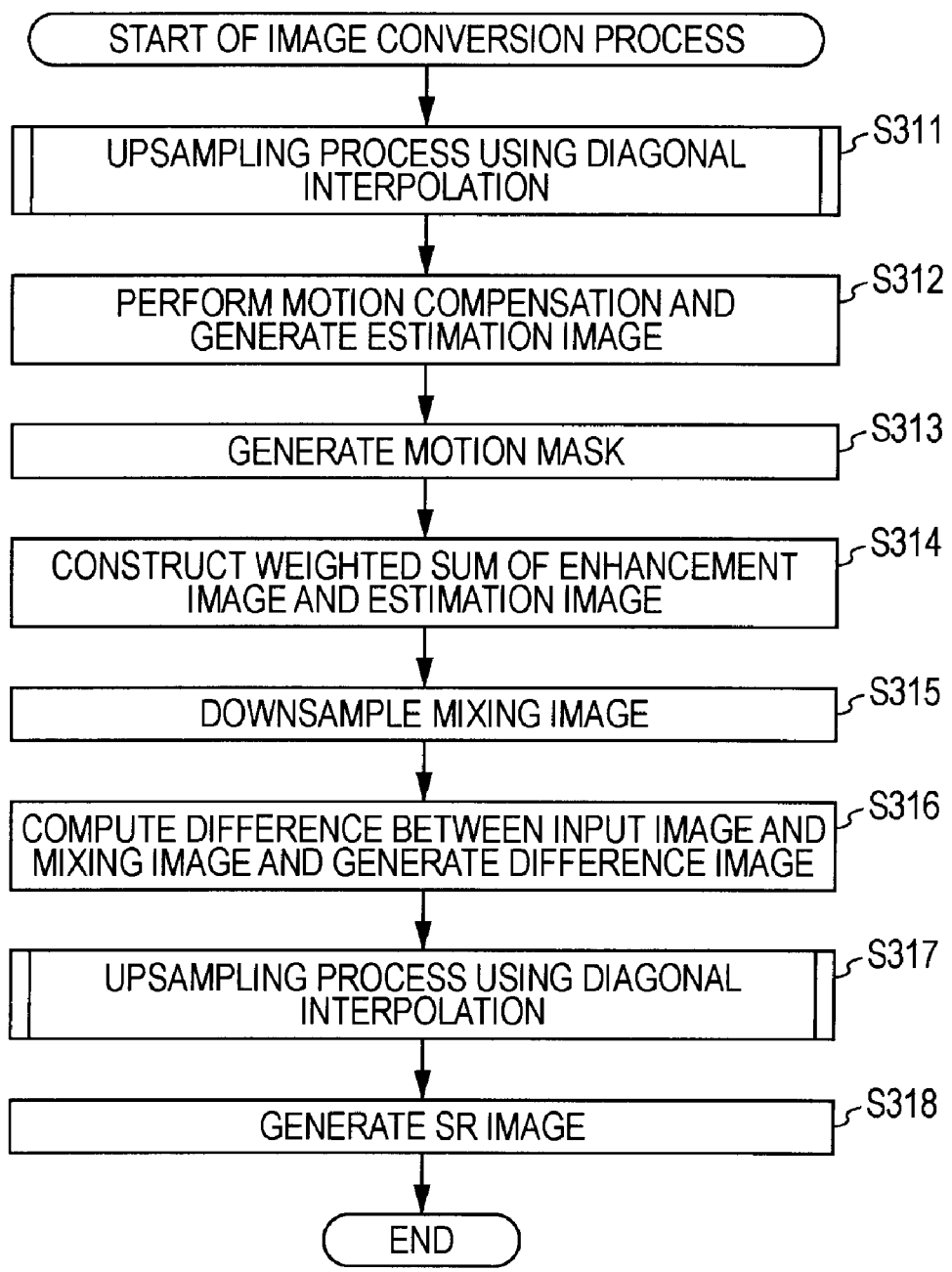
FIG. 30 is a flowchart illustrating an image conversion process.
Figure 31:
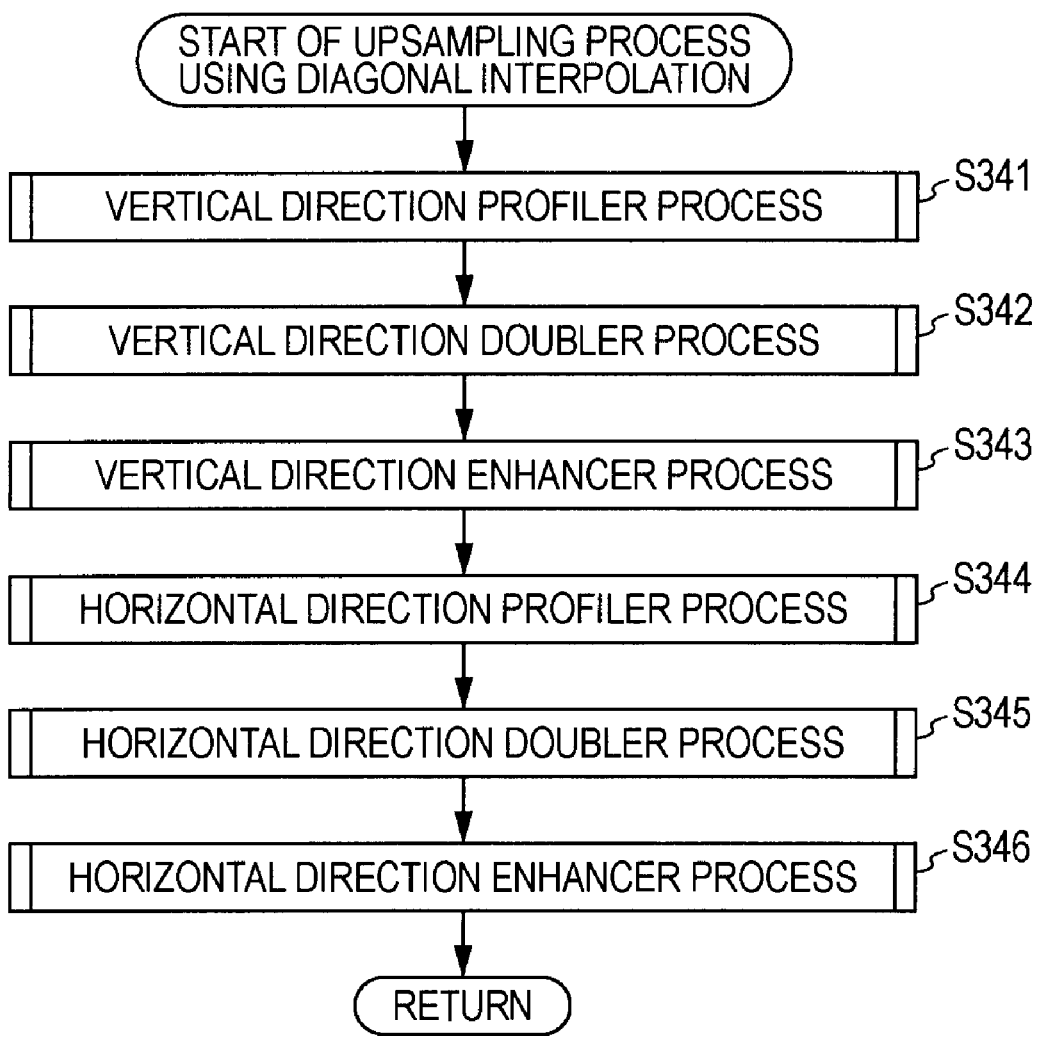
FIG. 31 is a flowchart illustrating an upsampling process using diagonal interpolation.

The upsampling processing using diagonal interpolation corresponding to the processing performed in step S311 shown in FIG. 30 is described next with reference to the flowchart shown in FIG. 31.

In the upsampling processing using diagonal interpolation, the processing in steps S341 to S346 is performed, and an enhancement image is generated. However, the processing performed in steps S341 to S346 is similar to the processing performed in steps S171 to S176 shown in FIG. 22. Accordingly, the description thereof is not repeated.

That is, in the processing performed in steps S341 to S343, the input image is upsampled, and a vertically interpolated image is generated. In addition, in the processing performed in steps S344 to S346, the vertically interpolated image is upsampled in the horizontal direction, and an enhancement image is generated. When the enhancement image is generated, the upsampling processing using diagonal interpolation is completed. The processing then proceeds to step S312 shown in FIG. 30.

Fourth Embodiment
Configuration of Image Converting Apparatus

When super-resolution processing is performed using an enhancement image obtained through diagonal interpolation, the contribution factor of a difference image to generation of an output image may be changed using an alpha map. In such a case, for example, an image converting apparatus is configured as shown in FIG. 32.

An image converting apparatus 441 includes a diagonal interpolation processing unit 162, a motion compensation unit 202, a motion mask generating unit 203, a mixing unit 204, a downsampling unit 205, a filter processing unit 206, a subtracter unit 207, an upsampling unit 208, a filter processing unit 209, a map generating unit 163, a multiplier unit 451, a multiplier unit 452, and an adder unit 210.

Figure 32:
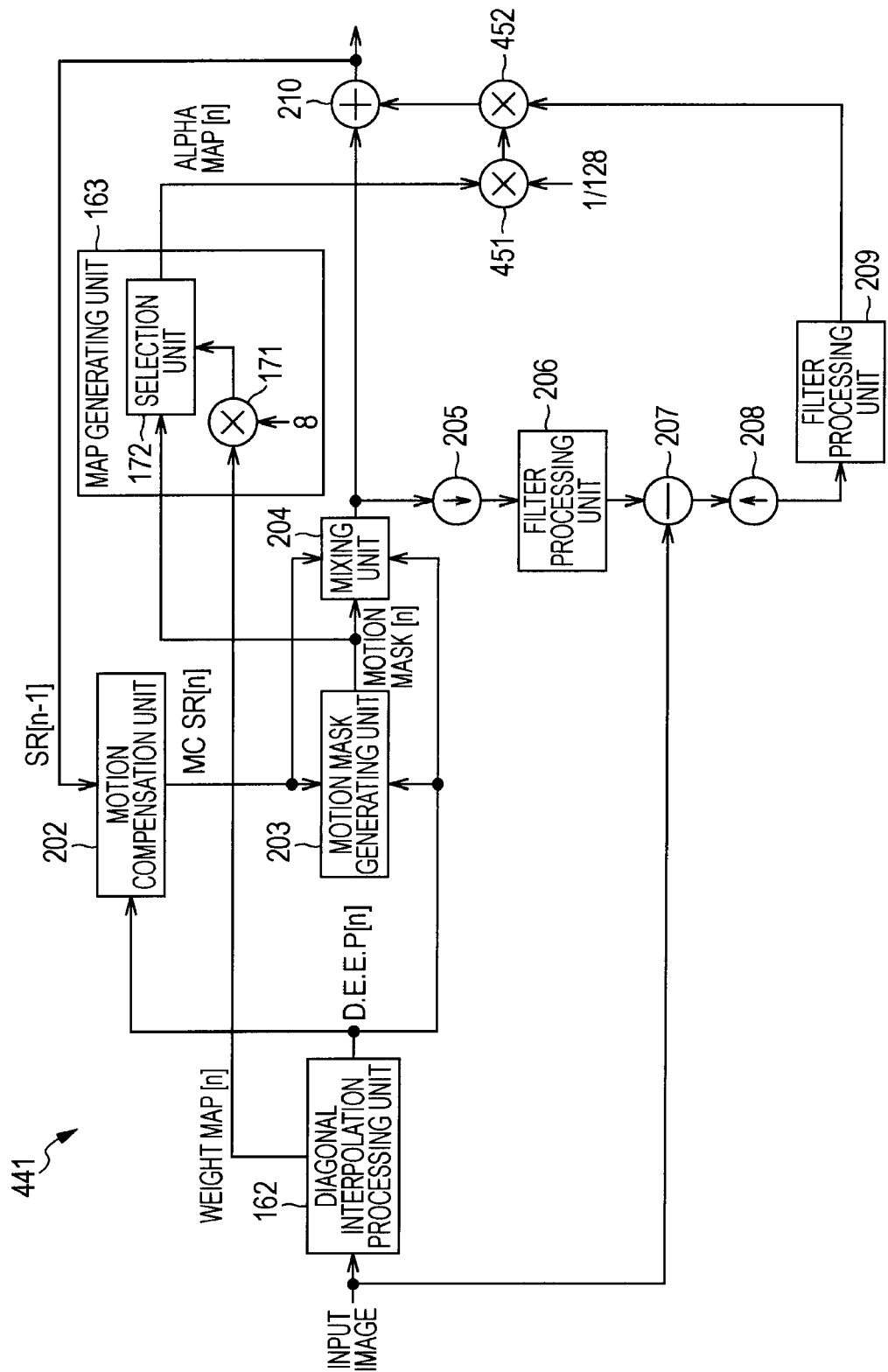
FIG. 32 illustrates another exemplary configuration of an image converting apparatus according to an embodiment of the present invention.

The same numbering will be used in describing FIG. 32 as was utilized above in describing FIGS. 13 and 14, and the descriptions thereof are not repeated where appropriate.

In the image converting apparatus 441, an input image is supplied to the diagonal interpolation processing unit 162 and the subtracter unit 207. The diagonal interpolation processing unit 162 upsamples a supplied input image through diagonal interpolation and supplies the upsampled image to the motion compensation unit 202, the motion mask generating unit 203, and the mixing unit 204. In addition, the diagonal interpolation processing unit 162 supplies a weight map generated through diagonal interpolation to the map generating unit 163.

The map generating unit 163 generates an alpha map using the weight map supplied from the diagonal interpolation processing unit 162 and a motion mask supplied from the motion mask generating unit 203. The map generating unit 163 then supplies the generated alpha map to the multiplier unit 451. The multiplier unit 451 multiplies the pixel value of each of the pixels of the alpha map supplied from the map generating unit 163 by an input value 1/128. The multiplier unit 451 then supplies the resultant alpha map to the multiplier unit 452.

The multiplier unit 452 multiplies the difference image supplied from the filter processing unit 209 by the pixel value of a pixel of the alpha map supplied from the multiplier unit 451. The multiplier unit 452 then supplies the resultant difference image to the adder unit 210. The adder unit 210 sums the mixing image supplied from the mixing unit 204 and the difference image supplied from the multiplier unit 452 and generates an SR image. Thereafter, the adder unit 210 outputs the generated SR image as an output image. The SR image is supplied to the motion compensation unit 202.

Operation Performed by Image Converting Apparatus

Figure 33:
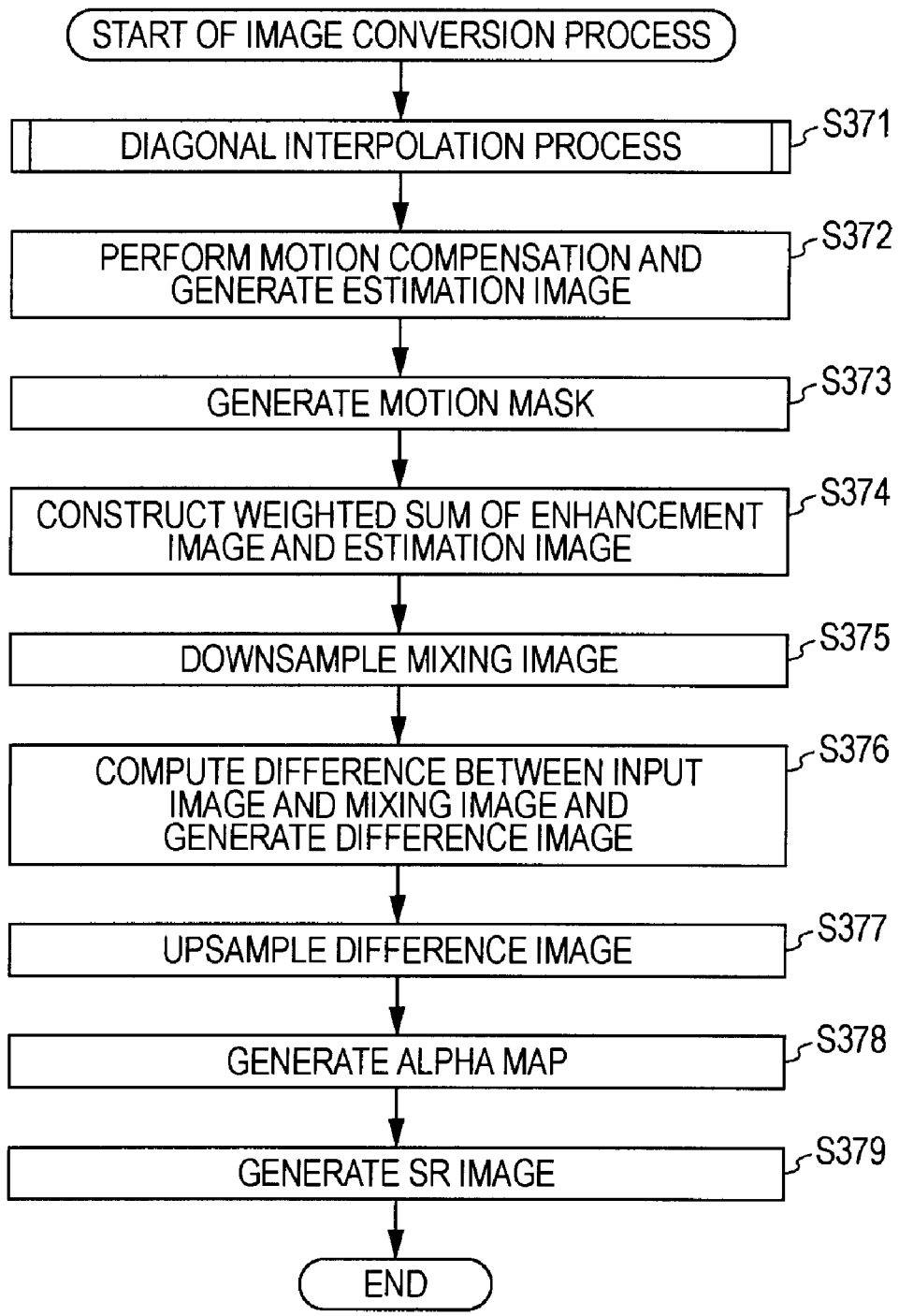
FIG. 33 is a flowchart illustrating an image conversion process.

An exemplary image conversion process performed by the image converting apparatus 441 is described next with reference to the flowchart shown in FIG. 33. The image conversion process is performed each time an input image for one frame is supplied to the image converting apparatus 441.

In step S371, the diagonal interpolation processing unit 162 performs diagonal interpolation on the supplied input image and generates an enhancement image having a resolution the same as that of an output image. The diagonal interpolation processing unit 162 supplies the generated enhancement image to the motion compensation unit 202, the motion mask generating unit 203, and the mixing unit 204. In addition, the diagonal interpolation processing unit 162 supplies a weight map obtained through the diagonal interpolation process to the map generating unit 163. Note that since the diagonal interpolation process is similar to the process performed in step S112 shown in FIG. 20, the description thereof is not repeated.

After the diagonal interpolation process is completed, the processing in steps S372 to S377 is performed. Since the processing in steps S372 to S377 is similar to the processing in steps S142 to S147 shown in FIG. 21, the description thereof is not repeated.

However, in the vertical upsampling processing unit 441, motion compensation is performed, and a mixing image is generated using the enhancement image. A motion mask generated by the motion mask generating unit 203 is supplied to the mixing unit 204 and the map generating unit 163. In addition, a difference image upsampled by the upsampling unit 208 is subjected to filter processing using a highpass filter performed by the filter processing unit 209. The difference image is then supplied to the multiplier unit 452.

In step S378, the map generating unit 163 generates an alpha map using the weight map supplied from the diagonal interpolation processing unit 162 and the motion mask supplied from the motion mask generating unit 203. The map generating unit 163 then supplies the generated alpha map to the multiplier unit 451. That is, in step S378, processing similar to the processing in step S113 shown in FIG. 20 is performed.

The multiplier unit 451 multiplies the pixel value of each of the pixels of the alpha map supplied from the map generating unit 163 by an input value 1/128. The multiplier unit 451 then supplies the resultant alpha map to the multiplier unit 452. Note that the value 1/128 is multiplied in order to normalize the pixel value of 128 gradation levels so that the pixel value is one of the values from 0 to 128.

The multiplier unit 452 multiplies the pixel value of a pixel of the difference image supplied from the filter processing unit 209 by the pixel value of a pixel of the alpha map supplied from the multiplier unit 451. The multiplier unit 452 then supplies the difference image to the adder unit 210. That is, the multiplier unit 452 multiplies the pixel value of each of the pixels of the difference image by the pixel value of a pixel of the alpha map located at a position the same as that of the pixel of the difference image.

In step S379, the adder unit 210 adds the difference image supplied from the multiplier unit 452 to a mixing image supplied from the mixing unit 204 and generates an SR image. Thereafter, the adder unit 210 outputs the generated SR image as an output image. In addition, the adder unit 210 supplies the SR image to the motion compensation unit 202. In this way, the image conversion process is completed.

By performing upsampling in super-resolution processing using diagonal interpolation in this manner, the image quality of the output image can be easily increased. That is, by upsampling the input image using a diagonal interpolation process, an enhancement image in which a diagonal line appearing in the input image is sharply reproduced can be obtained. If super-resolution processing is performed using the enhancement image, the image quality of the output image can be further increased.

In addition, by changing the contribution factor of the difference image to generation of the output image in accordance with the pixel values in the alpha map, the image quality of the output image can be further increased.

That is, in the multiplier unit 452, the difference image is multiplied by the pixel values in the alpha map. Accordingly, when the pixel values of the pixels of the alpha map are small, the contribution factor of the difference image to generation of the output image is low. That is, in an area in which the effect obtained from a diagonal interpolation process is large, an estimation error indicated by the difference image is not greatly reflected in the output image.

It is supposed that an area having a higher effect of the diagonal interpolation process displays a sharper edge of, for example, a diagonal line of the mixing image. Accordingly, in such an area, feedback of the estimation error is decreased, and the contribution factor of the mixing image to generation of the output image is increased. In this way, the image quality of the output image can be increased.

The above-described series of processes can be executed not only by hardware but also by software. When the above-described series of processes are executed by software, the programs of the software are installed from a program recording medium in a computer incorporated in dedicated hardware or a computer that can execute a variety of function by installing a variety of programs therein (e.g., a general-purpose personal computer).

Figure 34:
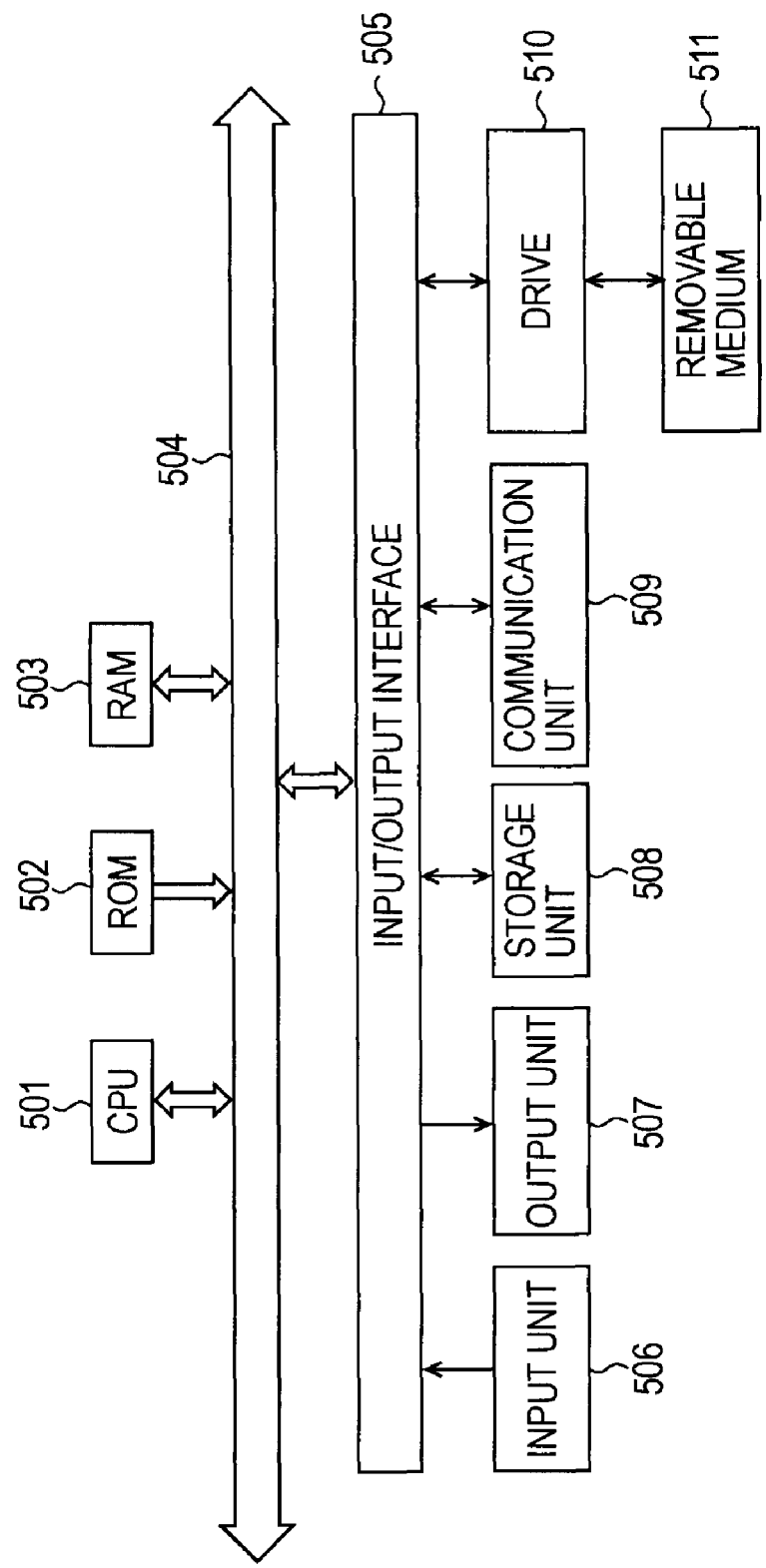
FIG. 34 illustrates an exemplary configuration of a computer.

FIG. 34 is a block diagram of an exemplary hardware configuration of a computer that executes the above-described series of processes.

In the computer, a central processing unit (CPU) 501, a read only memory (ROM) 502, and a random access memory (RAM) 503 are connected to one another via a bus 504.

In addition, an input/output interface 505 is connected to the bus 504. The following units are connected to the input/output interface 505: an input unit 506 including a keyboard, a mouse, and a microphone, an output unit 507 including a display and a speaker, the storage unit 508 including a hard disk and a nonvolatile memory, and a communication unit 509 including, for example, a network interface, and a drive 510 that drives a removable medium 511 (e.g., a magnetic disk, an optical disk, a magneto-optical disk, or a semiconductor memory).

In the computer having such a configuration, the CPU 501 loads the programs stored in, for example, the storage unit 508 into the RAM 503 via the input/output interface 505 and the bus 504. The CPU 501 then executes the programs. Thus, the above-described series of processes are performed.

The programs to be executed by the computer (the CPU 501) are stored in the removable medium 511, which is a package medium including a magnetic disk (including a flexible disk), an optical disk (e.g., a compact disk-read only memory (CD-ROM) or a digital versatile disk (DVD)), a magneto optical disk, or a semiconductor memory, and the programs are provided to users. Alternatively, the programs may be provided to the users via a wireless or wired transmission medium, such as a local area network, the Internet, or a digital satellite broadcast.

Thereafter, by mounting the removable medium 511 in the drive 510, the users can install the programs in the storage unit 508 via the input/output interface 505. Alternatively, the programs may be received via a wireless or wired transmission medium using the communication unit 509 and may be installed in the storage unit 508. Still alternatively, the programs may be preinstalled in the ROM 502 or the storage unit 508.

The programs to be executed by the computer may include processes that are executed in the above-described sequence, processes that are executed in parallel, or processes that are executed on demand.

The present application contains subject matter related to that disclosed in Japanese Priority Patent Application No. JP 2008-290457 filed in the Japan Patent Office on Nov. 13, 2008 and No. JP 2009-091680 filed in the Japan Patent Office on Apr. 6, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for converting an input image having a first resolution into an output image having a second resolution higher than the first resolution, comprising:
   super-resolution ("SR") processing means for converting the input image into an SR image having the second resolution through motion compensation using the input image and another input image having the second resolution and containing an image of a subject the same as that contained in the input image;
   motion mask generating means for generating a motion mask indicating an accuracy of estimation through the motion compensation using the input image and the SR image;
   edge direction information generating means for generating edge direction information indicating an edge direction of each area of the input image;
   weight map generating means for generating a weight map indicating likelihood of the edge direction of each of the areas using the input image and the edge direction information;
   interpolation processing means for converting the input image into an interpolated image having the second resolution through interpolation processing using the edge direction information;
   weight computing means for computing a weight using the motion mask and the weight map; and
   image generating means for generating the output image by constructing a weighted sum of the SR image and the interpolated image using the weight.

2. The image processing apparatus according to claim 1, wherein the weight computing means computes the weight so that the weight of the SR image decreases as the accuracy of estimation indicated by the motion mask decreases.

3. The image processing apparatus according to claim 1, wherein the weight computing means computes the weight so that the weight of the SR image decreases as the likelihood of the edge direction indicated by the weight map increases.

4. The image processing apparatus according to claim 1, wherein the motion mask serves as information including an accuracy weight value representing the accuracy of estimation for each of the areas, and the accuracy weight value decreases as the accuracy of estimation decreases, and wherein the weight map serves as information including a likelihood weight value representing the likelihood of the edge direction for each of the areas, and the likelihood weight value decreases as the likelihood of the edge direction increases, and wherein the weight computing means computes the weight on the basis of a smaller one of the accuracy weight value and the likelihood weight value for each of the areas.

5. An image processing method for use in an image processing apparatus for converting an input image having a first resolution into an output image having a second resolution higher than the first resolution, the image processing apparatus including super-resolution ("SR") processing means for converting the input image into an SR image having the second resolution through motion compensation using the input image and another input image having the second resolution and containing an image of a subject the same as that contained in the input image, motion mask generating means for generating a motion mask indicating an accuracy of estimation through the motion compensation using the input image and the SR image, edge direction information generating means for generating edge direction information indicating an edge direction of each area of the input image, weight map generating means for generating a weight map indicating likelihood of the edge direction of each of the areas using the input image and the edge direction information, interpolation processing means for converting the input image into an interpolated image having the second resolution through interpolation processing using the edge direction information, weight computing means for computing a weight using the motion mask and the weight map, and image generating means for generating the output image by constructing a weighted sum of the SR image and the interpolated image using the weight, the method comprising the steps of:
   converting the input image into the SR image through the motion compensation using the super-resolution processing means;
   generating the motion mask on the basis of the input image and the SR image using the motion mask generating means;
   generating the edge direction information on the basis of the input image using the edge direction information generating means;
   generating the weight map on the basis of the input image and the edge direction information using the weight map generating means;
   converting the input image into the interpolated image using the interpolation processing means;
   computing a weight from the motion mask and the weight map using the weight computing means; and
   generating the output image from the weighted sum using the image generating means.

6. A non-transitory computer-readable medium comprising an image processing program for converting an input image having a first resolution into an output image having a second resolution higher than the first resolution, the program comprising program code for causing a computer to perform processing including the steps of:
   converting the input image into a super-resolution ("SR") image having the second resolution through motion compensation using the input image and another input image having the second resolution and containing an image of a subject the same as that contained in the input image;
   generating a motion mask indicating an accuracy of estimation through the motion compensation using the input image and the SR image;
   generating edge direction information indicating an edge direction of each area of the input image;
   generating a weight map indicating likelihood of the edge direction of each of the areas using the input image and the edge direction information;
   converting the input image into an interpolated image having the second resolution through interpolation processing using the edge direction information;
   computing a weight using the motion mask and the weight map; and
   generating the output image by constructing a weighted sum of the SR image and the interpolated image using the weight.

7. An image processing apparatus for converting an input image having a first resolution into an output image having a second resolution higher than the first resolution, comprising:
first interpolation processing means for converting the input image into a first interpolated image having the second resolution through an interpolation process using an edge direction in each area of the input image;
super-resolution ("SR") processing means for converting the first interpolated image into an SR image having the second resolution through motion compensation using the first interpolated image and another first interpolated image having the second resolution and containing an image of a subject the same as that contained in the first interpolated image;
difference computing means for generating a difference image by computing a difference between the SR image and the input image;
second interpolation processing means for converting the difference image having the first resolution into a second interpolated image having the second resolution through an interpolation process using an edge direction in each area of the difference image; and
adder means for generating the output image by adding the second interpolated image to the SR image.

8. An image processing apparatus for converting an input image having a first resolution into an output image having a second resolution higher than the first resolution, comprising:
edge direction information generating means for generating edge direction information indicating an edge direction of each area of the input image using the input image;
weight map generating means for generating a weight map indicating likelihood of the edge direction of each of the areas using the input image and the edge direction information;
interpolation processing means for converting the input image into an interpolated image having the second resolution through an interpolation process using the edge direction information;
super-resolution ("SR") processing means for converting the interpolated image into an SR image having the second resolution through motion compensation using the interpolated image and another interpolated image having the second resolution and containing an image of a subject the same as that contained in the interpolated image;
motion mask generating means for generating a motion mask indicating an accuracy of estimation through the motion compensation using the interpolated image and the SR image;
weight computing means for computing a weight using the motion mask and the weight map;
difference computing means for generating a difference image by computing a difference between the SR image and the input image; and
image generating means for generating the output image by constructing a weighted sum of the SR image and the difference image using the weight.

9. An image processing apparatus configured to convert an input image having a first resolution into an output image having a second resolution higher than the first resolution, comprising:
a super-resolution ("SR") processing unit configured to convert the input image into an SR image having the second resolution through motion compensation using the input image and another input image having the second resolution and containing an image of a subject the same as that contained in the input image;
a motion mask generating unit configured to generate a motion mask indicating an accuracy of estimation through the motion compensation using the input image and the SR image;
an edge direction information generating unit configured to generate edge direction information indicating an edge direction of each area of the input image;
a weight map generating unit configured to generate a weight map indicating likelihood of the edge direction of each of the areas using the input image and the edge direction information;
an interpolation processing unit configured to convert the input image into an interpolated image having the second resolution through interpolation processing using the edge direction information;
a weight computing unit configured to compute a weight using the motion mask and the weight map; and
an image generating unit configured to generate the output image by constructing a weighted sum of the SR image and the interpolated image using the weight.

10. An image processing apparatus configured to convert an input image having a first resolution into an output image having a second resolution higher than the first resolution, comprising:
a first interpolation processing unit configured to convert the input image into a first interpolated image having the second resolution through an interpolation process using an edge direction in each area of the input image;
a super-resolution ("SR") processing unit configured to convert the first interpolated image into an SR image having the second resolution through motion compensation using the first interpolated image and another first interpolated image having the second resolution and containing an image of a subject the same as that contained in the first interpolated image;
a difference computing unit configured to generate a difference image by computing a difference between the SR image and the input image;
a second interpolation processing unit configured to convert the difference image having the first resolution into a second interpolated image having the second resolution through an interpolation process using an edge direction in each area of the difference image; and
an adder unit configured to generate the output image by adding the second interpolated image to the SR image.

11. An image processing apparatus configured to convert an input image having a first resolution into an output image having a second resolution higher than the first resolution, comprising:
an edge direction information generating unit configured to generate edge direction information indicating an edge direction of each area of the input image using the input image;
a weight map generating unit configured to generate a weight map indicating likelihood of the edge direction of each of the areas using the input image and the edge direction information;
an interpolation processing unit configured to convert the input image into an interpolated image having the second resolution through an interpolation process using the edge direction information;
a super-resolution ("SR") processing unit configured to convert the interpolated image into an SR image having the second resolution through motion compensation using the interpolated image and another interpolated image having the second resolution and containing an image of a subject the same as that contained in the interpolated image;
a motion mask generating unit configured to generate a motion mask indicating an accuracy of estimation through the motion compensation using the interpolated image and the SR image;
a weight computing unit configured to compute a weight using the motion mask and the weight map;

a difference computing unit configured to generate a difference image by computing a difference between the SR image and the input image; and
an image generating unit configured to generate the output image by constructing a weighted sum of the SR image and the difference image using the weight.

* * * * *